US012429161B2

(12) United States Patent
Corley

(10) Patent No.: US 12,429,161 B2
(45) Date of Patent: Sep. 30, 2025

(54) BOLT-ON ACCESSORY CONNECTOR AND METHOD OF USE

(71) Applicant: Christian L Corley, Bottineau, ND (US)

(72) Inventor: Christian L Corley, Bottineau, ND (US)

( * ) Notice: Subject to any disclaimer, the term of this patent is extended or adjusted under 35 U.S.C. 154(b) by 4 days.

(21) Appl. No.: 18/417,393

(22) Filed: Jan. 19, 2024

(65) Prior Publication Data
US 2025/0019051 A1      Jan. 16, 2025

Related U.S. Application Data

(60) Continuation-in-part of application No. 18/206,383, filed on Jun. 6, 2023, now abandoned, which is a continuation of application No. 17/834,524, filed on Jun. 7, 2022, now Pat. No. 11,667,359, which is a continuation of application No. 16/752,254, filed on Jan. 24, 2020, now Pat. No. 11,352,104, which is a division of application No. 16/410,068, filed on May 13, 2019, now Pat. No. 10,787,239, and a continuation-in-part of application No. 15/812,882,
(Continued)

(51) Int. Cl.
| | |
|---|---|
| F16M 13/02 | (2006.01) |
| B63B 45/00 | (2006.01) |
| F16M 11/04 | (2006.01) |
| F16M 11/24 | (2006.01) |
| F21V 21/22 | (2006.01) |

(52) U.S. Cl.
CPC ............. *F16M 13/02* (2013.01); *B63B 45/00* (2013.01); *F16M 11/041* (2013.01); *F16M 11/24* (2013.01); *F21V 21/22* (2013.01); *F16M 2200/06* (2013.01)

(58) Field of Classification Search
CPC ...... B63B 45/00; F16M 11/041; F16M 11/24; F16M 13/02; F16M 2200/06; F21V 21/22
See application file for complete search history.

(56) References Cited

U.S. PATENT DOCUMENTS

| 673,482 A | 5/1901 | Shipway |
|---|---|---|
| 1,351,817 A | 9/1920 | Walters |
| (Continued) | | |

FOREIGN PATENT DOCUMENTS

DE      202005009976      9/2005

OTHER PUBLICATIONS

Bits and Pieces , "Hi-Tech LED Walking and Hiking Staff", http://www.bitsandpieces.com/product/hitech_led_walking_and_hiking_staff/multi_function_gadgets?p=0939377&utm_medium=shopping_engine&CAWELAID=120020260000000612&CAGPSPN=pla&gclid=Cj0KEQjwrPqnBRD56dGe1o_WIZsBEIQAb5ugt2el7XodvDsL5vXs0gubTxfJKo-OLP1nYpD4nbK08, 2014.
(Continued)

*Primary Examiner* — Eret C McNichols
(74) *Attorney, Agent, or Firm* — AVEK IP, LLC

(57) ABSTRACT

A bolt-on accessory connector which has multiple faces, including top, front, left, right, and angled shoulder faces. Each face has a connector receiver which can connect to an accessory, such as a camera. An accessory pole with an accessory mount could be interspaced between the accessory and the accessory connector. The accessory connector is connectable to any surface, including a graph mount on a marine vessel or other locations on a marine vehicle, land vehicle or a permanent or temporary structure.

9 Claims, 51 Drawing Sheets

Related U.S. Application Data filed on Nov. 14, 2017, now Pat. No. 10,312,706, which is a continuation-in-part of application No. 15/184,721, filed on Jun. 16, 2016, now Pat. No. 9,981,723, which is a continuation-in-part of application No. 14/986,455, filed on Dec. 31, 2015, now abandoned, which is a continuation-in-part of application No. 14/716,600, filed on May 19, 2015, now abandoned, which is a continuation-in-part of application No. 14/660,626, filed on Mar. 17, 2015, now Pat. No. 9,381,976.

(60) Provisional application No. 62/507,306, filed on May 17, 2017, provisional application No. 62/108,136, filed on Jan. 27, 2015, provisional application No. 62/107,704, filed on Jan. 26, 2015.

(56) References Cited

U.S. PATENT DOCUMENTS

| | | | |
|---|---|---|---|
| 2,938,109 A * | 5/1960 | Coleman | B63B 45/04 340/984 |
| 3,632,147 A * | 1/1972 | Finger | A47F 5/14 403/171 |
| 3,900,725 A * | 8/1975 | Komon | B63B 45/04 362/647 |
| 4,474,439 A * | 10/1984 | Brown | F16M 11/08 396/428 |
| 4,625,742 A | 12/1986 | Phillips | |
| 4,751,540 A * | 6/1988 | Jones | F16M 11/105 396/419 |
| 4,856,452 A * | 8/1989 | Pingel | B63B 45/04 362/477 |
| 4,884,173 A * | 11/1989 | Cassidy | B60Q 1/245 362/543 |
| 5,039,050 A * | 8/1991 | Eidschun | B60R 11/04 396/419 |
| 5,137,238 A * | 8/1992 | Hutten | B60R 11/04 248/206.3 |
| 5,173,725 A | 12/1992 | Giles et al. | |
| 5,331,990 A | 7/1994 | Hall et al. | |
| 5,341,124 A * | 8/1994 | Leyden | G08B 13/149 340/568.4 |
| 5,588,735 A | 12/1996 | Harada | |
| 5,704,704 A | 1/1998 | Reichard et al. | |
| 5,766,020 A * | 6/1998 | Hughes | H01R 31/065 439/35 |
| 5,845,885 A | 12/1998 | Carnevali | |
| 5,973,618 A | 10/1999 | Ellis | |
| 6,027,277 A * | 2/2000 | Leyden | G08B 13/1463 340/568.4 |
| 6,141,034 A * | 10/2000 | McCutchen | H04N 13/363 348/E13.058 |
| 6,244,759 B1 | 6/2001 | Russo | |
| 6,368,157 B1 | 4/2002 | Bottazi et al. | |
| 6,685,145 B2 | 2/2004 | Mackay et al. | |
| 6,855,003 B1 | 2/2005 | Wyant | |
| 7,017,598 B2 | 3/2006 | Nipke | |
| 7,048,246 B2 * | 5/2006 | Leyden | E05B 73/0005 340/568.1 |
| 7,418,918 B2 * | 9/2008 | Bierbower | B63B 17/02 114/361 |
| 7,422,351 B2 * | 9/2008 | Villani | B63B 45/04 362/540 |
| 7,442,351 B2 | 10/2008 | Langlet et al. | |
| D582,084 S | 12/2008 | Gebhard et al. | |
| 7,500,881 B1 | 3/2009 | Lin | |
| 7,661,891 B2 * | 2/2010 | Heibel | F16M 13/022 396/428 |
| 7,862,197 B2 | 1/2011 | Gebhard | |
| 8,011,930 B2 | 9/2011 | Lee et al. | |
| 8,109,681 B2 * | 2/2012 | McAnulty | F16M 11/041 396/428 |
| 8,337,035 B2 | 12/2012 | Lu | |
| 8,547,056 B2 | 10/2013 | Chang | |
| 8,629,651 B2 | 1/2014 | Guccione et al. | |
| 8,754,609 B2 | 6/2014 | Tsai et al. | |
| 8,783,975 B1 | 7/2014 | Cifers | |
| 8,823,319 B2 | 9/2014 | Von Novak, III et al. | |
| 8,873,233 B2 | 10/2014 | Reber et al. | |
| 8,944,399 B2 | 2/2015 | Sutherland et al. | |
| 9,152,019 B2 * | 10/2015 | Kintner | G03B 17/561 |
| 9,185,391 B1 * | 11/2015 | Prechtl | G06T 7/593 |
| 9,188,274 B2 * | 11/2015 | Schorman | F16M 11/043 |
| 9,381,976 B1 * | 7/2016 | Corley | B63B 17/00 |
| 9,413,930 B2 * | 8/2016 | Geerds | H04N 23/698 |
| 9,851,623 B2 * | 12/2017 | Macmillan | G03B 37/04 |
| 10,312,706 B2 | 6/2019 | Corley | |
| 10,344,924 B1 | 7/2019 | Ganahl | |
| 10,447,993 B2 * | 10/2019 | Nelson | H04N 23/45 |
| 10,531,071 B2 * | 1/2020 | Cole | H04N 13/239 |
| 10,717,501 B1 | 7/2020 | Gilhooley | |
| 10,787,239 B2 | 9/2020 | Corley | |
| 11,352,104 B2 | 6/2022 | Corley | |
| 12,007,068 B2 * | 6/2024 | Yamafune | B63B 35/00 |
| 12,231,751 B1 * | 2/2025 | Peng | H04N 23/90 |
| 2004/0112416 A1 | 6/2004 | Bishirjian | |
| 2004/0257822 A1 | 12/2004 | Hopkins | |
| 2007/0279922 A1 | 12/2007 | Villani | |
| 2009/0255561 A1 | 10/2009 | Brown | |
| 2010/0130065 A1 | 5/2010 | Teague | |
| 2012/0013790 A1 | 1/2012 | Chu | |
| 2013/0201296 A1 * | 8/2013 | Weiss | H04N 13/243 348/48 |
| 2013/0278207 A1 | 10/2013 | Yoo | |
| 2014/0030929 A1 | 1/2014 | Cracco | |
| 2014/0153916 A1 * | 6/2014 | Kintner | H04N 13/243 396/419 |
| 2014/0210406 A1 | 7/2014 | Na et al. | |
| 2014/0267596 A1 * | 9/2014 | Geerds | H04N 23/51 348/38 |
| 2015/0002088 A1 | 1/2015 | D'Agostino | |
| 2015/0316837 A1 | 11/2015 | Maltese | |
| 2015/0344116 A1 | 12/2015 | McLeroy | |
| 2015/0346590 A1 | 12/2015 | Lewis | |
| 2015/0351531 A1 | 12/2015 | Dalton | |
| 2016/0212409 A1 * | 7/2016 | Cole | H04N 23/50 |

OTHER PUBLICATIONS

Excel-Outdoors.com, "Power Plug", http://excel-outdoors.com/products/excel-outdoors-power-plug, 2015.

Gander Mountain, "Goal Zero Switch 8 Power Source", http://www.gandermountain.com/modperl/product/details.cgi?pdesc=Goal-Zero-Switch-8-Power-Source&i=785207&r=view&cvsfa=2586&cvsfe=2&cvsfhu=373835323037&kpid=785207&gclid=Cj0KEQjwrPqnBRD56dGe1o_WIZsBEiQAb5ugtwROQCsK253KG-HoDs-32QpQu-N5XQcy4WFOLIA5B9QaAo_18P8, 2013.

Gizmag.com, "The Slik-Stik nexgen high-tech walking stick", http://www.gizmag.com/the-slik-stik-nexgen-high-tech-walking-stick/11293/, Mar. 20, 2009.

Kayalu Gear, "General Info about the Radpole Assembly", http://www.kayalu.com/k/radpole-portable-ram-mounts-navigation-kayak-light-camera-mount-fishing-pole-mount_page_2.php, 2015, 1-3.

R & R Associates, "The New Generation Cane", http://www.rnrassociates.com/wordpress/the-new-generation-cane/, Mar. 7, 2013.

Seachoice Products, "2012 Marine Accessories Catalog", http://www.seachoice.com/products, 2012, 8.

* cited by examiner

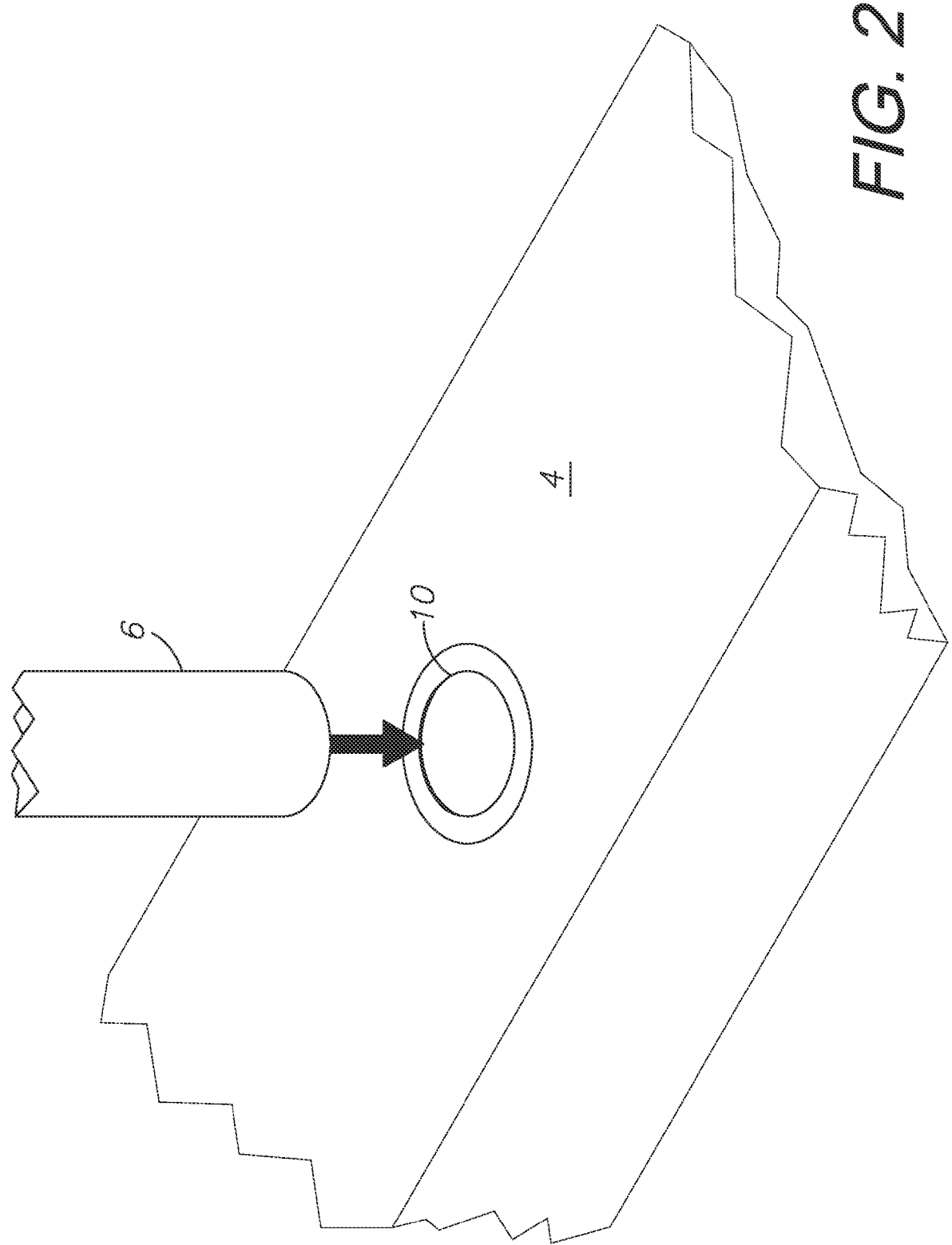

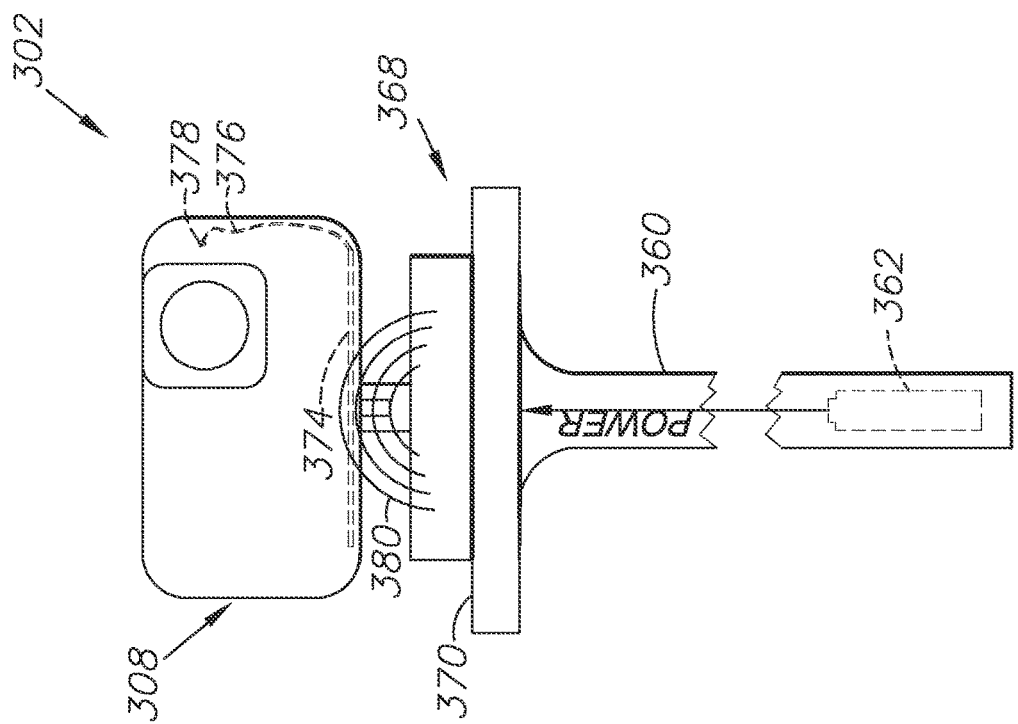
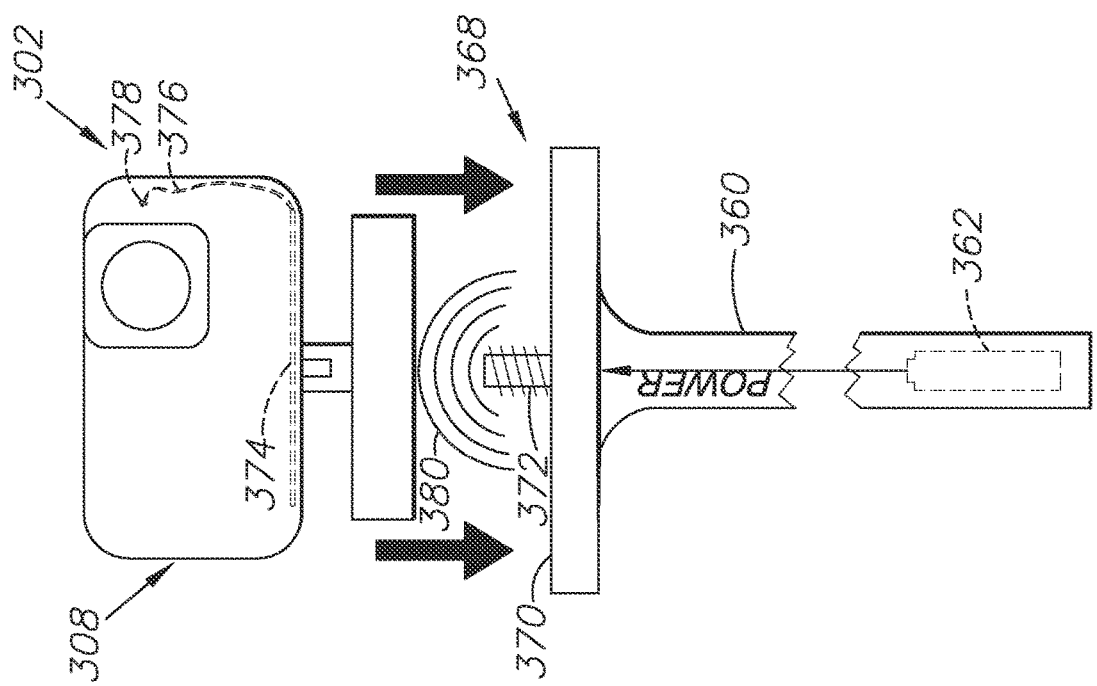

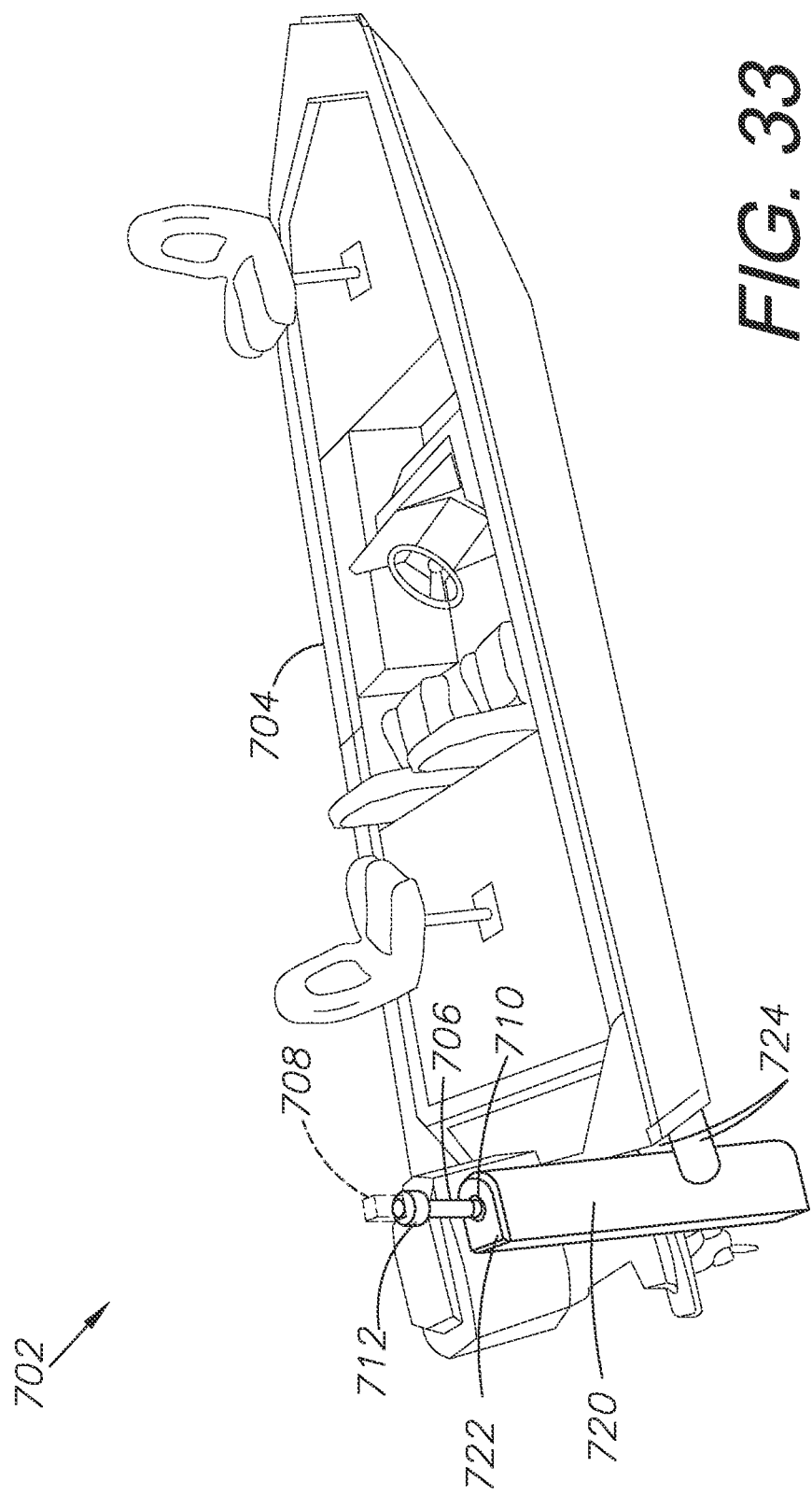

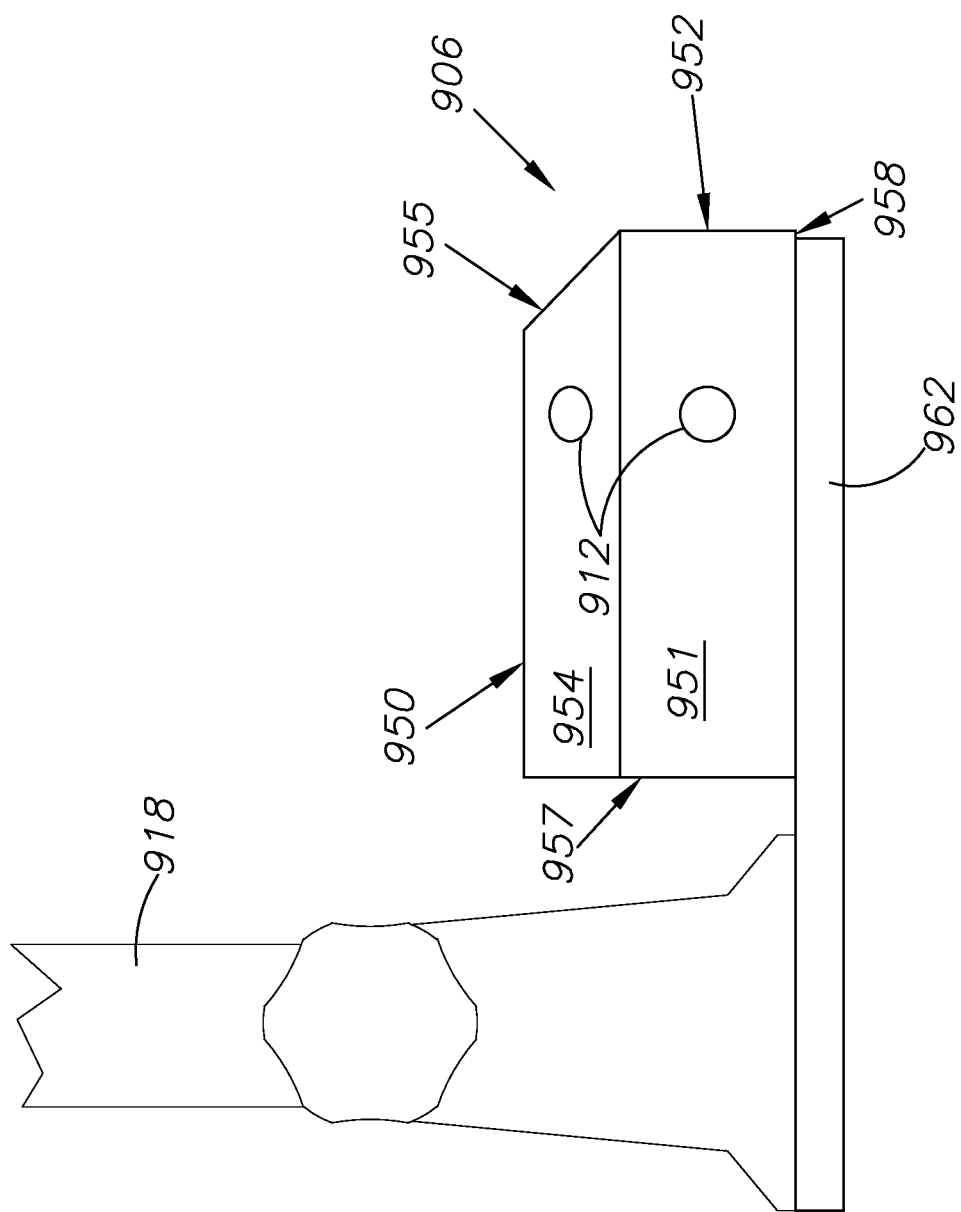

BOLT-ON ACCESSORY CONNECTOR AND METHOD OF USE

CROSS-REFERENCE TO RELATED APPLICATIONS

This application is a continuation-in-part of and claims priority in U.S. patent application Ser. No. 18/206,383, filed Jun. 6, 2023, which is a continuation of and claims priority in U.S. patent application Ser. No. 17/834,524, filed Jun. 7, 2022, which is a continuation application and claims priority in U.S. patent application Ser. No. 16/752,254, filed Jan. 24, 2020, now U.S. Pat. No. 11,352,104 Issued Jun. 7, 2022, which is a divisional application of and claims priority in U.S. patent application Ser. No. 16/410,068 filed May 13, 2019, now U.S. Pat. No. 10,787,239 Issued Sep. 29, 2020, and is also a continuation-in-part of and claims priority in U.S. patent application Ser. No. 15/812,882 filed Nov. 14, 2017, now U.S. Pat. No. 10,312,706 Issued Jun. 4, 2019, which claims priority in U.S. Provisional Patent Application No. 62/507,306, filed May 17, 2017, and which is a continuation-in-part of and claims priority in U.S. patent application Ser. No. 15/184,721, filed Jun. 16, 2016, now U.S. Pat. No. 9,981,723 Issued May 29, 2018, which is a continuation-in-part of and claims priority in U.S. patent application Ser. No. 14/986,455, filed Dec. 31, 2015, which is a continuation-in-part of and claims priority in U.S. patent application Ser. No. 14/716,600, filed May 19, 2015, which is a continuation-in-part of and claims priority in U.S. patent application Ser. No. 14/660,626, filed Mar. 17, 2015, now U.S. Pat. No. 9,381,976, issued Jul. 5, 2016, which claims priority in U.S. Provisional Patent Application No. 62/108,136, filed Jan. 27, 2015, and also claims priority in U.S. Provisional Patent Application No. 62/107,704, filed Jan. 26, 2015, all of which are incorporated herein by reference.

BACKGROUND OF THE INVENTION

1. Field of the Invention

The present invention relates generally to an accessory holder for a vehicle, and more specifically to an accessory holder for connecting to a gimbal or as graph mount mounted to a marine vehicle or to any other structure or vehicle.

2. Description of the Related Art

It is often desired to connect accessories, such as cameras, to structures or vehicles. Users often have to purchase unique mounts for different surfaces and vehicles. As an example, many boating enthusiasts, from professional bass fisherman such as Randy Howell, to extreme water sport performers, desire to record their sporting feats using cameras such as GoPro® cameras manufactured by GoPro, Inc. of San Mateo, California and other action cameras. Other more casual boating enthusiasts, such as Roger Corley, may wish to similarly record family activities, charge mobile computing devices, or otherwise provide power to accessories or method of attachment for accessories while on a marine vessel.

Most fishing boats already use graphs, also known as fish-finders, which are typically mounted to the boat near the steering assembly using a graph mount. This is a common place for the person piloting the boat to be located most of the time in order to both drive the boat and to monitor the graph.

What is needed is a mounting solution for mobile devices, including smart phones, cameras, and other electronic devices consumers may want aboard, which is compatible for mounting non-electronic accessories also, and further which is compatible with virtually all graph mounts, which offers flexibility and versatility for multiple water sports and activities.

What is further needed beyond this limited example is a universal accessory mount for use with any structure or vehicle.

Heretofore there has not been available a bolt-on accessory connector with the advantages and features of the present invention.

SUMMARY OF THE INVENTION

The present invention generally provides an accessory connector for use in connection an accessory, such as a camera, to a structure. This could include tree stands, turkey tents, golf carts, all-terrain vehicles, snowmobiles, kayaks, marine, and land vehicles. Any physical structure could receive the bolt-on accessory connector.

In one example, the present invention provides an accessory connector for universally mounting to a graph mount within a fishing boat or other marine vehicle. A monopod can be connected to the accessory connector at one of multiple connection points. This monopod can deploy a camera or other accessory at its other end. The accessory connector has several faces, providing flexibility for which direction the accessory is mounted via the monopod. The monopod may be fitted with extendable, bendable arms for mounting additional cameras or other devices or for providing additional accessories.

BRIEF DESCRIPTION OF THE DRAWINGS

The drawings constitute a part of this specification and include exemplary embodiments of the present invention illustrating various objects and features thereof.

FIG. 2 is a detailed isometric view thereof, taken about the circle on FIG. 1.

FIG. 15A is a diagrammatic elevational view thereof, showing two elements being connected.

FIG. 15B is a diagrammatic elevational view thereof, wherein the two elements of FIG. 15A are connected.

FIG. 33 is a three-dimensional isometric view of another alternative embodiment of the present invention shown in relation to a preferred environment of a boat.

FIG. 60 is a right side elevational view of a slightly alternative embodiment of the present invention using a mounting plate to mount the accessory connector to the graph mount.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate.

Additional examples including a mobile smart device including a display device for viewing a typical web browser or user interface will be commonly referred to throughout the following description. The type of device, computer, display, or user interface may vary when practicing an embodiment of the present invention. Said terminology will include the words specifically mentioned, derivatives thereof and words of similar meaning.

Power providing inputs in the embodiment of the invention may encompass any format of Uniform Serial Bus (USB) input, 12V input, or any other type of power adapter. However, the embodiment of the present invention is intended only to be inserted into the navigation light port located on a marine vessel. The marine vessel applies to any type of boat, ship, or any other waterborne vessel which encompasses a navigation light port. A standard navigation light port is considered to be a port on a marine vessel which is required by the International Regulations for Preventing Collisions at Sea.

II. Preferred Embodiment Marine Monopod System 2

Figure 1:
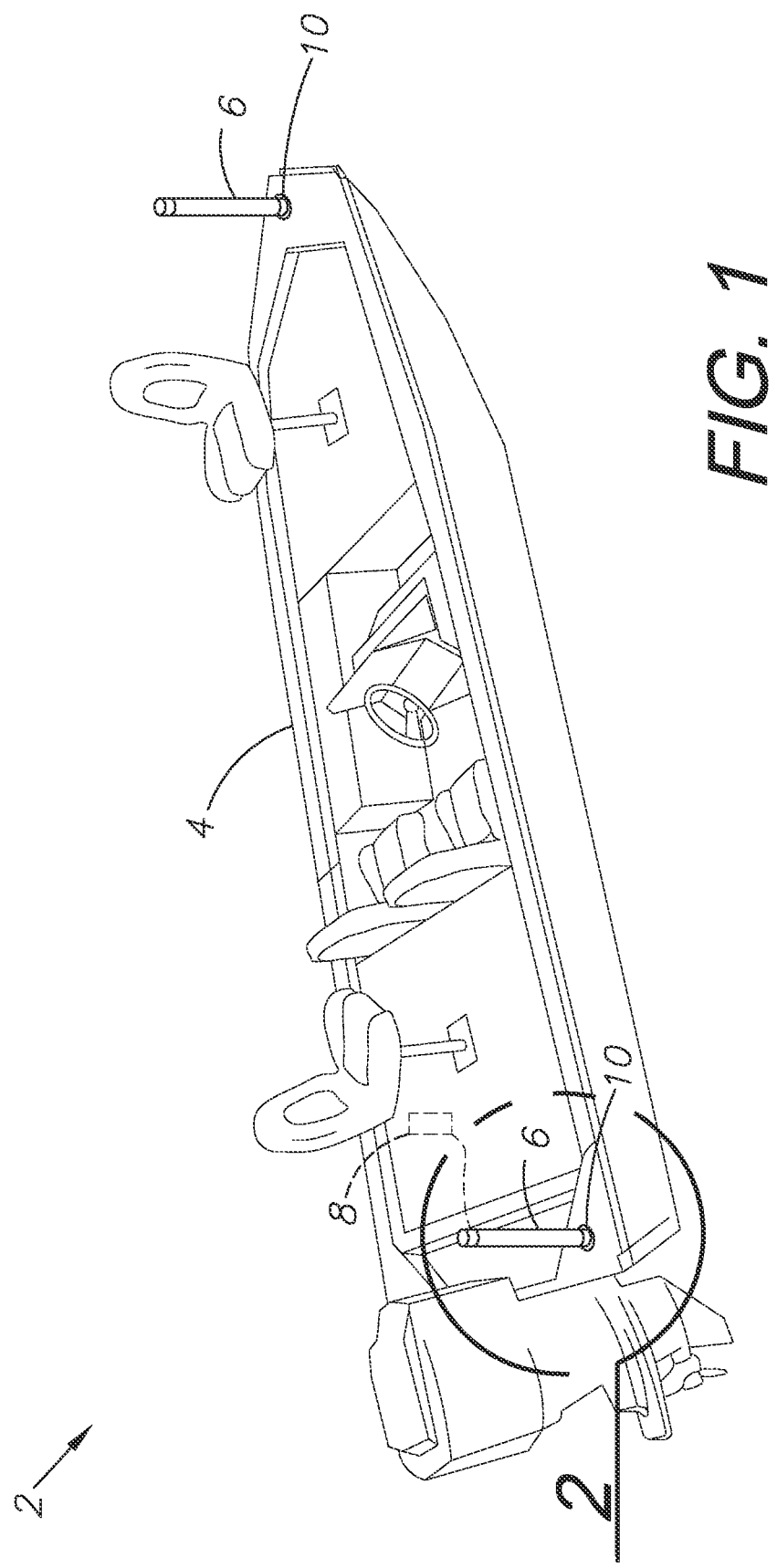
FIG. 1 is an isometric view of an embodiment of the present invention located in a typical environment in which it may be deployed, herein depicted as a bass fishing boat.

Referring to the figures in more detail, FIG. 1 shows a marine vessel 4 employing a marine monopod system 2. The monopod system 2 includes a monopod 6 which is inserted into a navigation light power port 10 and draws power from the port for electronic devices 8, such as smart phones, cameras, global positioning system (GPS) devices, and other mobile electronic devices. Note that a second navigation light power port 10 is located at the front of the vessel 4, which may accommodate a second monopod 6. Other ports may be located in other locations around the vessel.

Figure 3A:
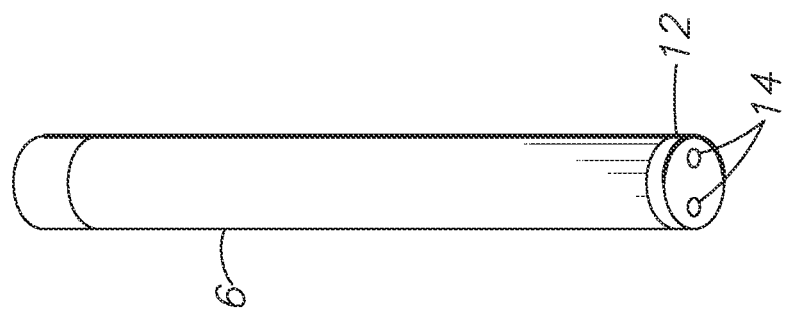
FIG. 3A is an isometric view from the base of an embodiment of the present invention.
Figure 3B:
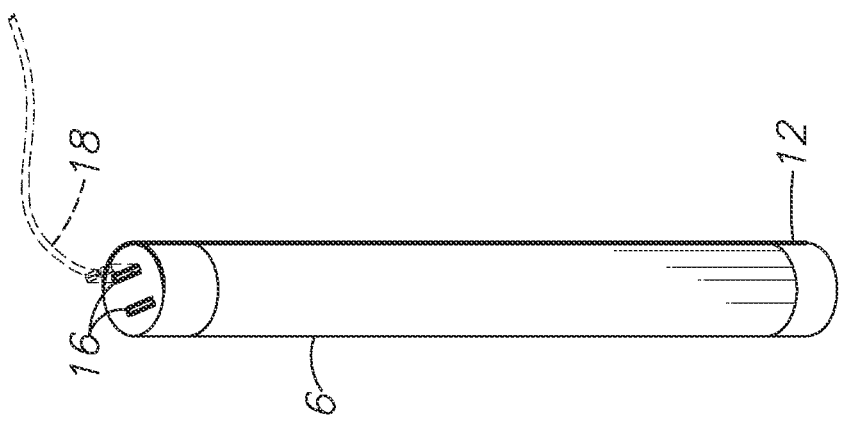
FIG. 3B is an isometric view from the top thereof.

FIG. 2 shows a closer view of the monopod 6 being inserted into the power port 10. FIGS. 3A and 3B show more detail of the monopod 6. This embodiment includes a monopod base 12 with contacts 14 for drawing power from the power port 10. A pair of Universal Serial Bus (USB) ports 16 are shown on the top portion of the monopod. Cables 18 for charging mobile devices may be inserted into these ports, and power is drawn from the power port 10. Other types of power adapters, such as 12V adapters, may be used instead of USB ports.

Figure 4:
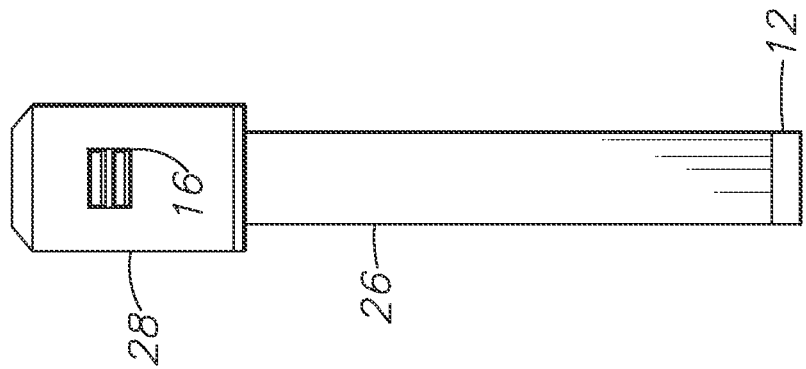
FIG. 4 is a front elevational view of an alternative embodiment thereof.

FIG. 4 shows an alternative embodiment monopod 26 which includes a head portion 28 with the USB ports 16 mounted on one or more sides of the head portion.

III. Alternative Embodiment Marine Monopod System 52

Figure 5:
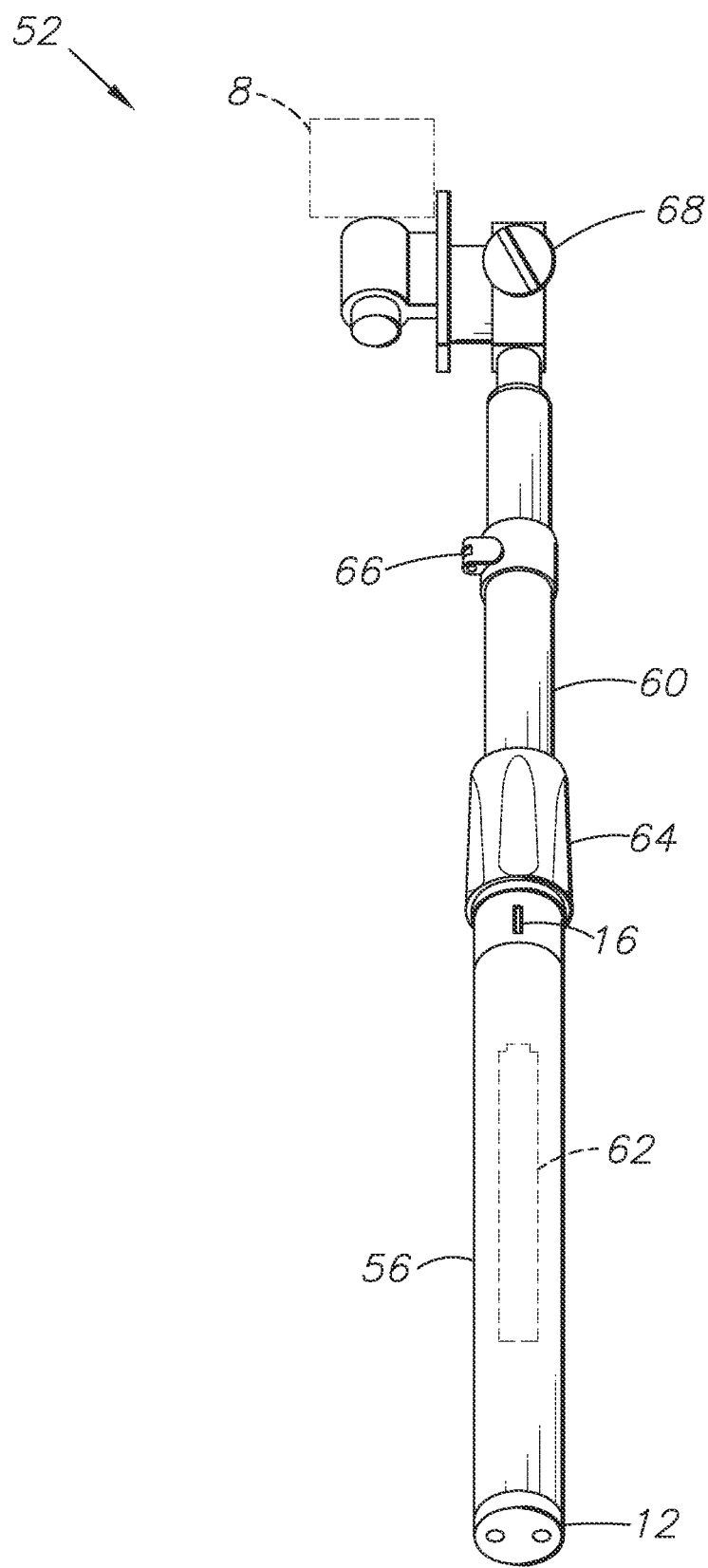
FIG. 5 is an isometric view of another embodiment of the present invention.

FIG. 5 shows an alternative marine monopod system 52 which uses a base monopod 56 with a telescoping arm 60 capable of extending a few inches or several feet above or away from the marine vessel. The monopod 56 includes the same base 12 for connecting with the navigation light port 10 and at least one USB port 16 for powering an accessory 8. Here, it is likely that the accessory is a camera for capturing video images, but the accessory could be any electronic device.

The telescoping arm 60 may be connected to the base monopod 56 with an adjustable handle 64 which tightens or loosens to allow telescoping of the arm 60. Other means may be employed which allow the arm to telescope. A second telescoping motion may be employed by releasing a locking device 66 at a second point along the arm 60. This locking device as shown can be quickly unlocked or locked using one finger.

The base monopod 56 may include a rechargeable battery 62, allowing the monopod to power or charge a device 8 even when it is not inserted into the navigational light port 10. An accessory mount 68, such as the screw-based camera mount shown here, may be connected to the top of the telescoping arm 60.

IV. Alternative Embodiment Monopod System 102

Figure 6:
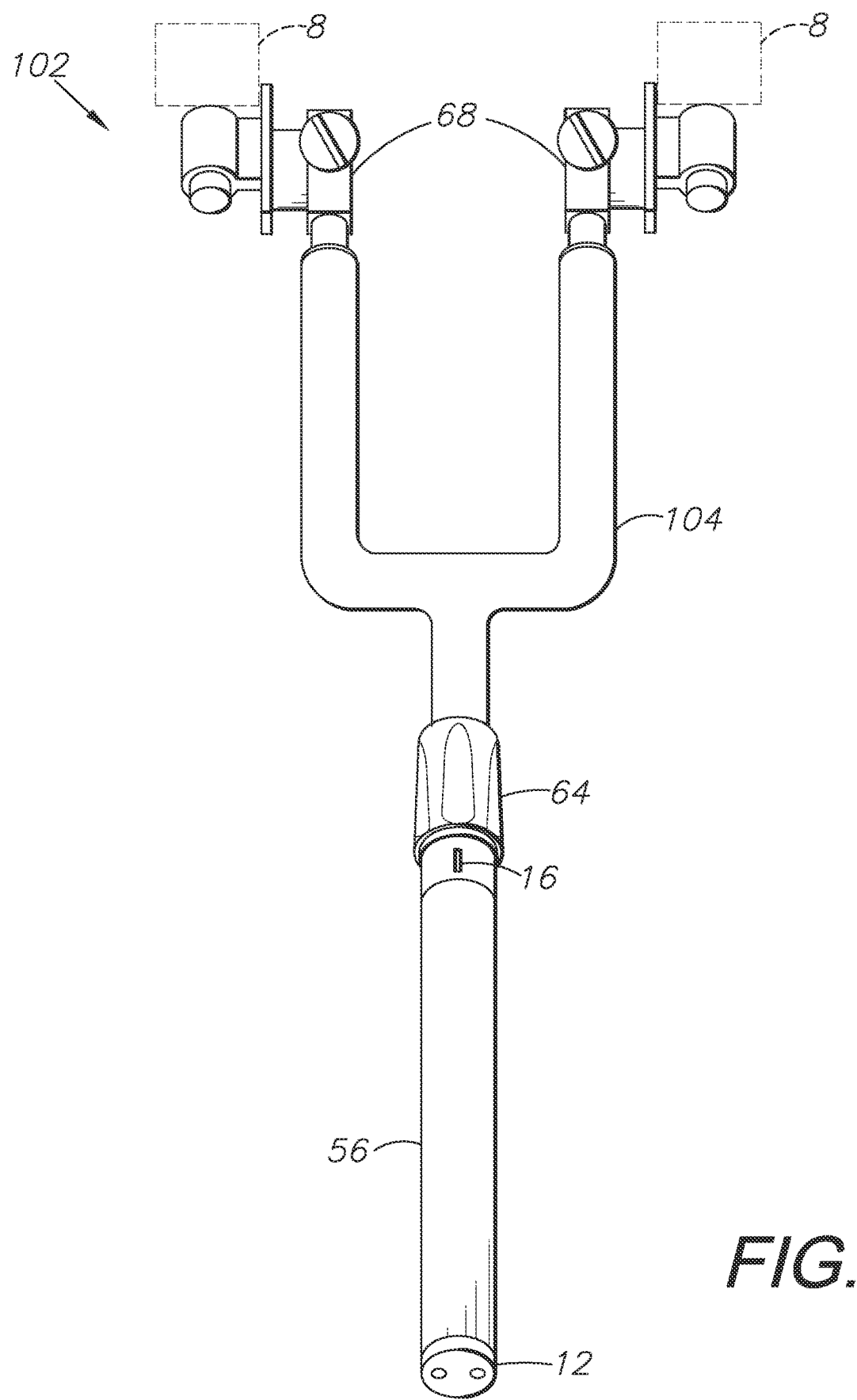
FIG. 6 is an isometric view of yet another embodiment of the present invention.

FIG. 6 employs many of the same features as the system 52 described above, but instead of the telescoping arm 60 of system 52, this system employs a forked arm 104 which is connected to the base monopod 56, and which allows for two devices to be connected to the same monopod system 102. In this way, one camera could face forward while the other faces away. Alternatively, two devices could charge simultaneously while being used.

V. Alternative Embodiment Monopod System 152

Figure 7:
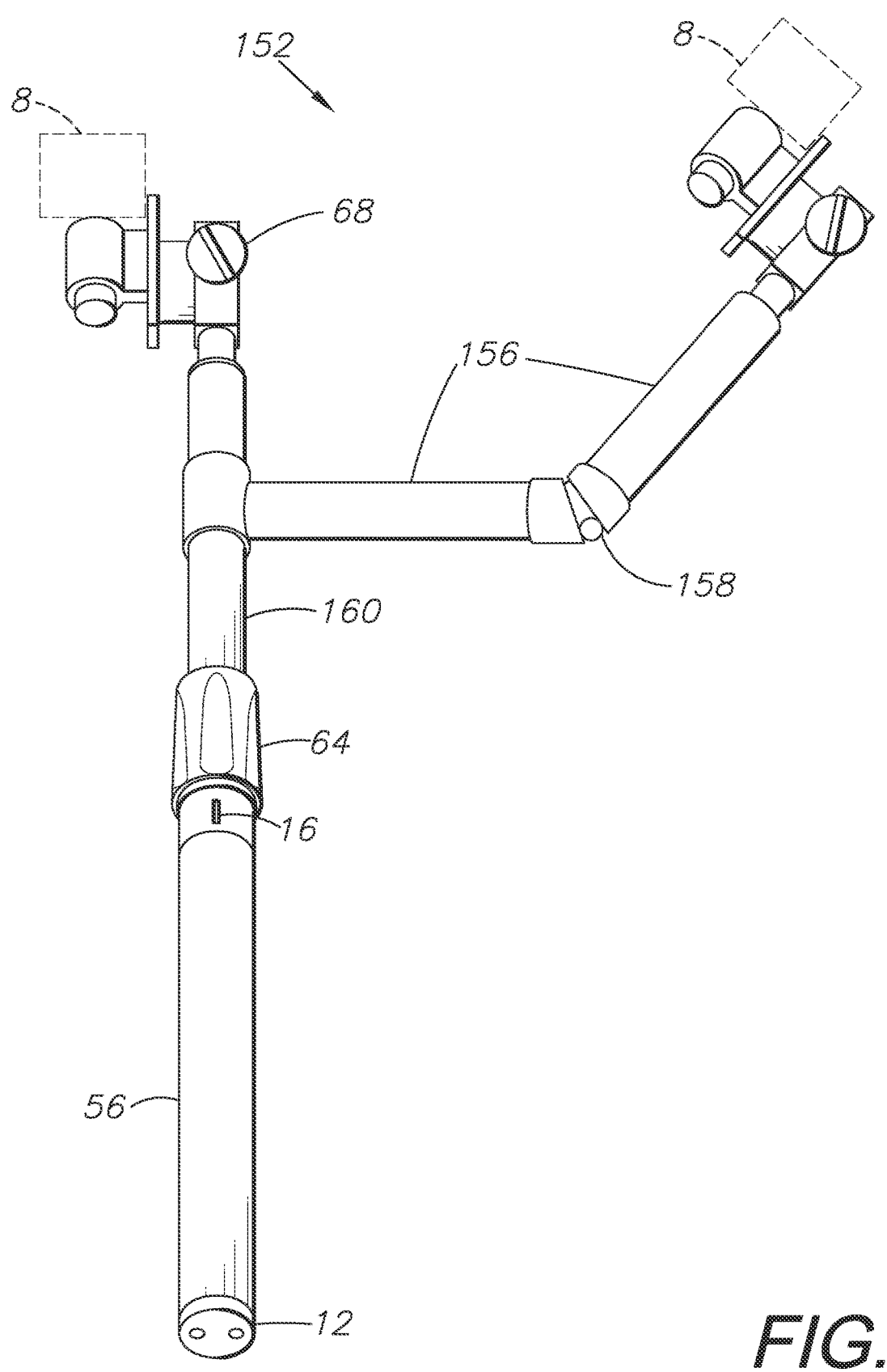
FIG. 7 is an isometric view of yet another embodiment of the present invention.

FIG. 7 shows an alternative embodiment monopod system 152 which uses the same base monopod 56 setup as systems 52 and 102, but which includes a telescoping arm 160 which allows an extension arm 156 to connect to the telescoping arm 160, either using a clip, a connecting ring, or some other connecting device. The extension arm 156 may culminate at an elbow 158, which may connect to a second extension arm 156 as shown. This type of connection could occur several times. It is important that the elbow 158 contain significant resistance against being bent such that the arms 156 retain any angle they are set at. This allows for dynamic camera angles using cameras as the electrical accessories. For example, in a boat, the extension arm 156 could place a camera close to the water as the boat moves through the water, while the other camera is placed far above the boat. The two cameras would capture video simultaneously.

Additional extension arms may be placed for two, three, four, or more camera angles.

Figure 8:
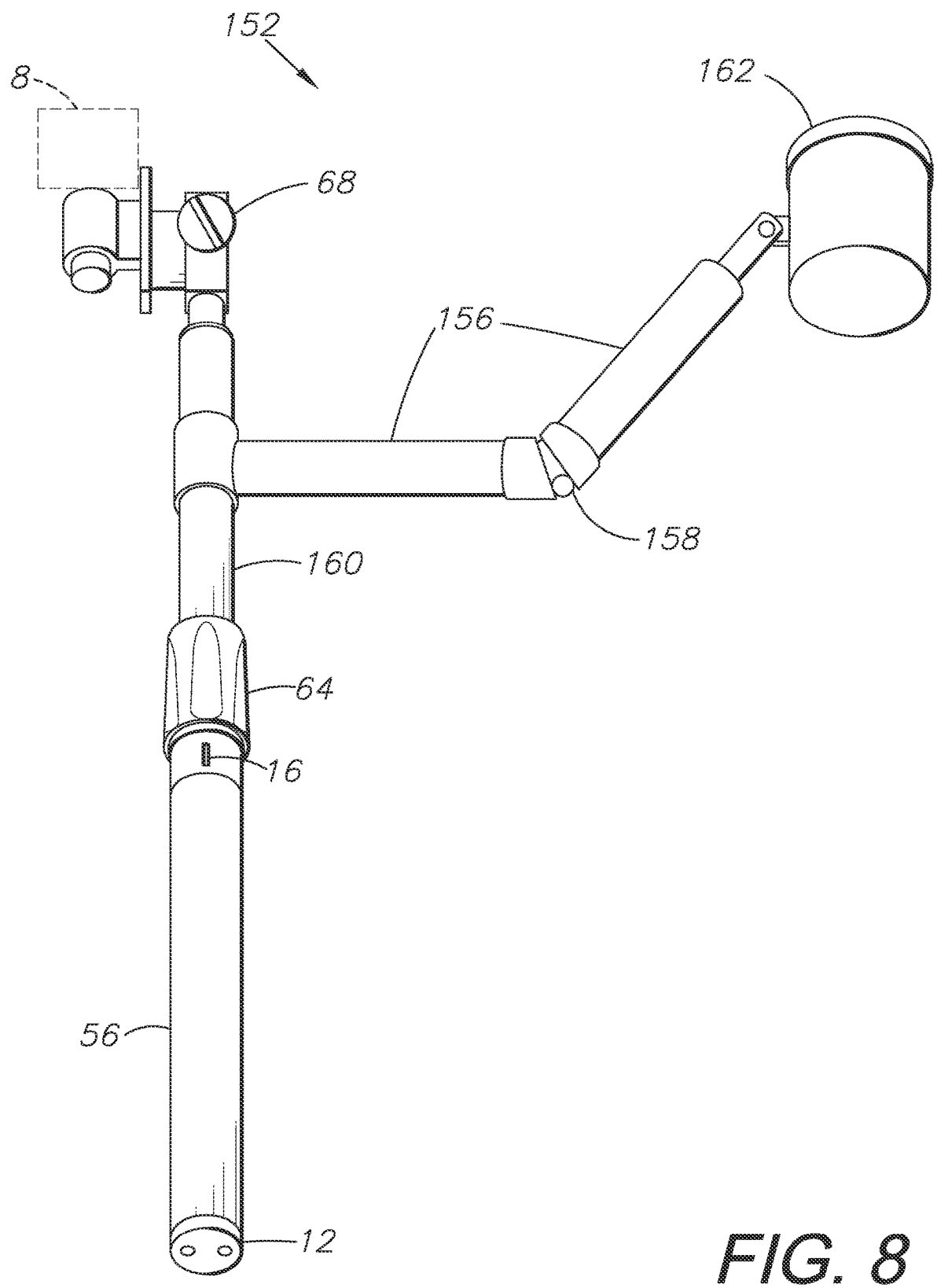
FIG. 8 is an alternative isometric view thereof, showing a cup holder accessory.
Figure 9:
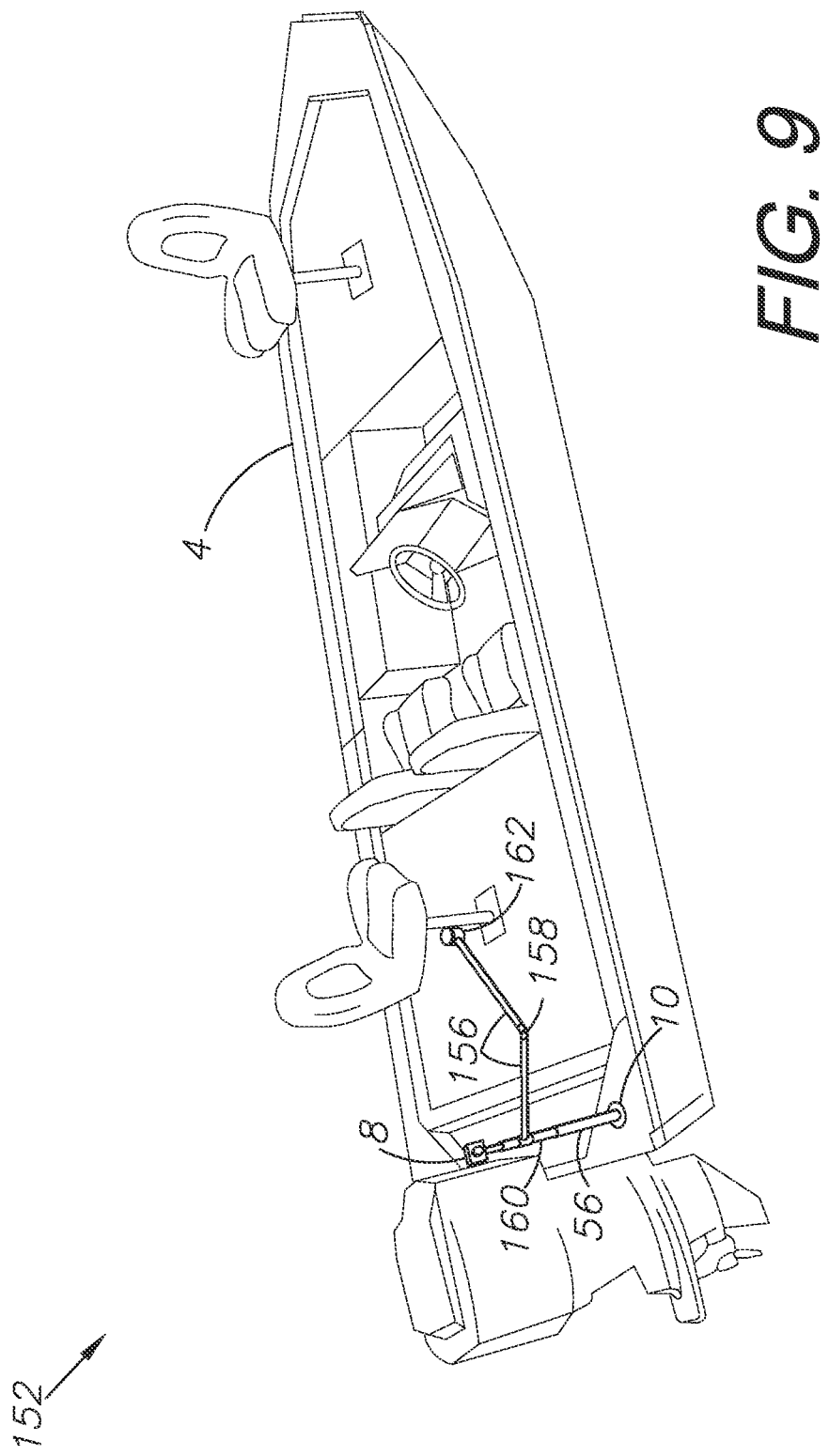
FIG. 9 is an isometric view of the embodiment of FIG. 8 located in a typical environment in which it may be deployed, herein depicted as a bass fishing boat.

Alternatively, as shown in FIG. 8, the accessory may instead be a cup holder 162. It is common for bass fishing boats or older boats to lack sufficient space to store drinks, especially when a fisherman is in the fishing seat. FIG. 9 shows how the arm can be positioned to provide a cup holder to the fisherman while a camera is still filming from atop the telescoping arm 160.

VI. Alternative Embodiment Monopod System 202

Figure 10B:
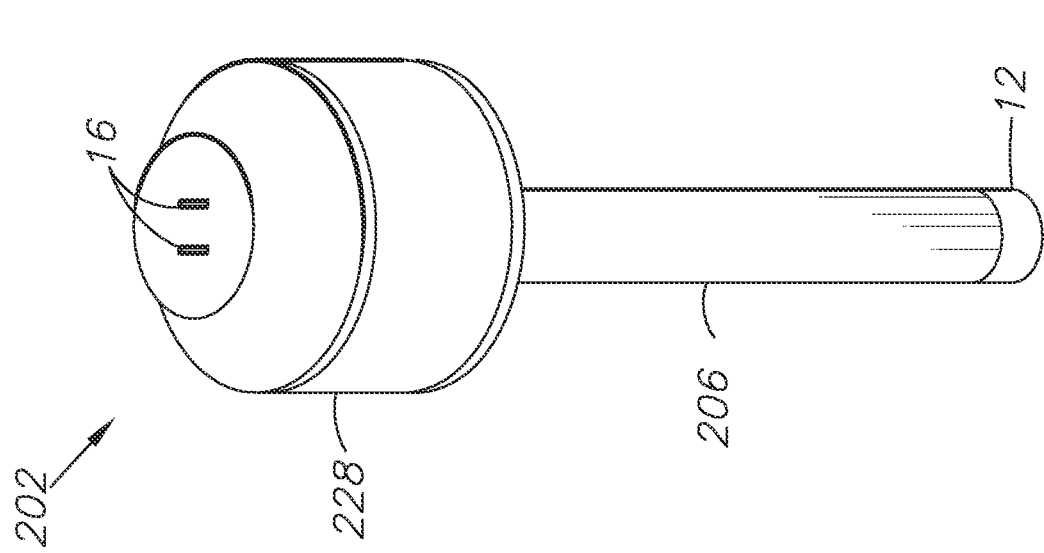
FIG. 10B is an isometric view from the top thereof.
Figure 10A:
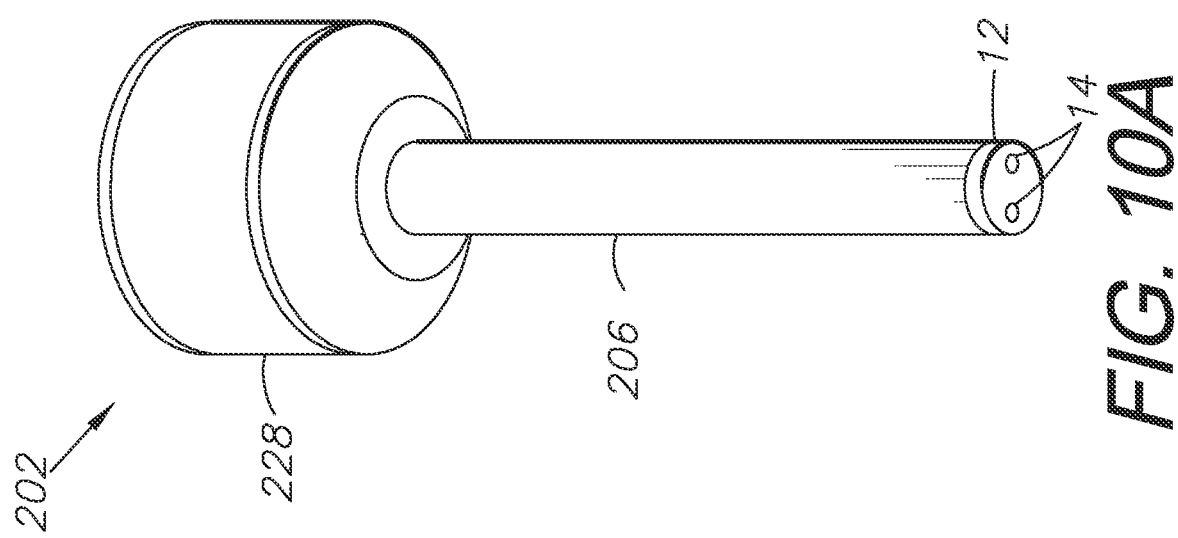
FIG. 10A is an isometric view from the base of yet another alternative embodiment of the present invention.

FIGS. 10A and 10B employ a monopod 206 which includes a basic navigational lamp 228 atop the monopod 206. As shown, two USB ports 16 are located atop the lamp. However, the USB ports could be placed along the sides of the monopod 206, and an accessory mount, such as those shown in FIGS. 5-8 above, may be placed atop the lamp. This would allow for a camera to be mounted to the navigational lamp and filming to take place even while the navigational light is in use or at night.

It should be noted that any and all commercial electronic devices could benefit from the present invention. GPS devices, fish finders, and tablet computers would be at the fisherman's fingertips using one or more of the embodiments of the present invention without the fisherman leaving the fishing chair.

VII. Wireless Power Source Monopod System 302

Figure 11:
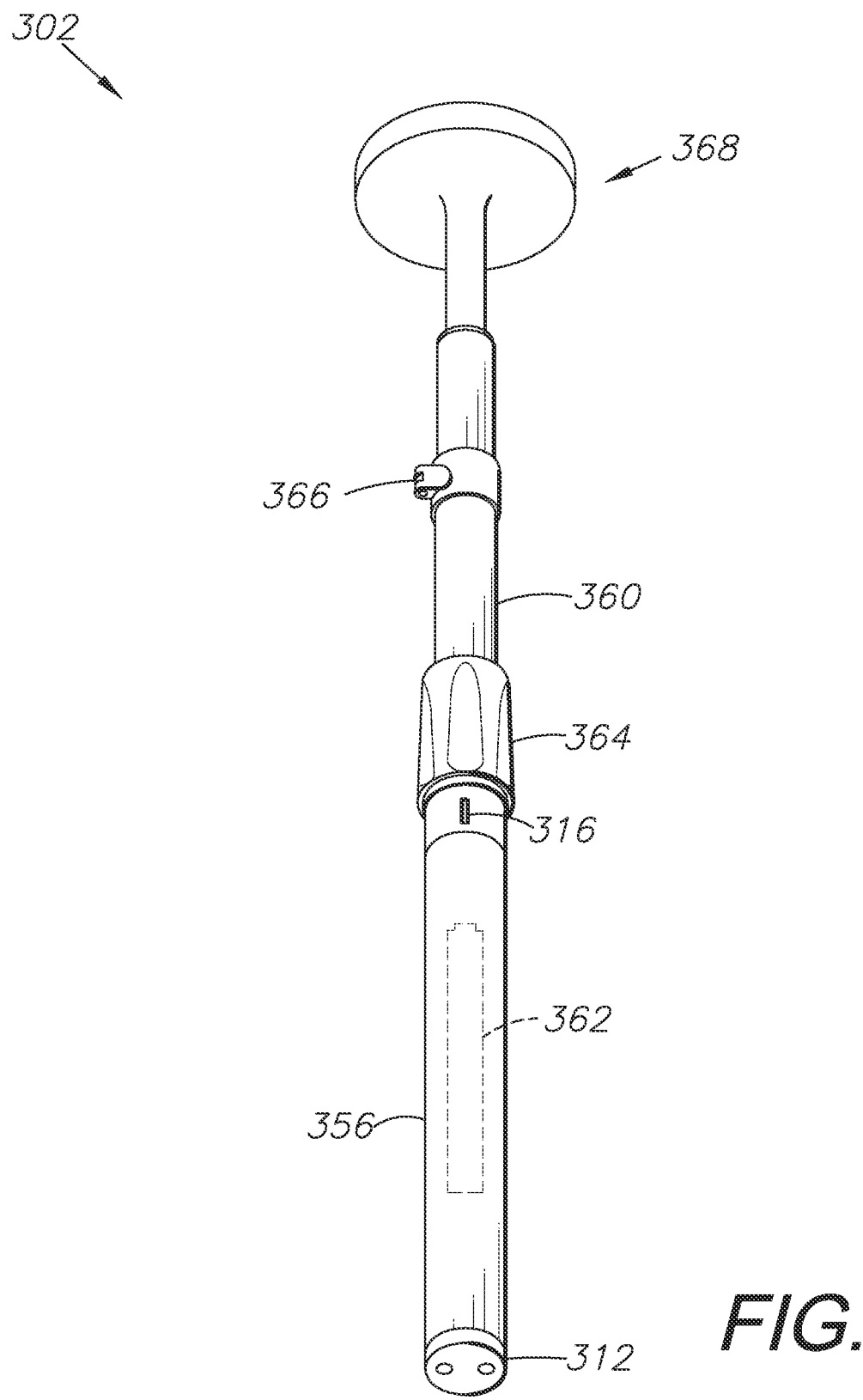
FIG. 11 is a bottom-up isometric view of an alternative embodiment of the present invention.
Figure 12:
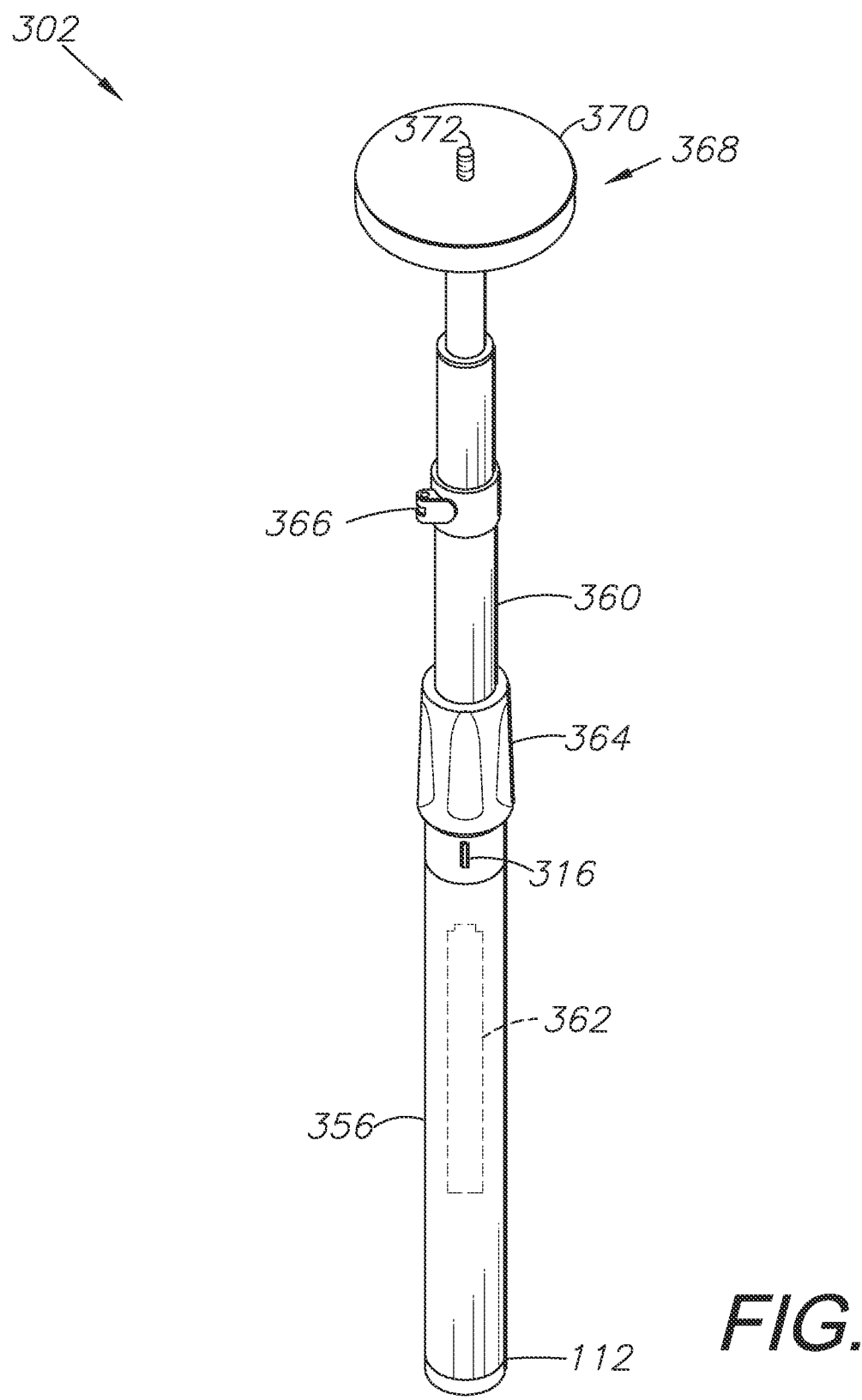
FIG. 12 is a top-down isometric view thereof.

FIGS. 11-15B show another alternative embodiment system which includes wireless power for powering an electrical accessory, such as a camera as discussed above. As shown in FIGS. 11-12, a monopod 356 having a telescoping arm 360 includes a battery power source 362, a charging port 312 which may or may not interface with a navigation light port of a watercraft, and locking elements 366 for locking the telescoping arm 360 at various lengths. The monopod may or may not include a USB port 316 or other port for charging of electrical accessories. A preferred embodiment may include an adjustable handle 364 for extending and retracting the telescoping arm 360.

This embodiment also includes a wireless power delivery system 368 connected to the end of the telescoping arm 360. The primary features of this delivery system 368 are shown in FIG. 12 and include a base 370 and a mounting screw 372, such as typically used to mount cameras or camera cases to monopods or tripods.

Figure 14:
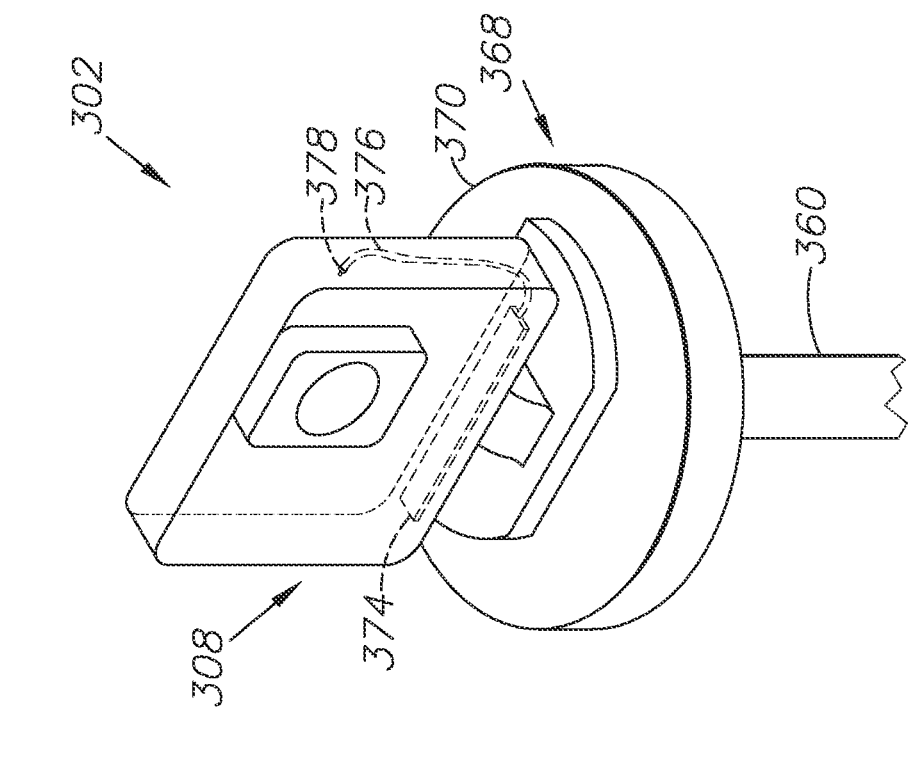
FIG. 14 is an isometric view indicating the connection of elements thereof.
Figure 13:
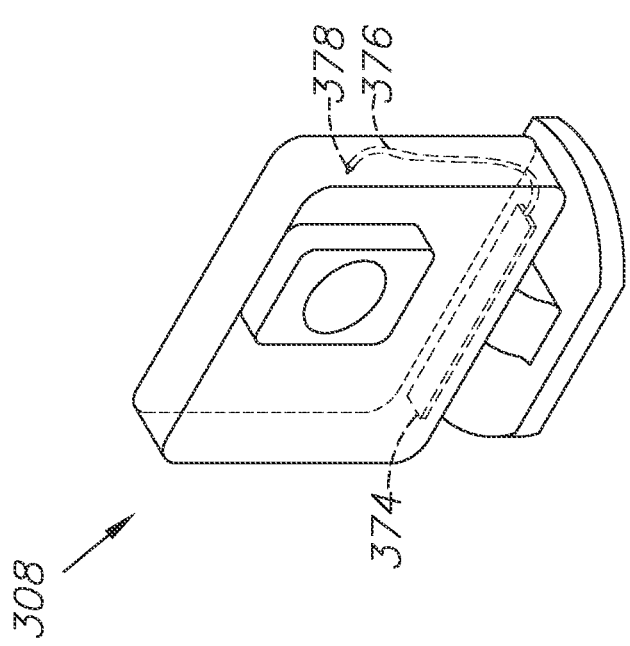
FIG. 13 is an isometric view of elements thereof.
Figure 16:
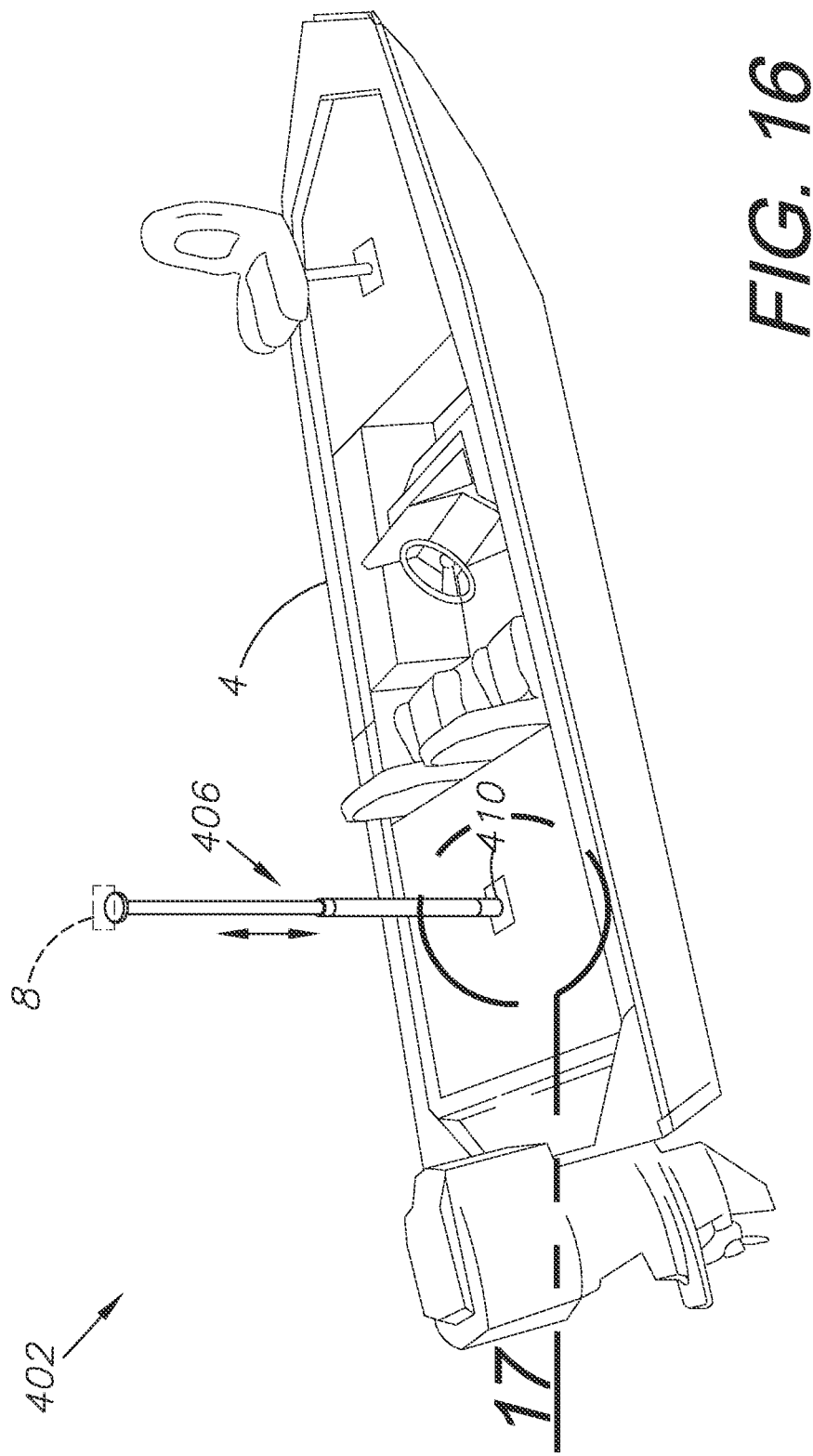
FIG. 16 is an isometric view of another alternative embodiment of the present invention located in a typical environment in which it may be deployed, herein depicted as a bass fishing boat.
Figure 17:
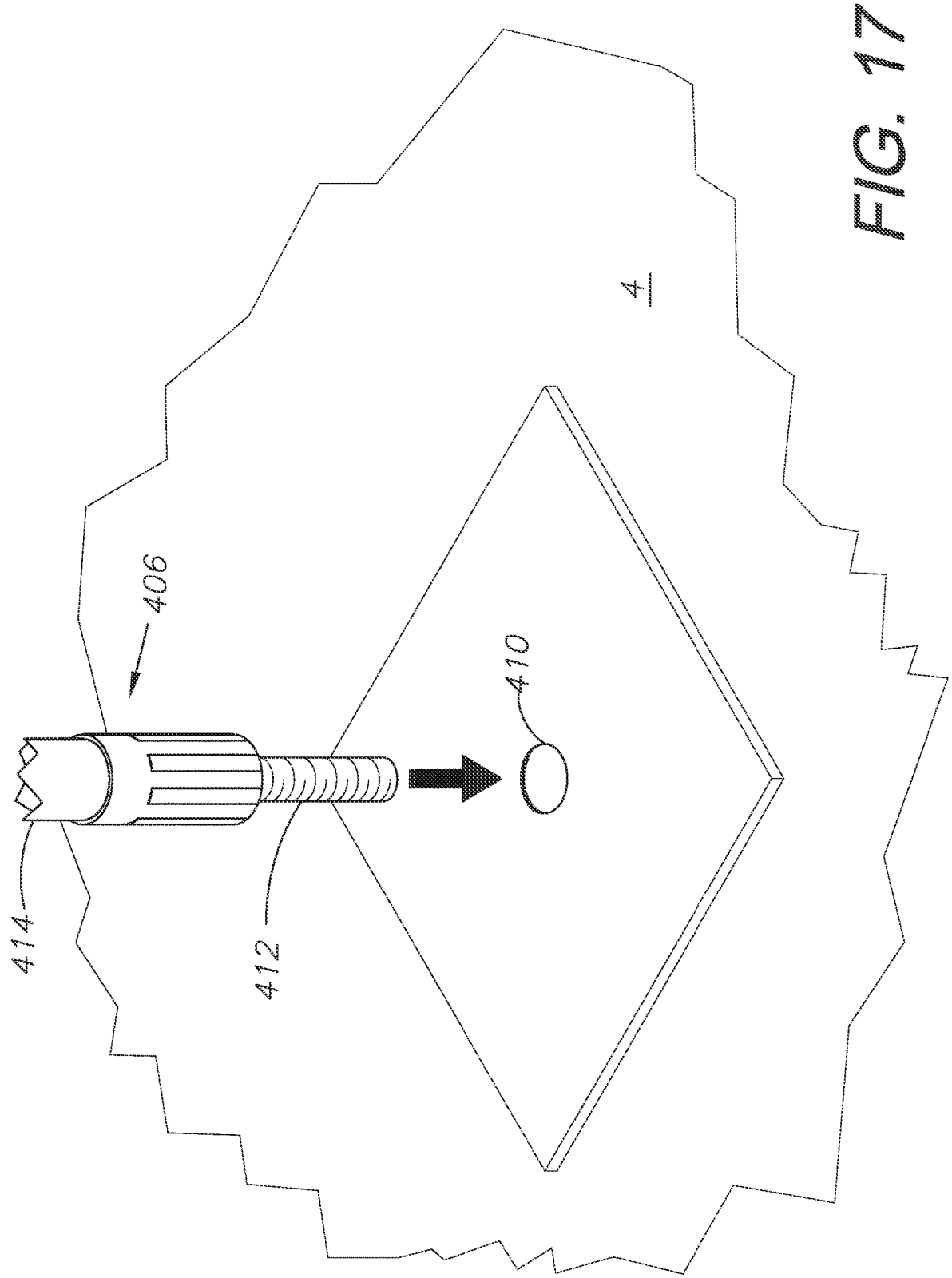
FIG. 17 is a detailed isometric view thereof, taken about the circle on FIG. 16.
Figure 18:
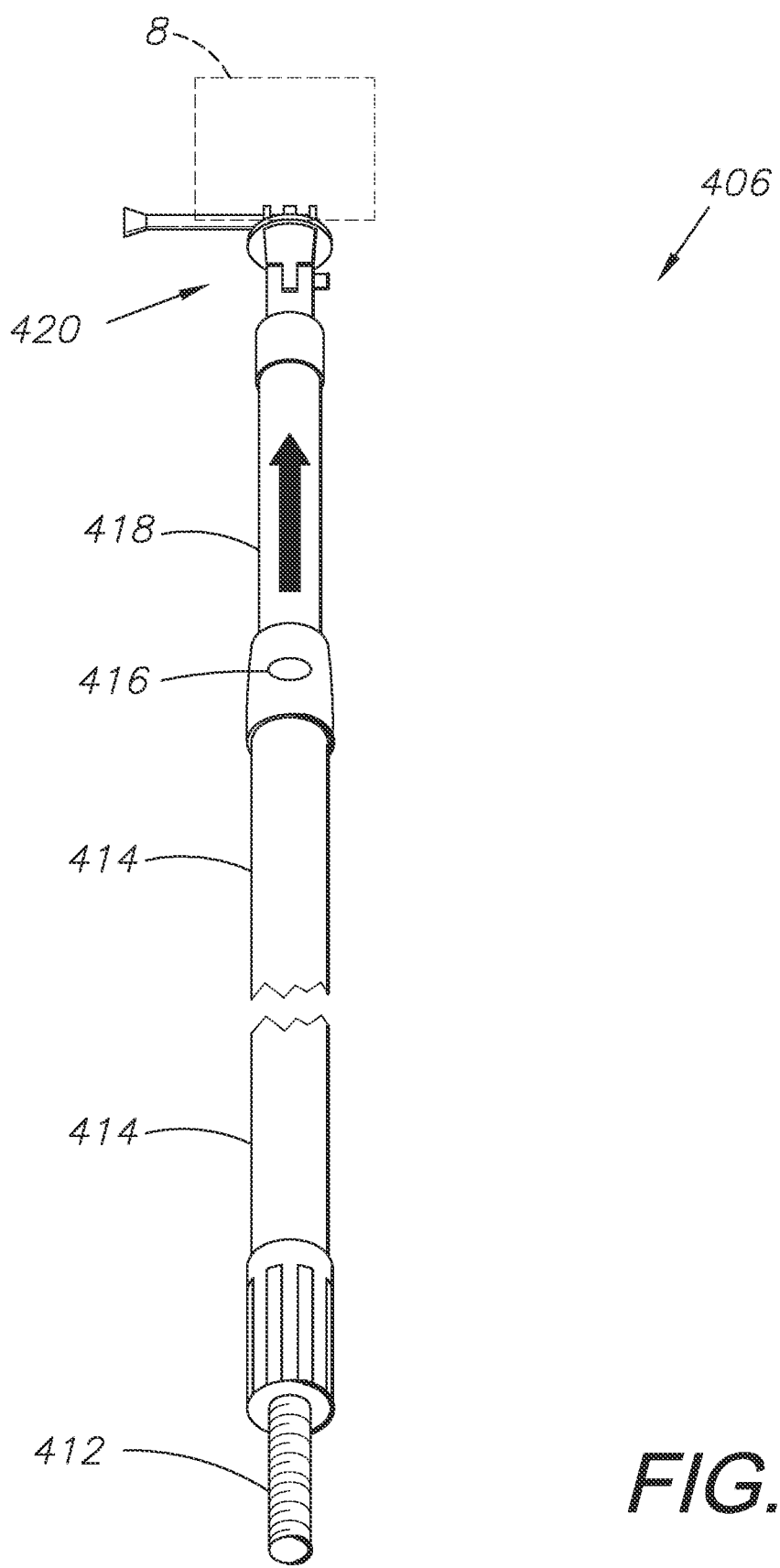
FIG. 18 is an isometric view from the base of the alternative embodiment thereof.
Figure 19:
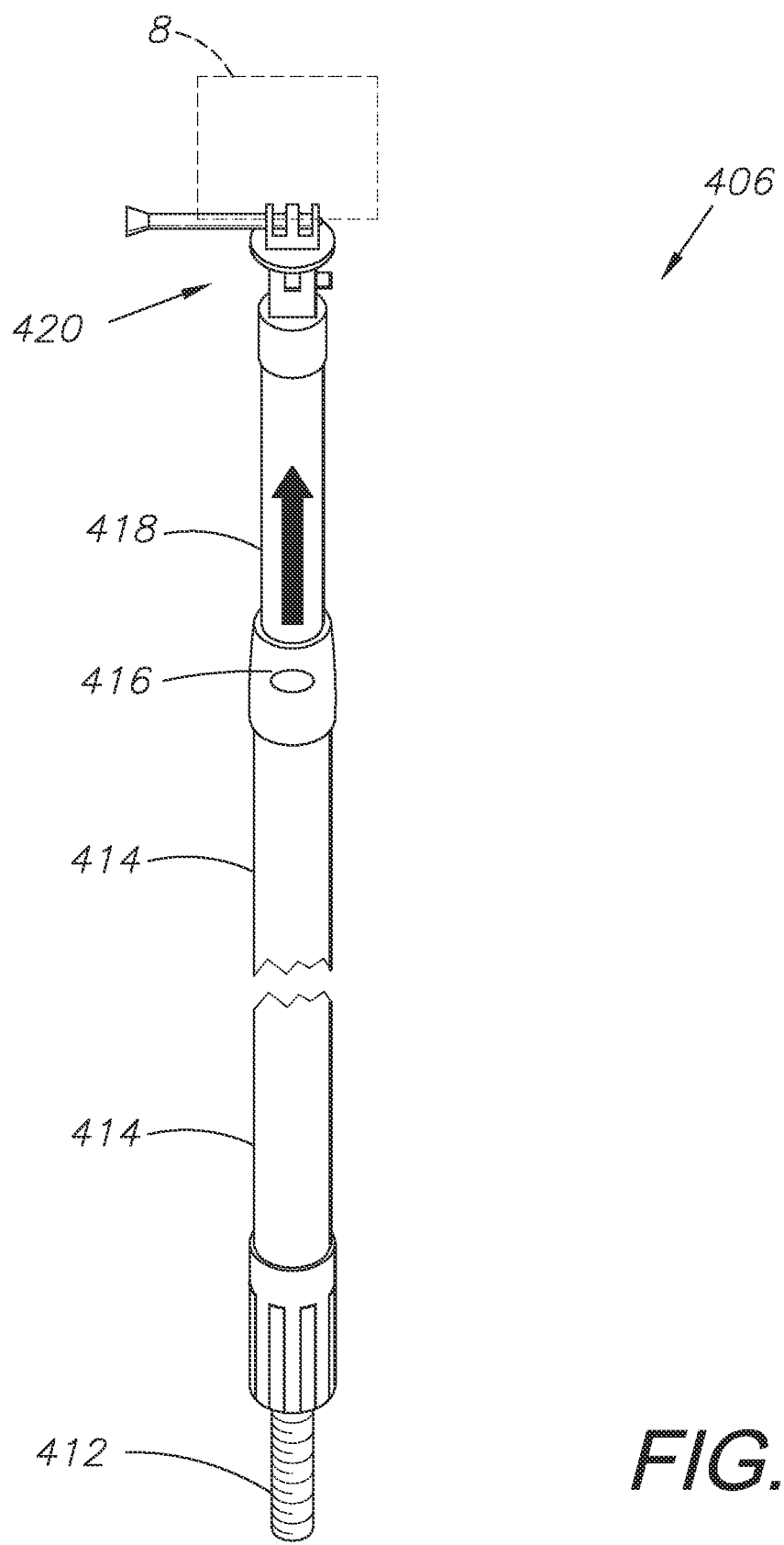
FIG. 19 is an isometric view from the top of the alternative embodiment thereof.

FIG. 13 shows a typical camera housing accessory 308 which would be used to house cameras, such as those disclosed above. The camera housing accessory 308 is designed to mount to the mounting screw 372 of the wireless power delivery system 368. A receiver strip 374 connects to the camera or other electrical accessory via a cord 376 and interface 378. FIG. 14 shows how the camera housing accessory 308 mounts to the base 370 of the wireless power delivery system. In a preferred embodiment the camera housing accessory 308 would be waterproof.

The wireless power delivery system 368 draws power from the battery source 362 of the monopod 356 as shown in FIG. 15A. The delivery system 368 delivers wireless power 380 in a limited range about the base 370, typically less than six inches from the base. As shown in FIG. 15B, when the accessory 308 is attached to the delivery system 368, the wireless power 380 is received by the receiver strip 374 and is delivered to the camera or other electrical accessory via the power cord 376 and interface 378. This wireless power then powers the electrical accessory when in use, and passively charges a battery associated with the electrical accessory, if any, when the accessory is not in use. It should be noted that any and all types of electrical accessories mentioned herein or otherwise requiring electrical power could utilize this arrangement of elements.

In an embodiment of this invention, an ergonomic handle may be located just beneath the wireless power delivery system 368, converting the monopod device into a walking or hiking stick.

VIII. Telescoping Monopod Seat-Mount System 402

FIGS. 16-19 show yet another alternative embodiment of the present invention. Here, as in previous embodiments, a telescoping monopod 406 is deployed in a boat 4 and is used to house a portable electronic accessory 8 such as a camera. The base 412 of the monopod 406 screws into or is otherwise inserted into a seat mount 410 within the deck of the boat 4. The base as shown is threaded, but may not necessarily be threaded.

The monopod 406 includes a bottom arm 414 and a top arm 418. The top arm 418 telescopes from within the bottom arm 414 and is released and/or locked via a release switch 416 or other similar feature. A mounting accessory 420 for mounting the portable electronic accessory 8.

The telescoping monopod 406 extends from approximately four feet (4') long to approximately eight feet (8') long or longer. This provide superior angles for filming action on the boat 4 using a camera mounted to the mounting accessory 420 at the top of the telescoping monopod 406.

Figure 20:
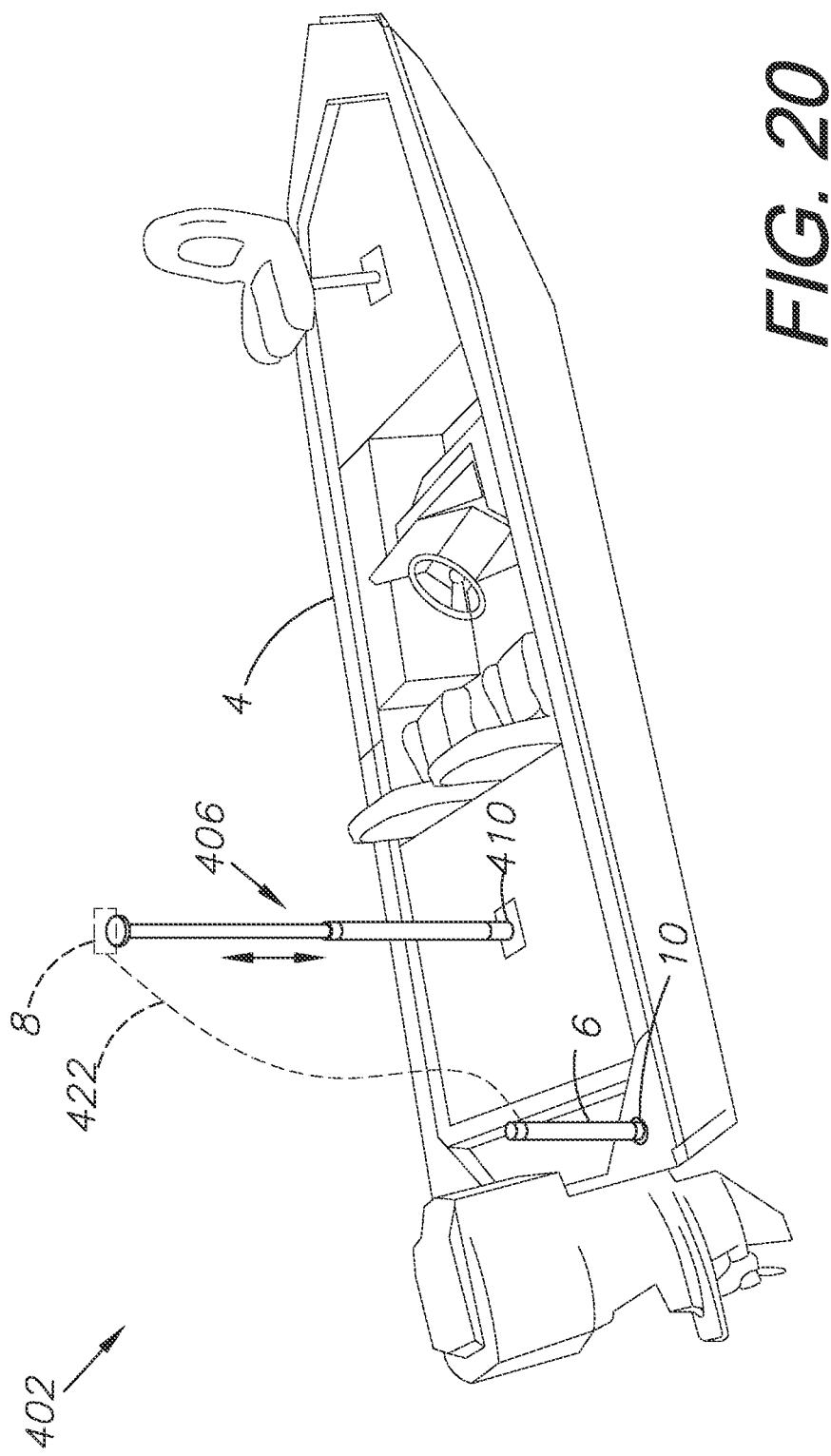
FIG. 20 is an isometric view thereof showing the embodiment interacting with the embodiment shown in FIG. 1.

FIG. 20 shows this embodiment telescoping monopod seat-mount system 402 interacting with the embodiment shown in FIG. 1, thereby providing electrical power for recharging and/or operating the portable electronic accessory 8 via a cord 422.

IX. Monopod Light Source System 502

Figure 21:
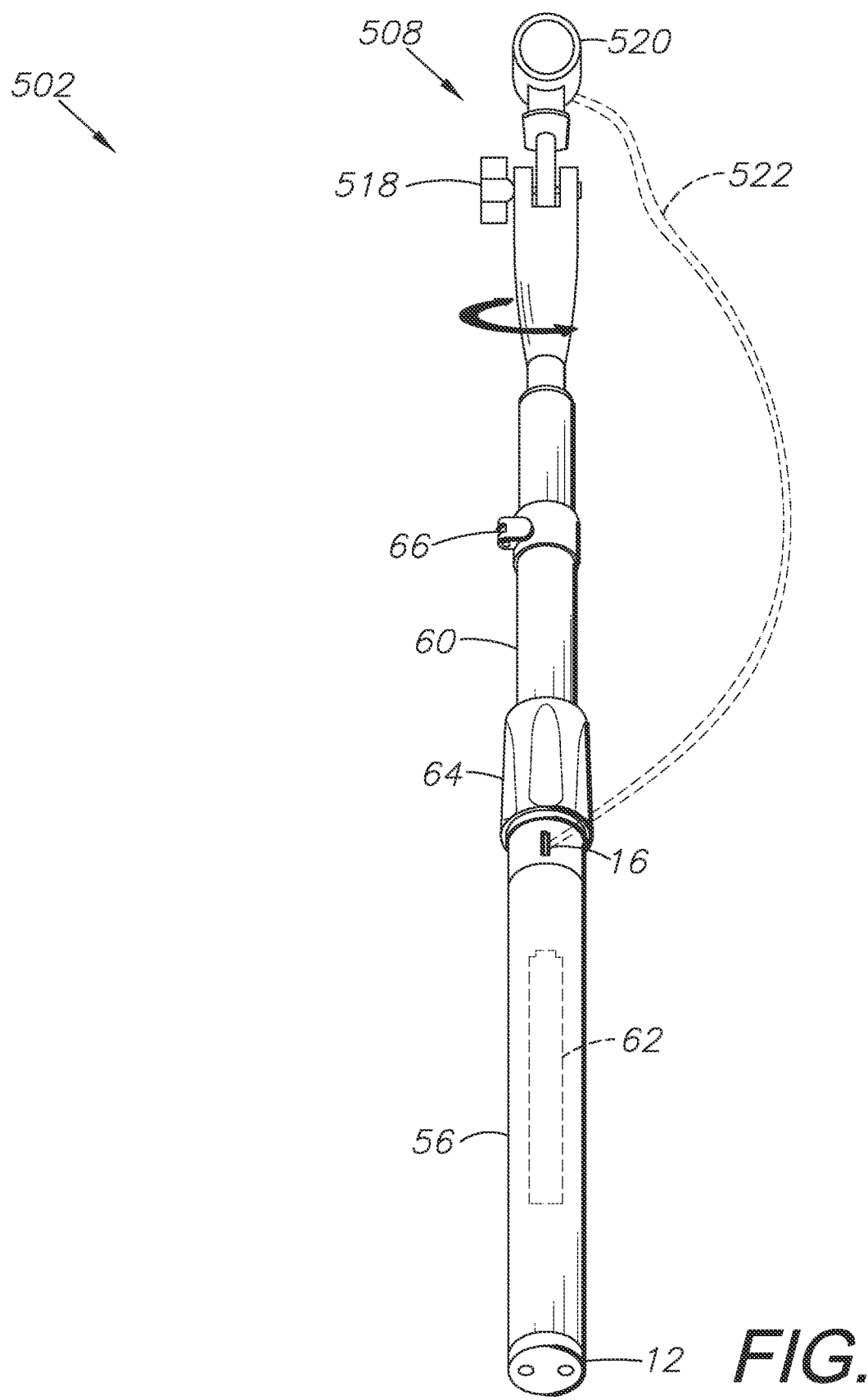
FIG. 21 is an isometric view of an alternative embodiment of the present invention including a light accessory.
Figure 22:
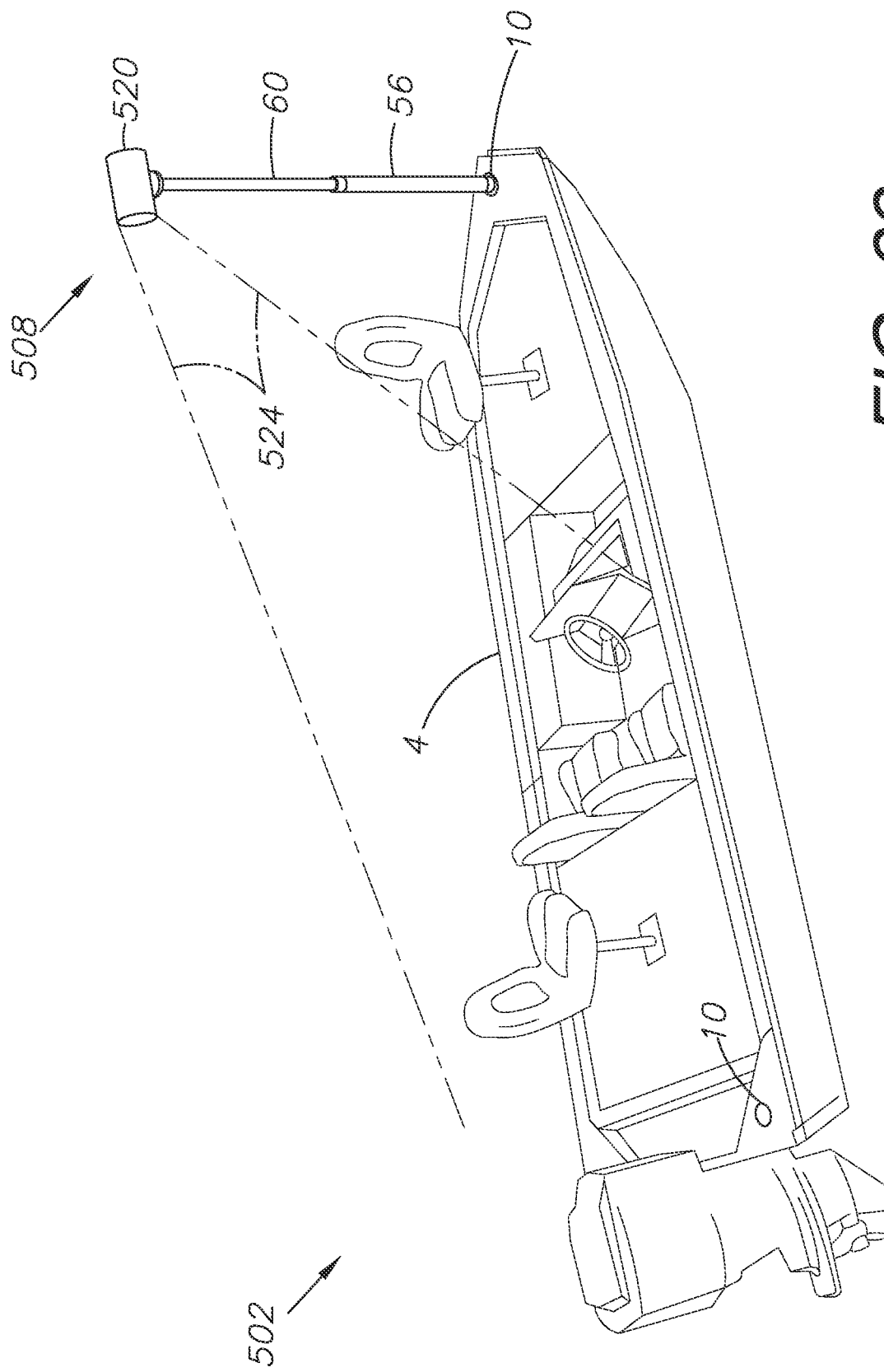
FIG. 22 is an isometric view thereof, showing the embodiment located in a typical environment in which it may be deployed, herein depicted as a bass fishing boat.

FIGS. 21 and 22 show yet another alternative embodiment of the present invention, featuring a telescoping monopod light source 502 which can be used with the embodiments discussed previously or in a stand-alone unit. As shown in FIGS. 21 and 22, the light source system 502 includes a light source accessory assembly 508 used in conjunction with the telescoping monopod of FIG. 5 discussed above.

The light source accessory assembly 508 includes a light source 520 and an adjustable mount 518 which may optionally be locked into a position or unlocked, allowing the light source 520 to be freely turned or pivoted to provide light 524 within a boat 4 or outside of the boat. This is advantageous for providing a spotlight into the boat while operating the boat at night, or for lighting up the waters around the boat. The light source 520 may be plugged into the power source socket 16 via a power cord 522, or may be powered by an internal battery. As shown in FIG. 22, the monopod may provide power to the light source accessory via the navigation light port 10 of the boat 4.

X. Alternative Monopod Light Source System 552

Figure 23:
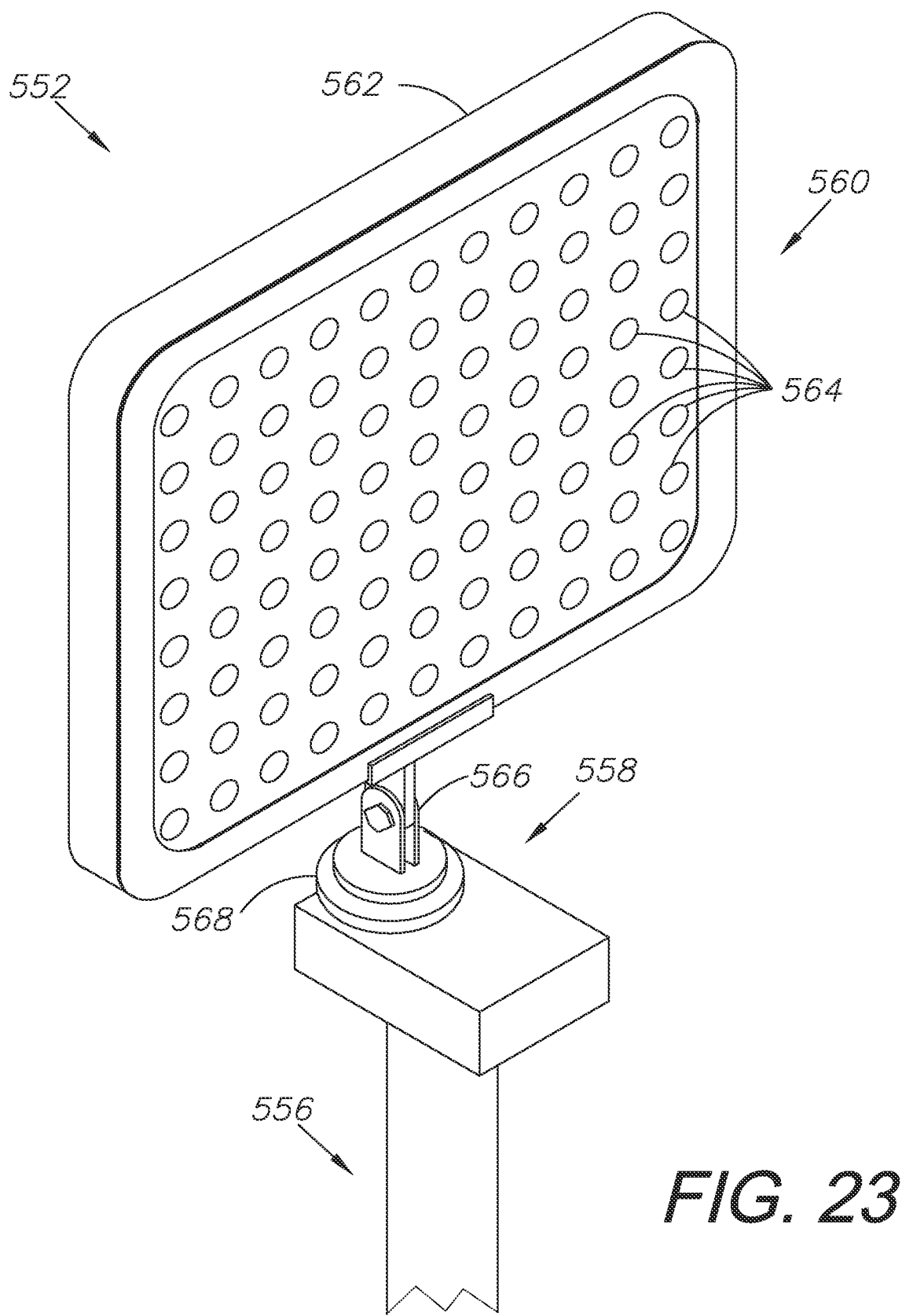
FIG. 23 is a three-dimensional isometric view of another alternative embodiment of the present invention including a light-emitting diode light panel.
Figure 24:
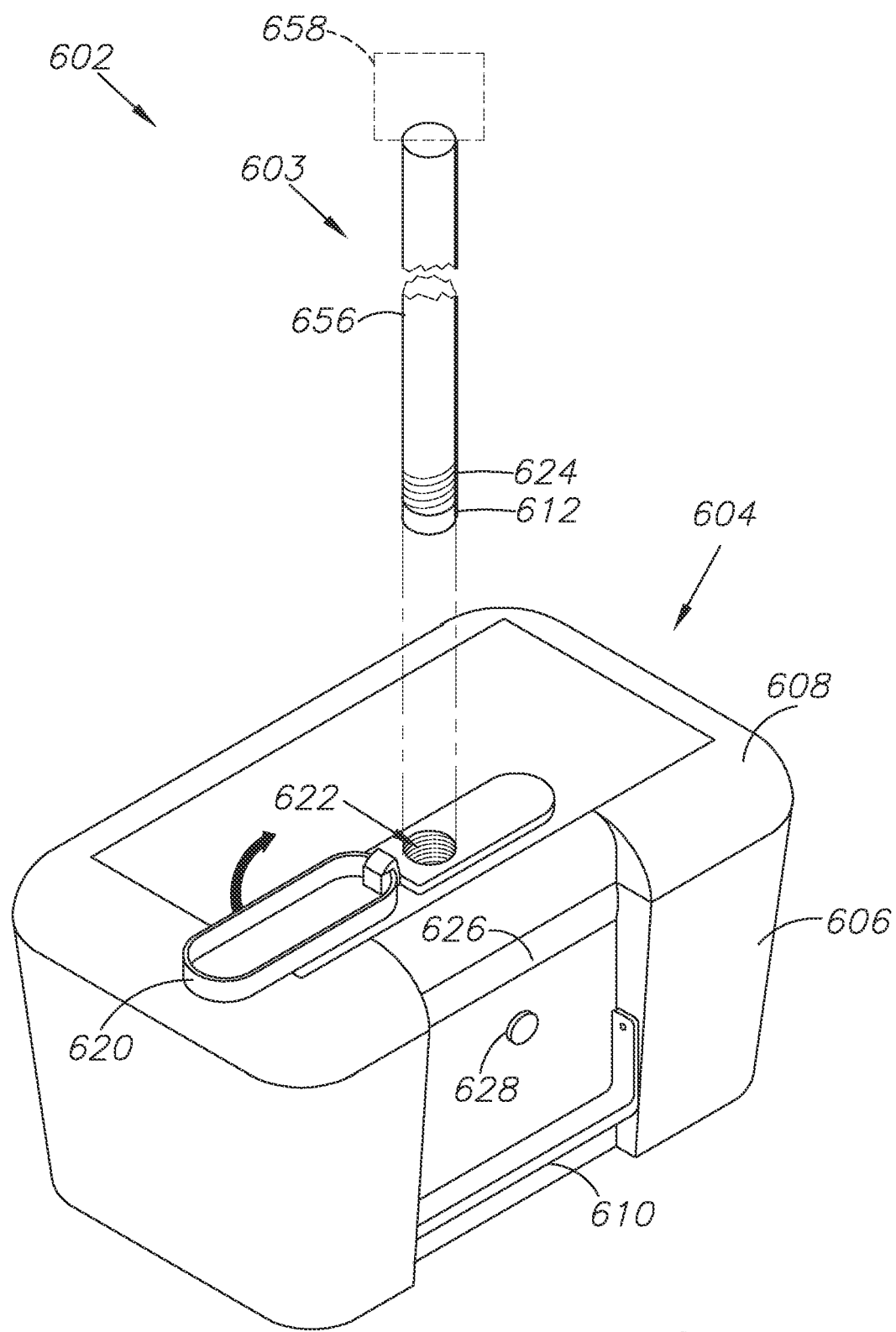
FIG. 24 is a three-dimensional isometric view of another alternative embodiment of the present invention showing a monopod in conjunction with a portable power box.
Figure 25:
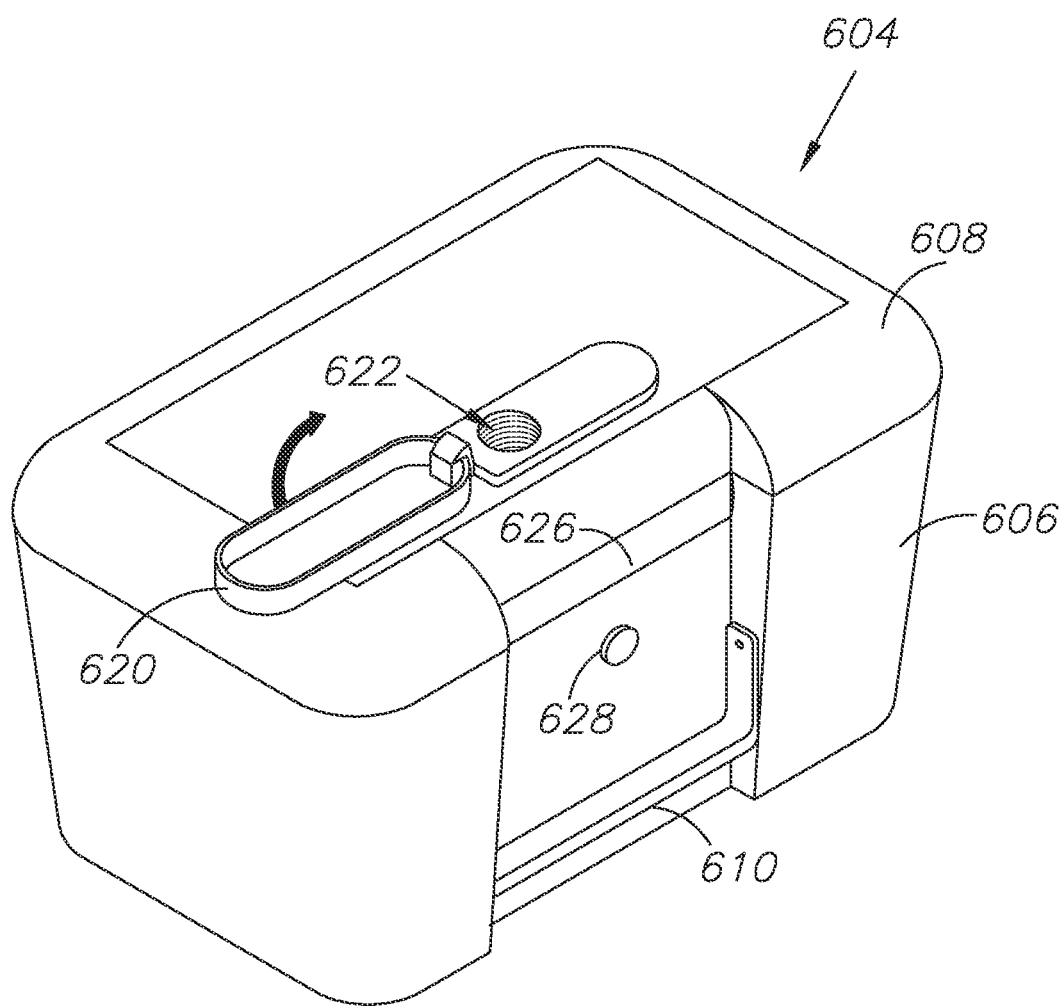
FIG. 25 is a three-dimensional isometric view of the portable power box thereof.

As shown in FIG. 23, a slightly alternative monopod light source system 552 employs a flat paneled light source 560 which includes a housing 562 and two faces. One or both faces could include one or more LEDs 564, which can be used to simply provide directional light or could be used to create an LED sign or signal for other boats in the vicinity by lighting up only some of the LEDs.

The housing 562 may be mounted on an accessory mount 558 which includes a pivotable bracket 566 which connected to a rotatable base element 568, allowing the light 560 to pivot up and down and to rotate for a directional light source. The entire mount 558 and light 560 is mounted to a monopod 556, such as those described above. The monopod 556 may be connected to the navigation light port 10 of a boat 4 or into a seat mount 410 within the deck of the boat 4. The light may be controlled by controls located directly on the light 560, such as on the housing 562, or it may be controlled remotely using a portable computing device such as a smartphone.

XI. Monopod Accessory Mount System 602 with Portable Power Box 604

FIGS. 24-32 show an alternative embodiment monopod accessory mount system 602 with a portable power box 604. The portable power box 604 allows a monopod 603 to be connected to it, allowing the monopod 603 to provide power to an accessory 658. The monopod 603 could be any of the monopods disclosed above, and the accessory 658 could be any of the accessories previously discussed.

Figure 26:
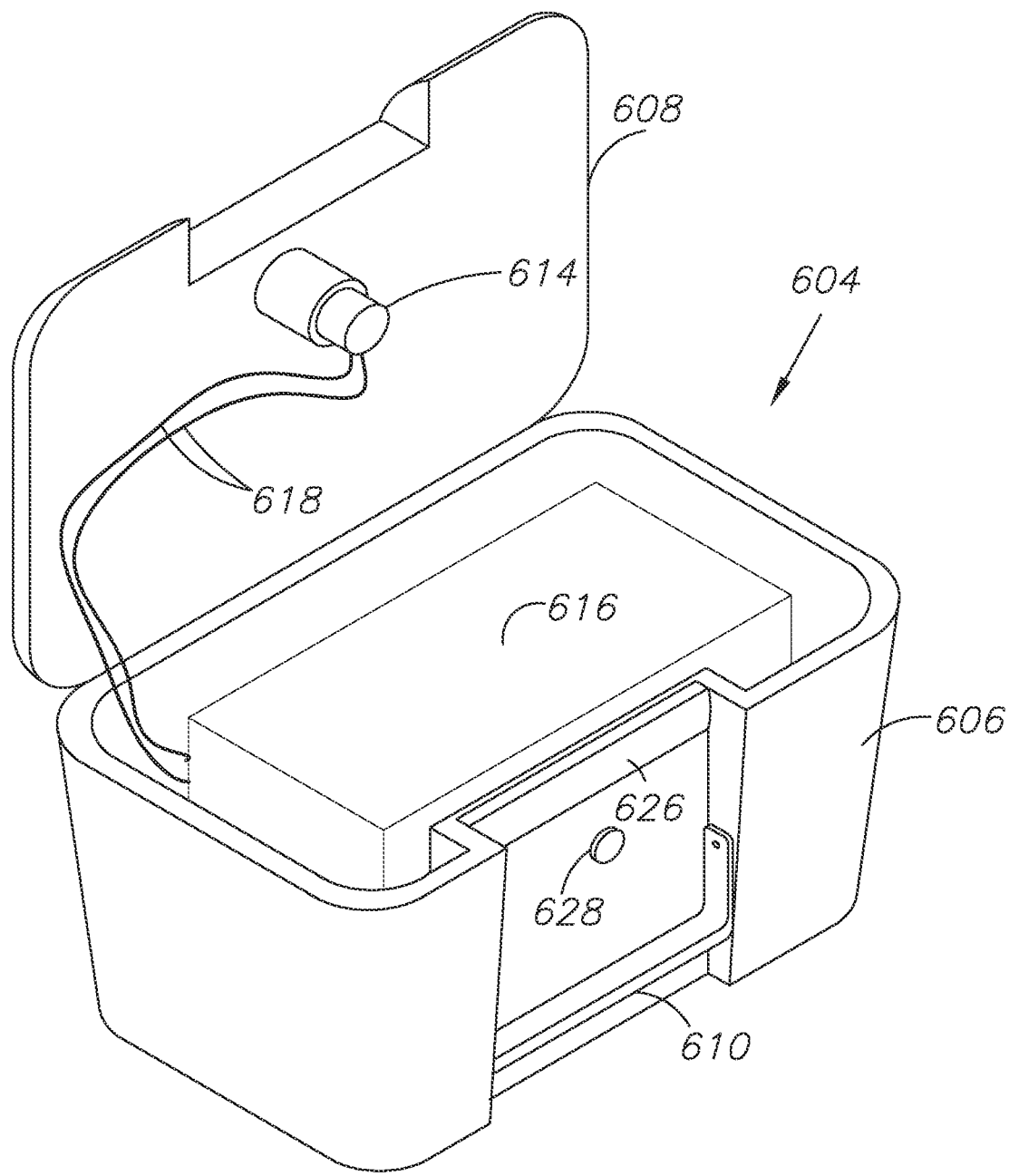
FIG. 26 is a three-dimensional isometric view of the portable power box thereof shown in an open configuration.
Figure 27:
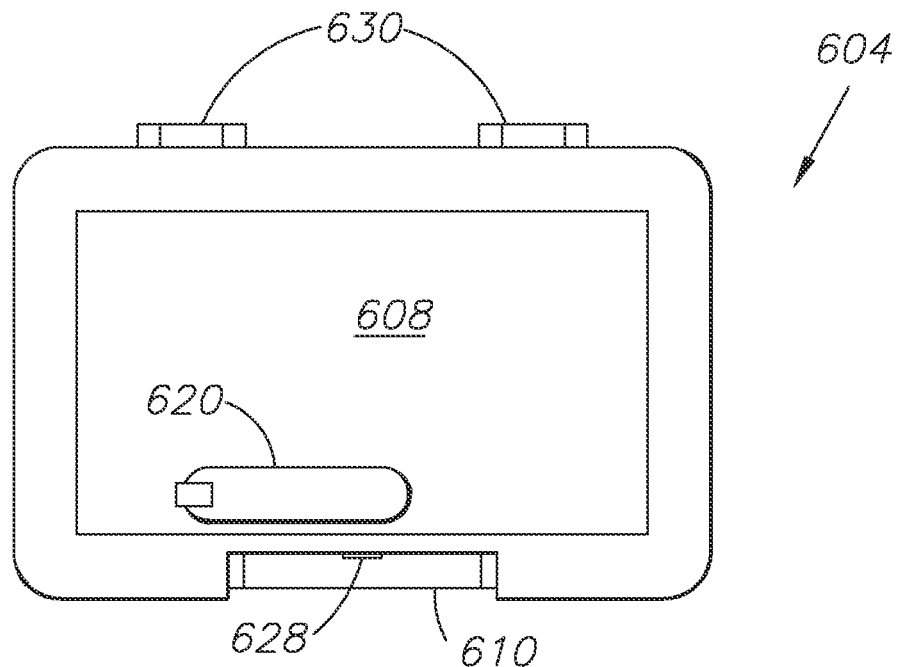
FIG. 27 is a top plan view thereof.
Figure 28:
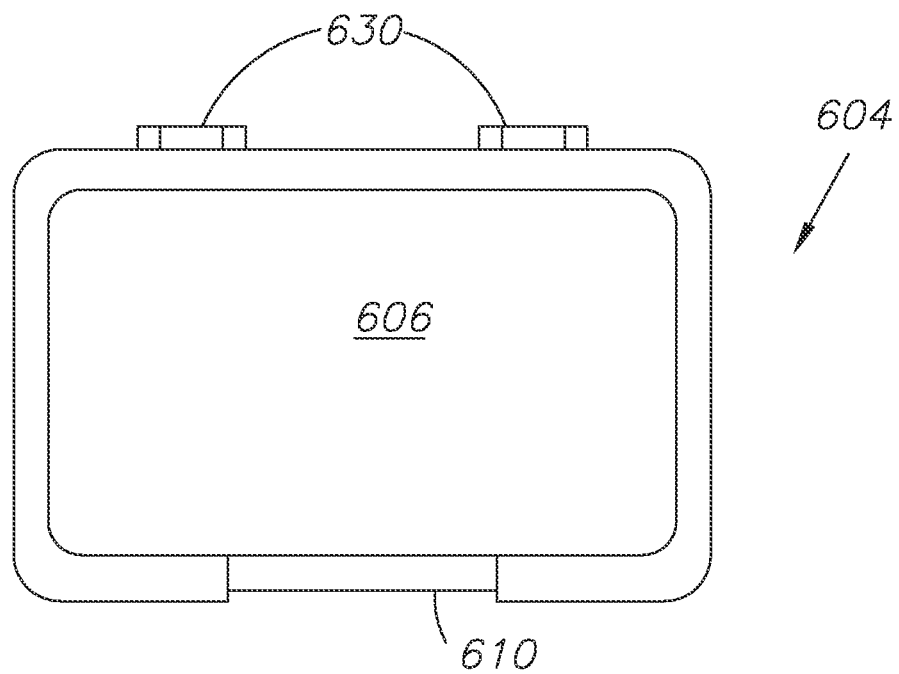
FIG. 28 is a bottom plan view thereof.
Figure 29:
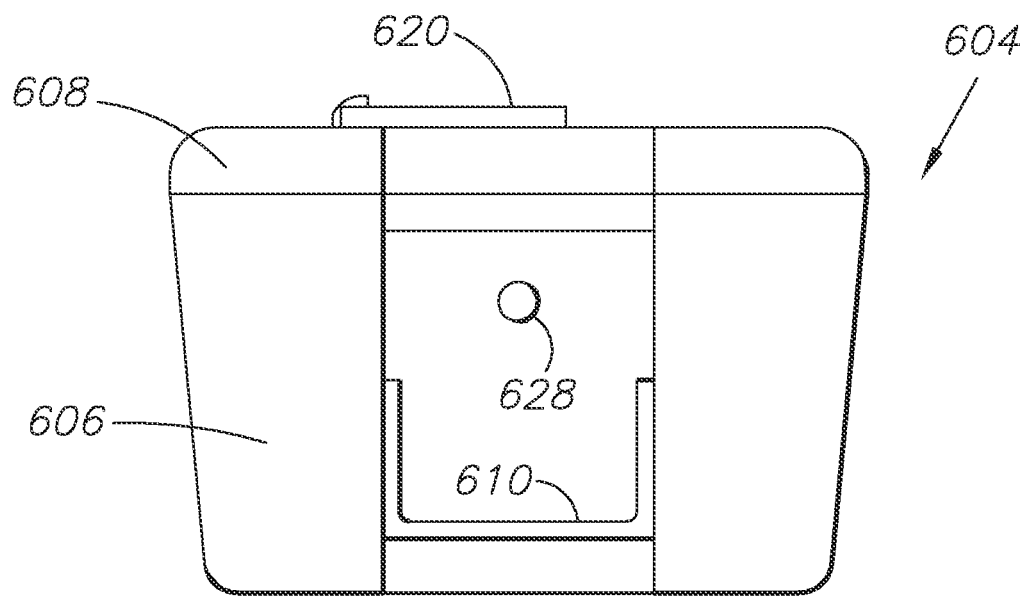
FIG. 29 is a front elevational view thereof.
Figure 30:
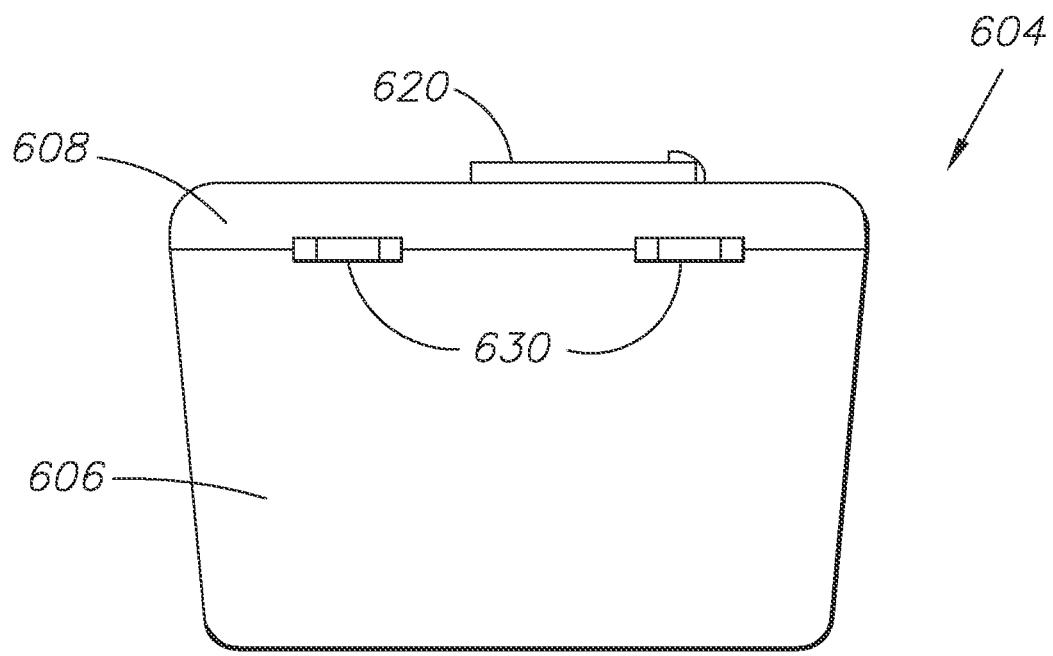
FIG. 30 is a rear elevational view thereof.
Figure 31:
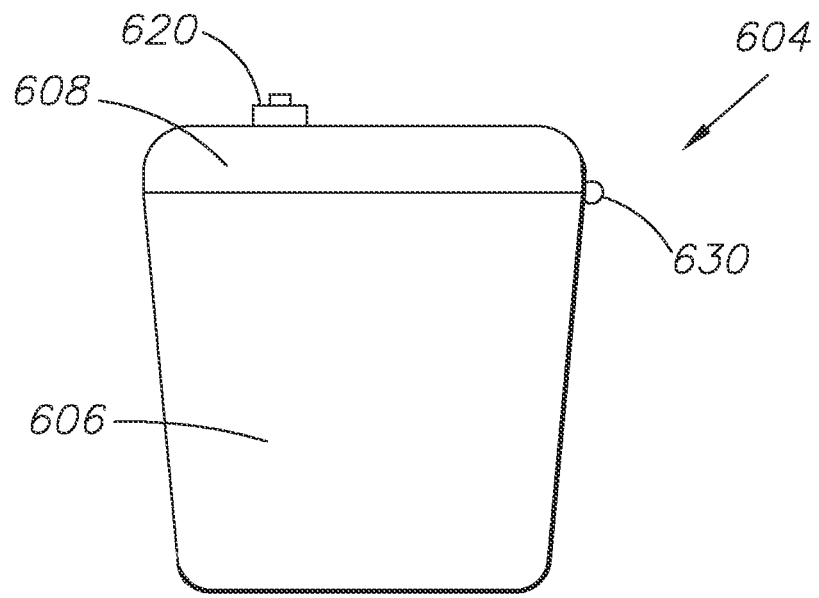
FIG. 31 is a right-side elevational view thereof.
Figure 32:
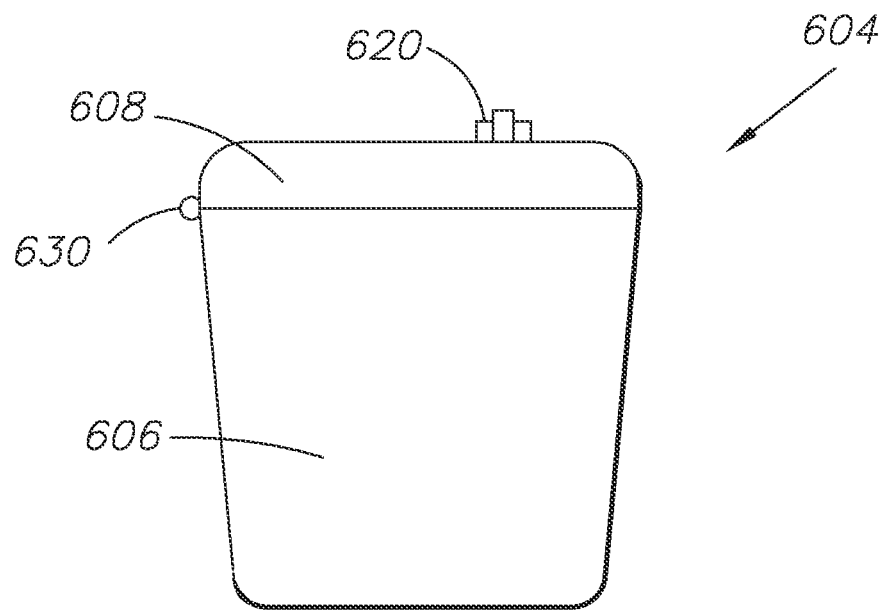
FIG. 32 is a left side elevational view thereof.
Figure 35:
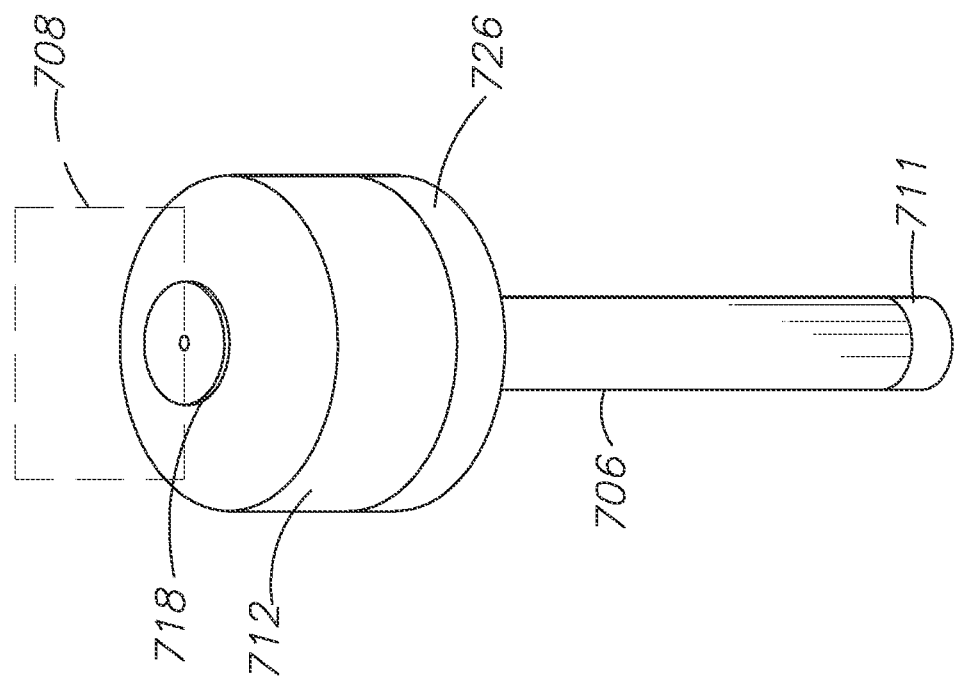
FIG. 35 is a top-down three-dimensional view thereof.
Figure 34:
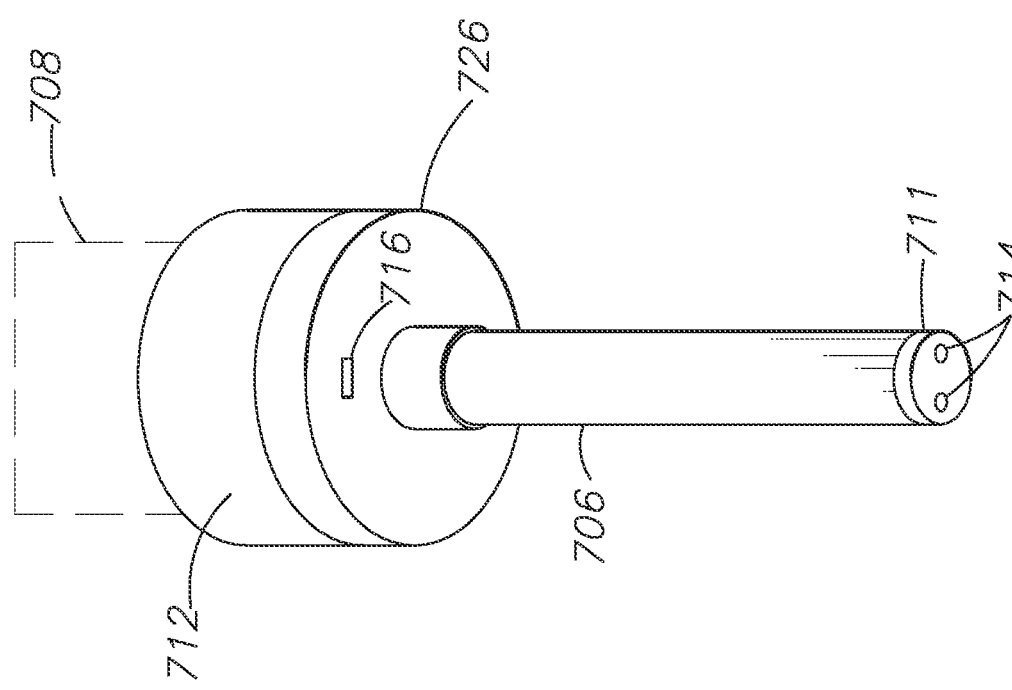
FIG. 34 is a bottom-up three-dimensional view thereof.
Figure 36:
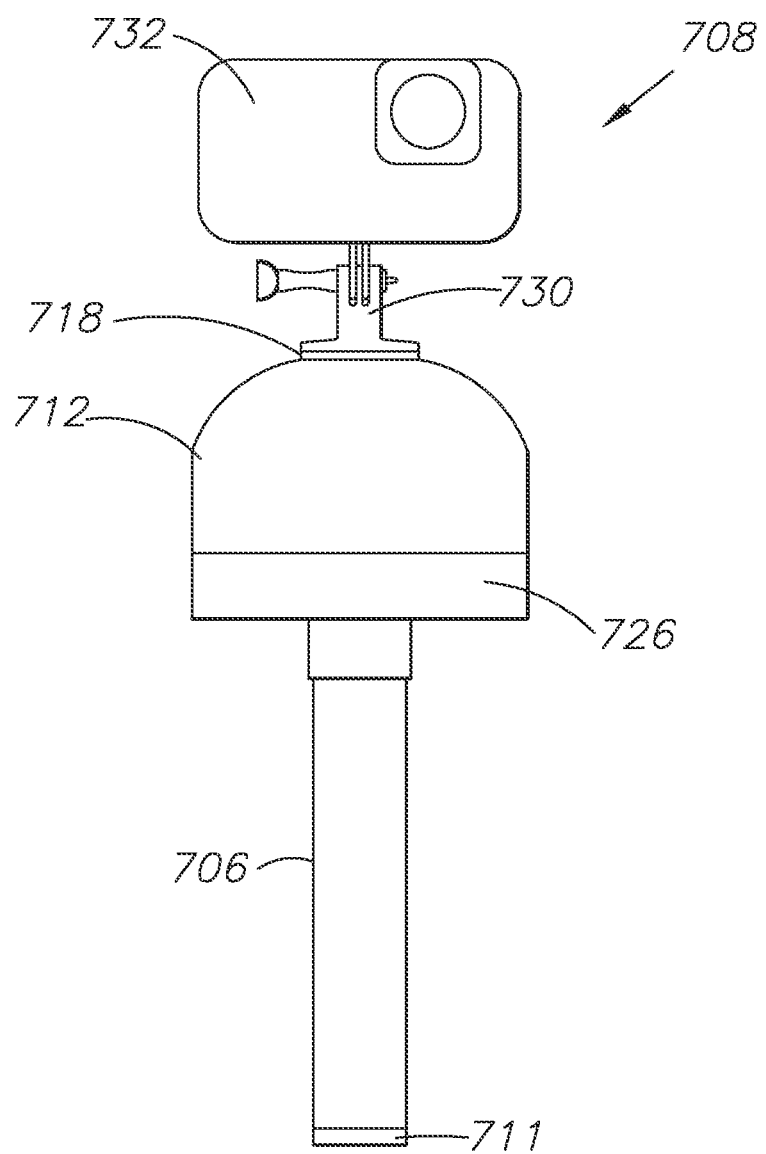
FIG. 36 is a side elevational view thereof shown using a camera mount.
Figure 37:
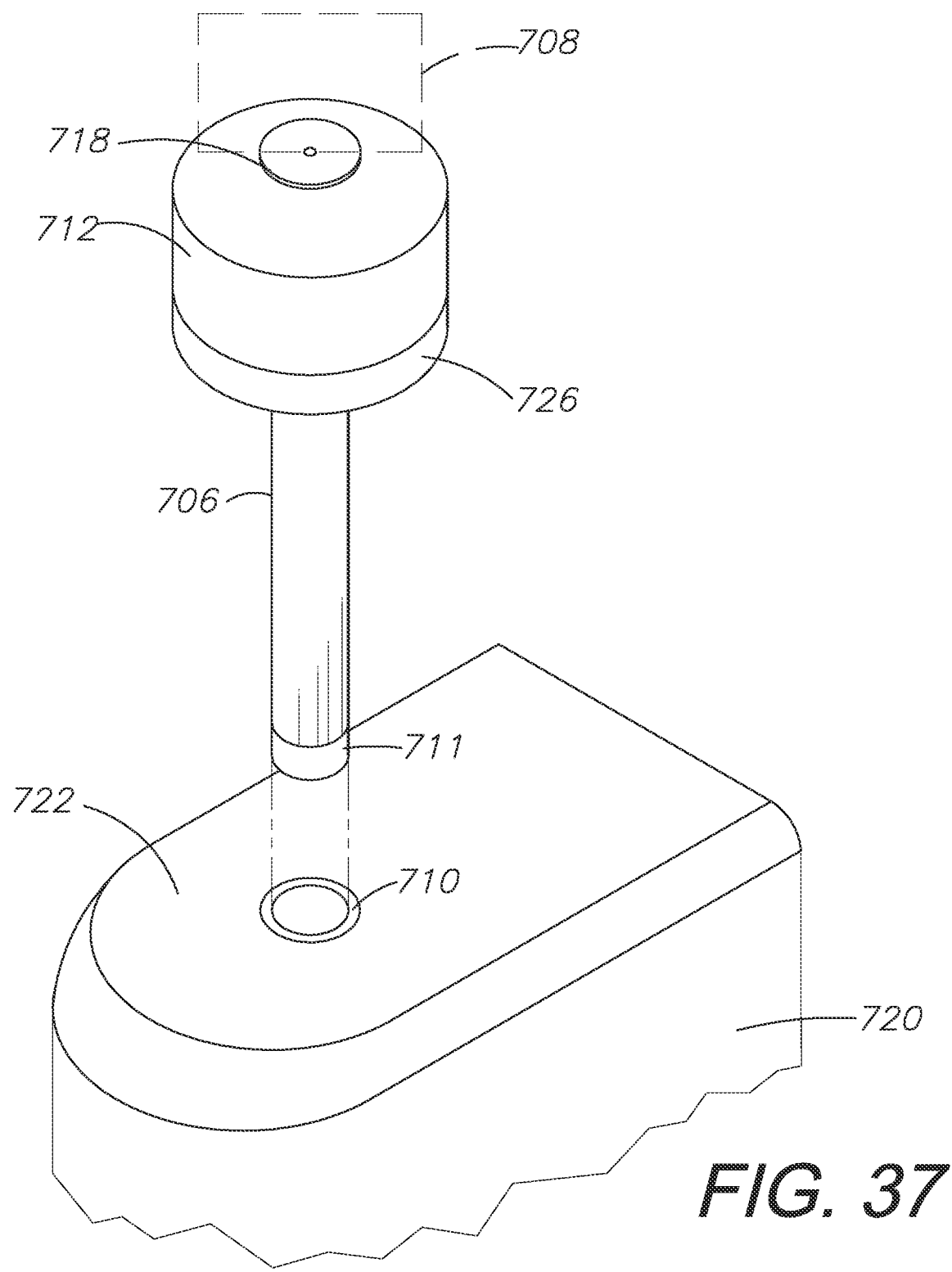
FIG. 37 is a three-dimensional isometric view thereof shown interacting with an anchor cap element.

The power box 604 includes a top portion 608 and bottom portion 606 connected by hinges 630 which allows the box to be opened, such as shown in FIG. 26. A battery 616 is stored within the bottom portion 606 of the box 604. The top portion 608 includes a receiver port 622 for receiving the base 612 of the monopod 603, which as discussed previously allows power to be transferred up through the shaft 656 of the monopod to the accessory 658. The receiver port 622 may be threaded to receive threads 624 of the monopod shaft 656 to secure the monopod 603 to the box 604. A cap 620 can seal the receiver port 622 when not in use.

The portable power box 604 may include a light 626 and switch 628 for activating the light for positional lighting in a dark location. The box 604 may also include a handle 610 for carrying the box.

FIG. 26 shows how the internal portion 614 of the receiver port 622 which connects wiring 618 to the battery 616 to transfer power from the battery to the receiver port and then into the base 612 of the monopod. As discussed above, the base 612 is configured for connection to a typical marine navigational light port, which the receiver port 622 functions similarly to.

The box 604 is weighted to support the monopod 603 such that it prevents tipping, allowing the monopod 603 to be placed in a location. The accessory 658 may include a light for lighting up an area, a camera, or some other electrical accessory requiring power from the battery 616.

XII. Anchor Cap Monopod System 702

As shown in the FIGS. 33-37, the present invention is an anchor cap monopod system 702 for affixing a monopod 706 to an anchor mount cap 722 for a boat 704 anchor 720 such as the Talon anchor manufactured by Johnson Outdoors, Inc. of Racine, WI. The anchor 720 would be mounted to the boat 704 using a mounting connection 724 or some other suitable mounting element. The monopod 706 includes a light source 712 and accessory mount 718 for connecting an electrical accessory 708 such as a camera mount 730 for mounting a camera 732, such as a GoPro® cameras manufactured by GoPro, Inc. of San Mateo, California. The monopod 706 includes a power connection 716, such as a USB port, for powering and charging electrical accessories such as cellular phones or the camera or other accessory mounted to the camera mount.

The anchor mount cap 722 includes a power port 710 for receiving the monopod 706. The anchor mount cap would be either connected to power of the anchor 720 or would include a battery for powering the power port 710.

The monopod 706 has a base 711 with contacts 714 for drawing power from the power port 710. The monopod light 712 is connected to a light base 726 which includes the power connection 716.

The accessory mount 708 could also mount flood lights or other accessories, which may be self-powered or may be powered using the power port 716.

XIII. Motor Cap Monopod System 752

Figure 38:
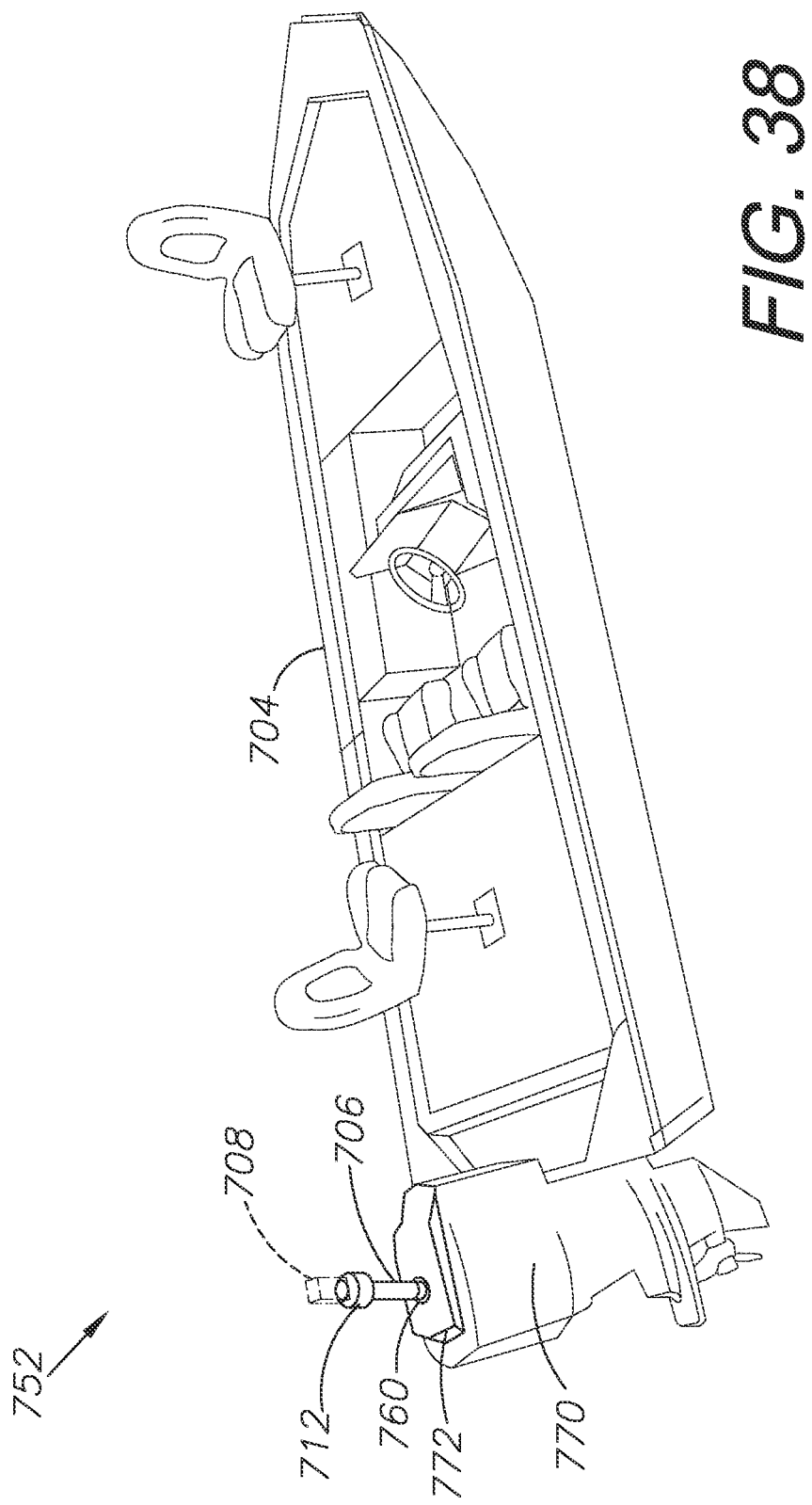
FIG. 38 is a three-dimensional isometric view of another alternative embodiment of the present invention shown in relation to a preferred environment of a boat.
Figure 39:
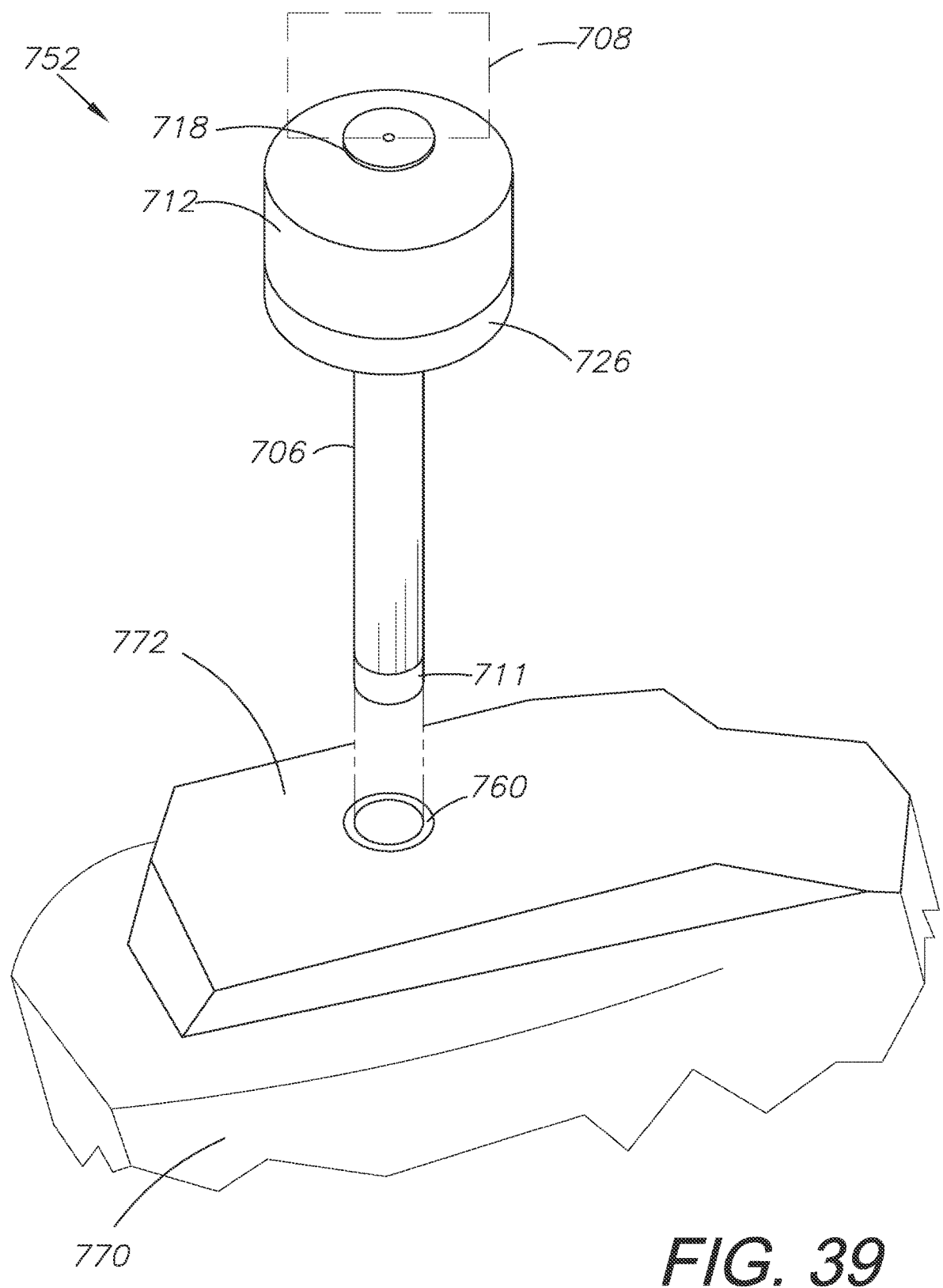
FIG. 39 is a three-dimensional isometric view thereof shown interacting with a motor cap element.

FIGS. 38 and 39 show a slightly alternative embodiment motor cap monopod system 752 using the same monopod 706 of the previous embodiment, but instead providing a power port 760 within a motor cap 772 which can be placed atop a standard boat motor 770.

As before, the monopod 706 includes a light source 712 and accessory mount 718 for connecting an electrical accessory 708. The monopod 706 has a base 711 with contacts 714 for drawing power from the power port 710. The monopod light 712 is connected to a light base 726 which includes the power connection 716.

The accessory mount 708 could also mount flood lights or other accessories, which may be self-powered or may be powered using the power port 716.

XIV. Kayak Power Port and Rail System 802

Figure 40:
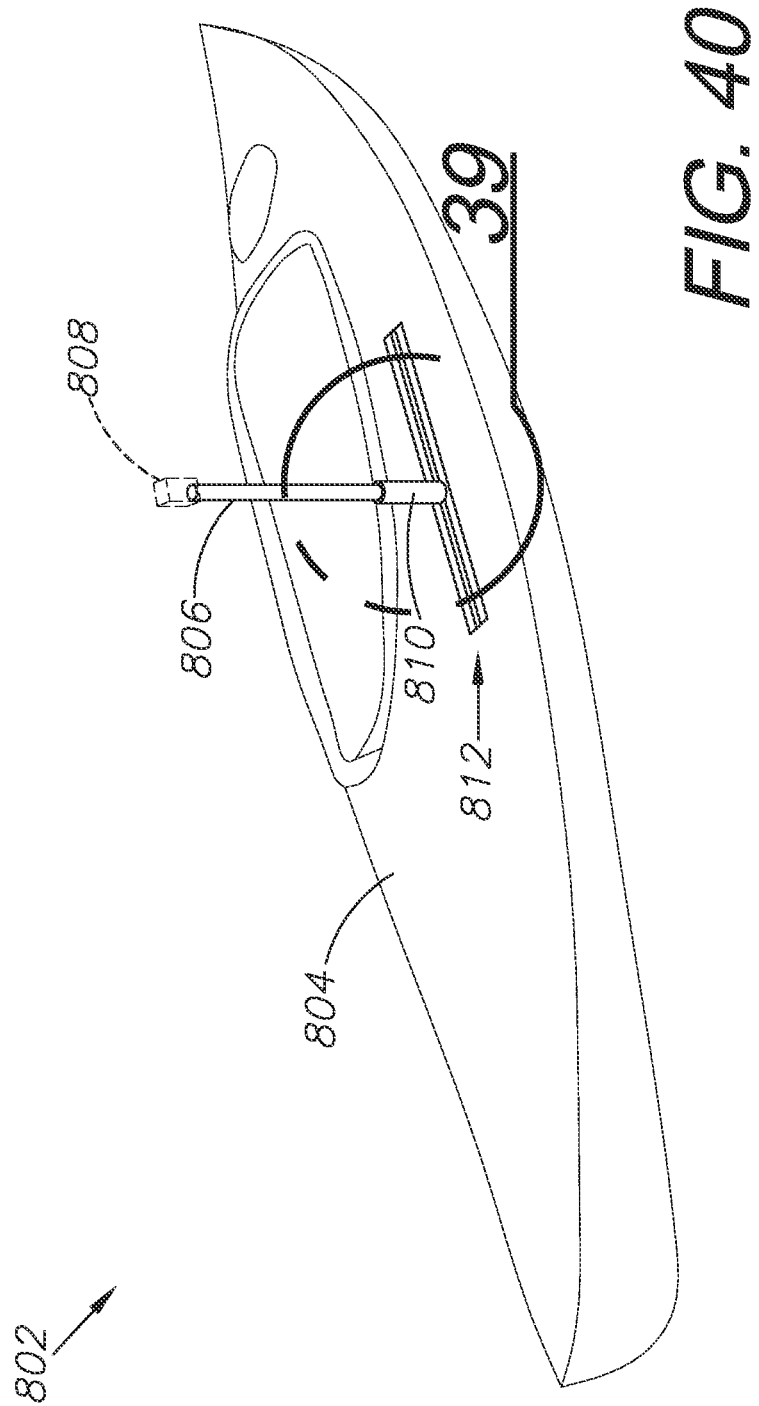
FIG. 40 is a three-dimensional isometric view of another alternative embodiment of the present invention shown in relation to a preferred environment of a kayak.

FIG. 40 shows a kayak power port and rail system 802 where a kayak 804 is fitted with a mounting rail 812. A power port device 810 is affixed to the rail, and a monopod 806 is deployed within a power port of the power port device. An accessory 808 can be mounted to the top of the monopod and powered through power provided by the power port device 810.

Figure 41:
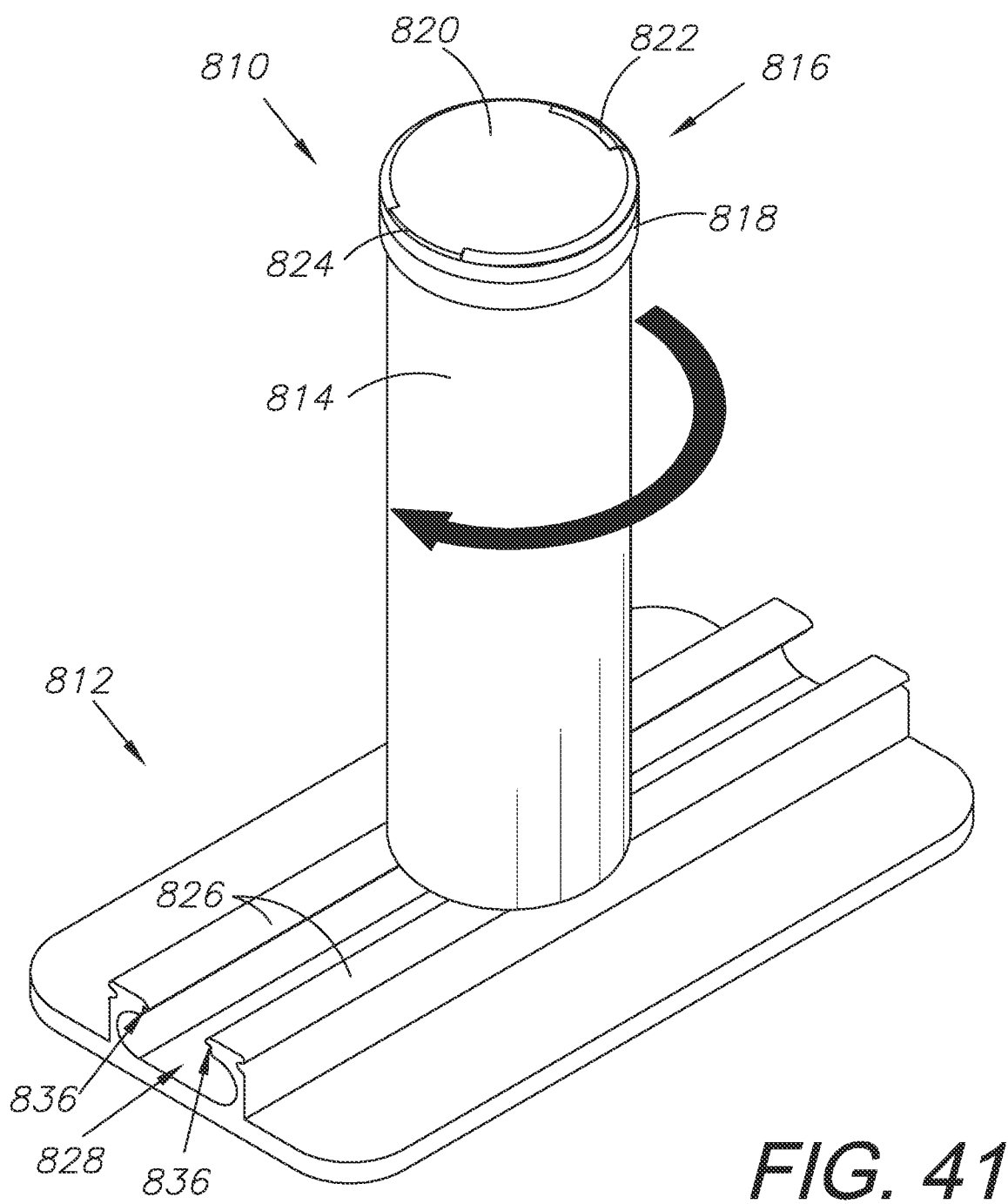
FIG. 41 is a three-dimensional top-down isometric view of the power port and rail elements thereof as taken about the circle of FIG. 38.
Figure 42:
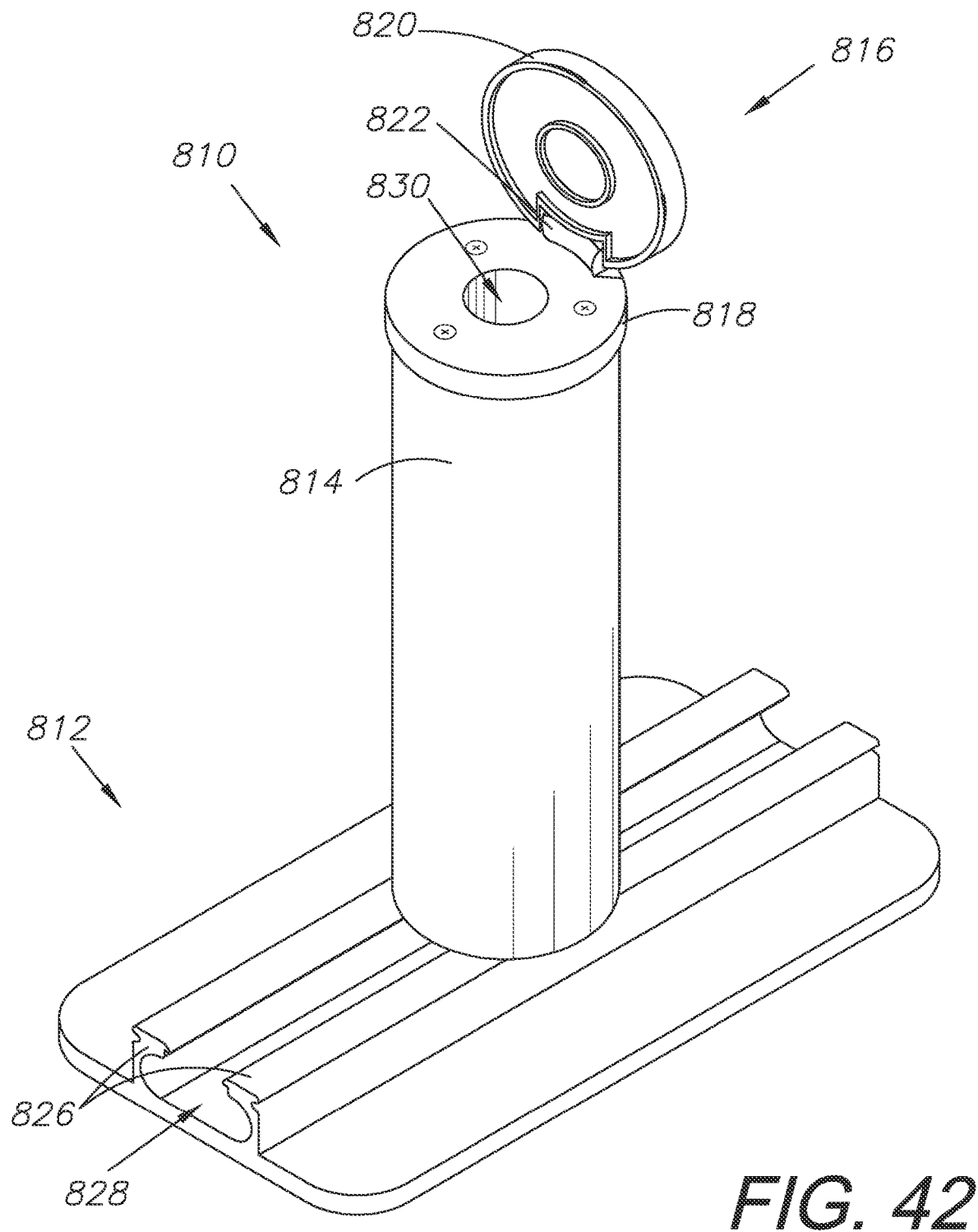
FIG. 42 is a three-dimensional top-down isometric view thereof shown in an open orientation.
Figure 44:
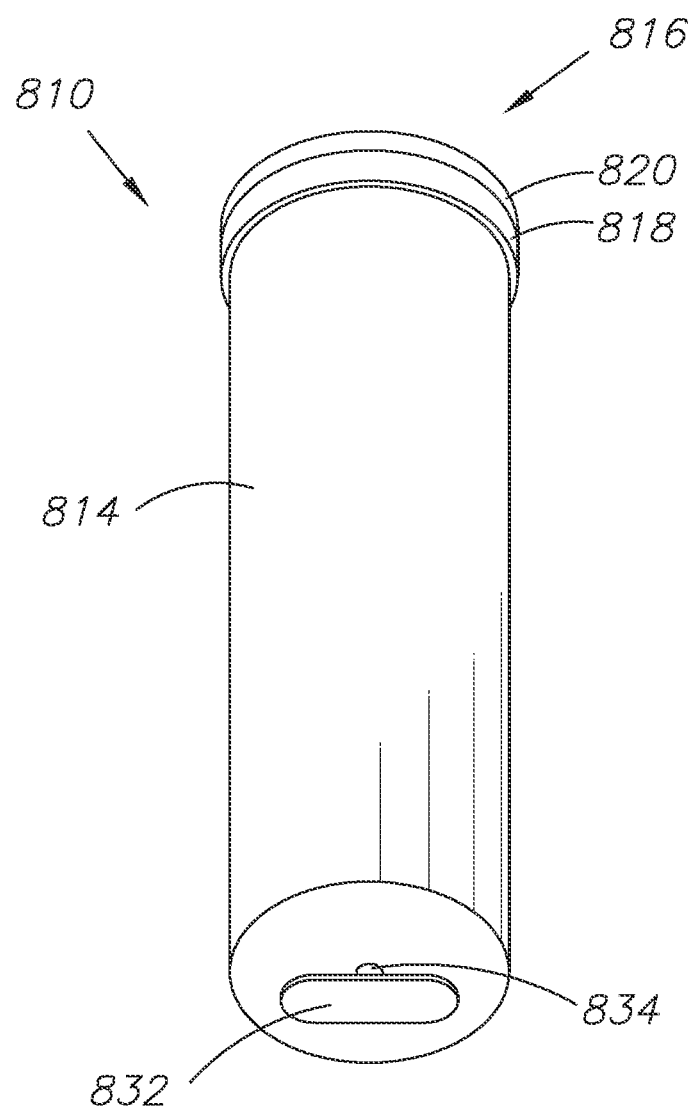
FIG. 44 is a three-dimensional bottom-up isometric view of the power port element thereof.

FIG. 41 shows the power port device 810 in conjunction with the rail 812. The power port device 810 has a main housing 814 and a power port 816 which is inserted into and connected to the housing 814, using screws or other attachment devices as shown in FIG. 42. The power port 816 has a main body 818 and a lid 820 which are connected via a hinge 822. A lip 824 can be included to help facilitate the opening of the lid 820. The rail 812 is made of a pair of guides 826 which form a slot 828. A threaded connector 832 as shown in FIG. 44 can be slotted into the slot 828 and tightened against the guides 826 using the threaded connection 834 of the threaded connector 832. This presses the threaded connector 832 against the shoulders 836 of the guides 826.

Figure 43:
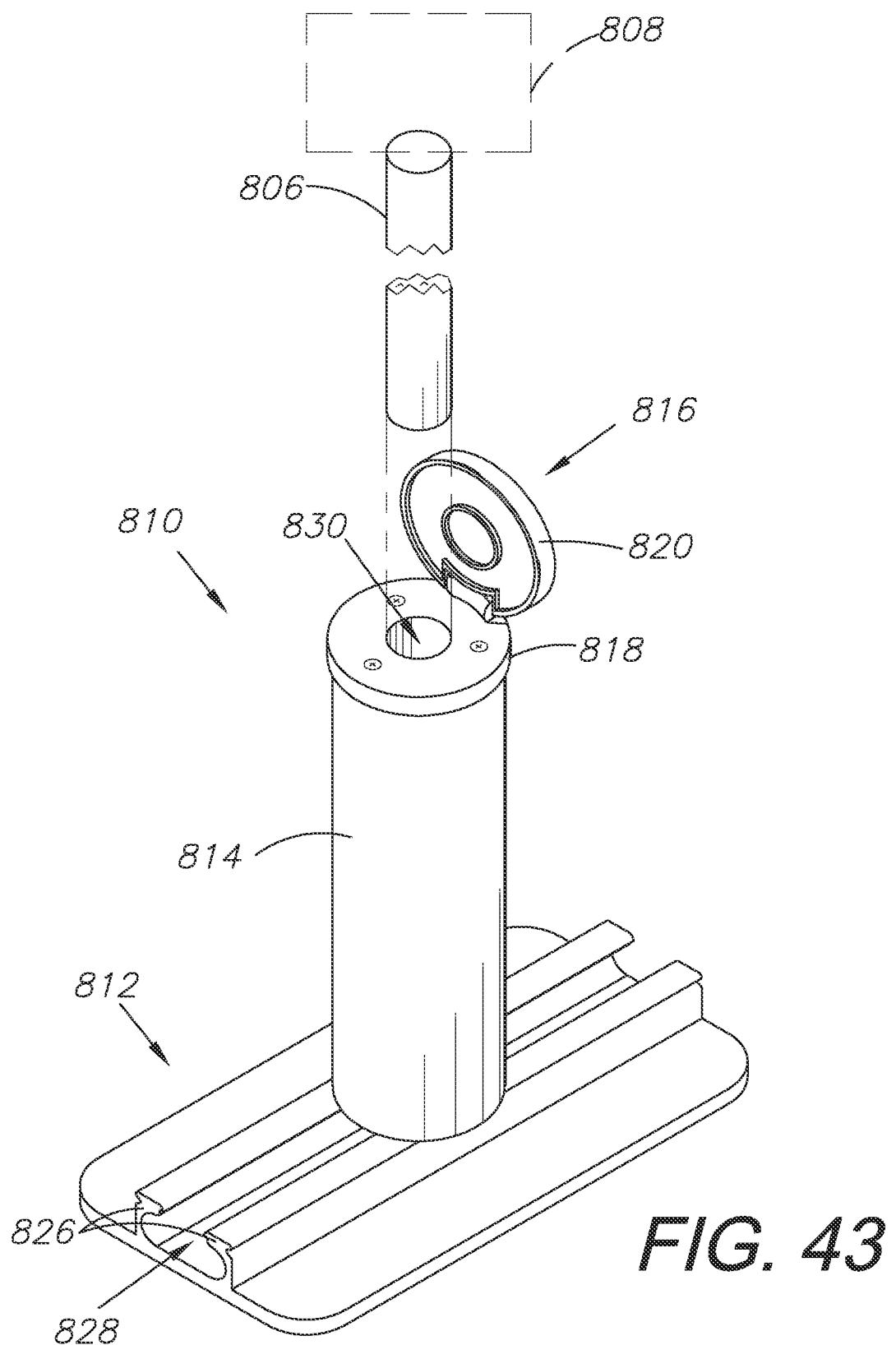
FIG. 43 is a three-dimensional top-down isometric view thereof shown in conjunction with a monopod and accessory element.

When the lid 820 is opened as shown in FIG. 42, access to the monopod receiver 830 is provided. As shown in FIG. 44, the monopod 806 is inserted into the monopod receiver 830, which includes power pins for providing power to the monopod 806. The accessory 808, which can be any accessory discussed in the previous embodiments, is powered using the monopod 806, which may include any of the monopod devices discussed in the previous embodiments or any other monopod capable of providing power to the accessory. FIG. 43 shows the connecting of a monopod 806 to the power port device 810.

Figure 45:
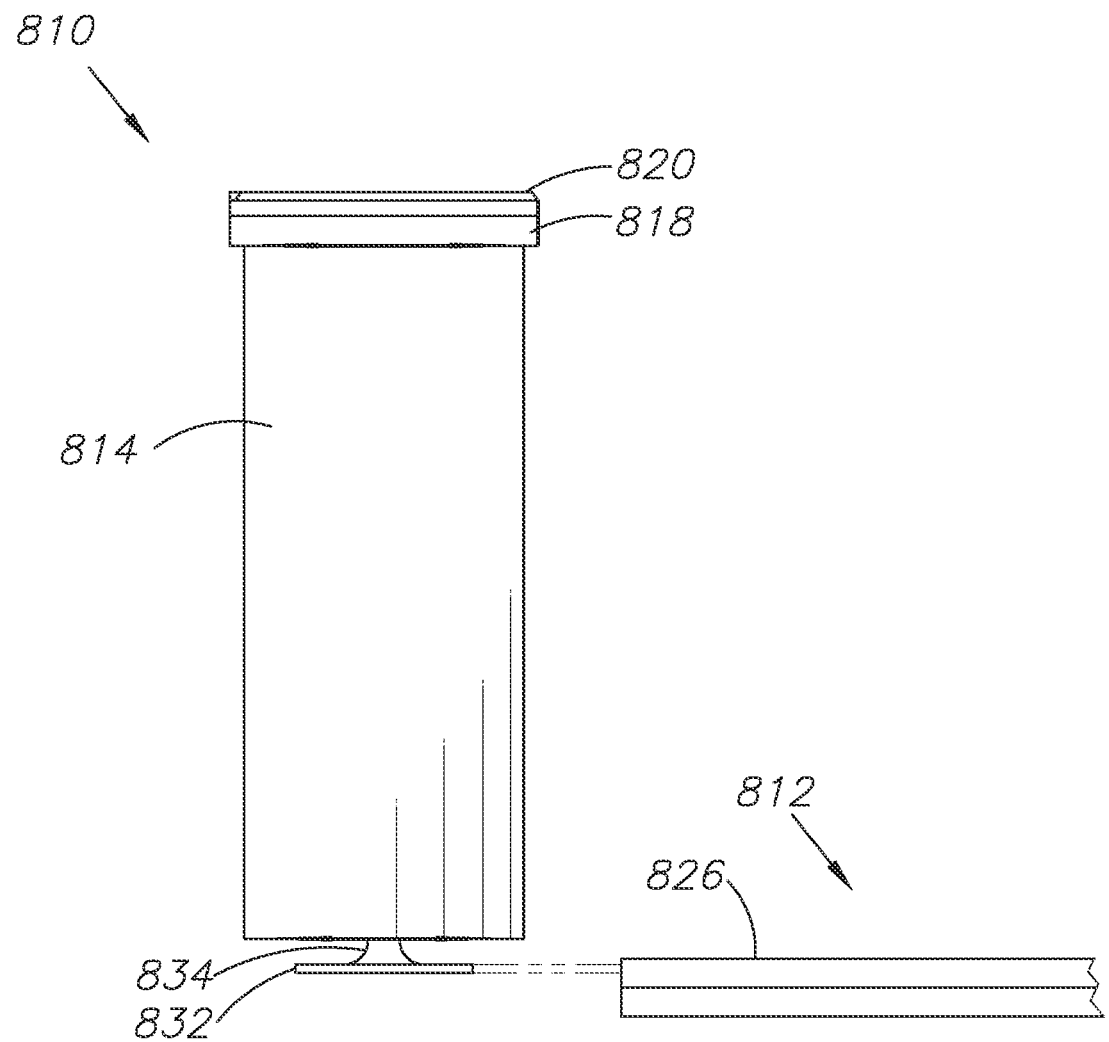
FIG. 45 is a side elevational view thereof.
Figure 46:
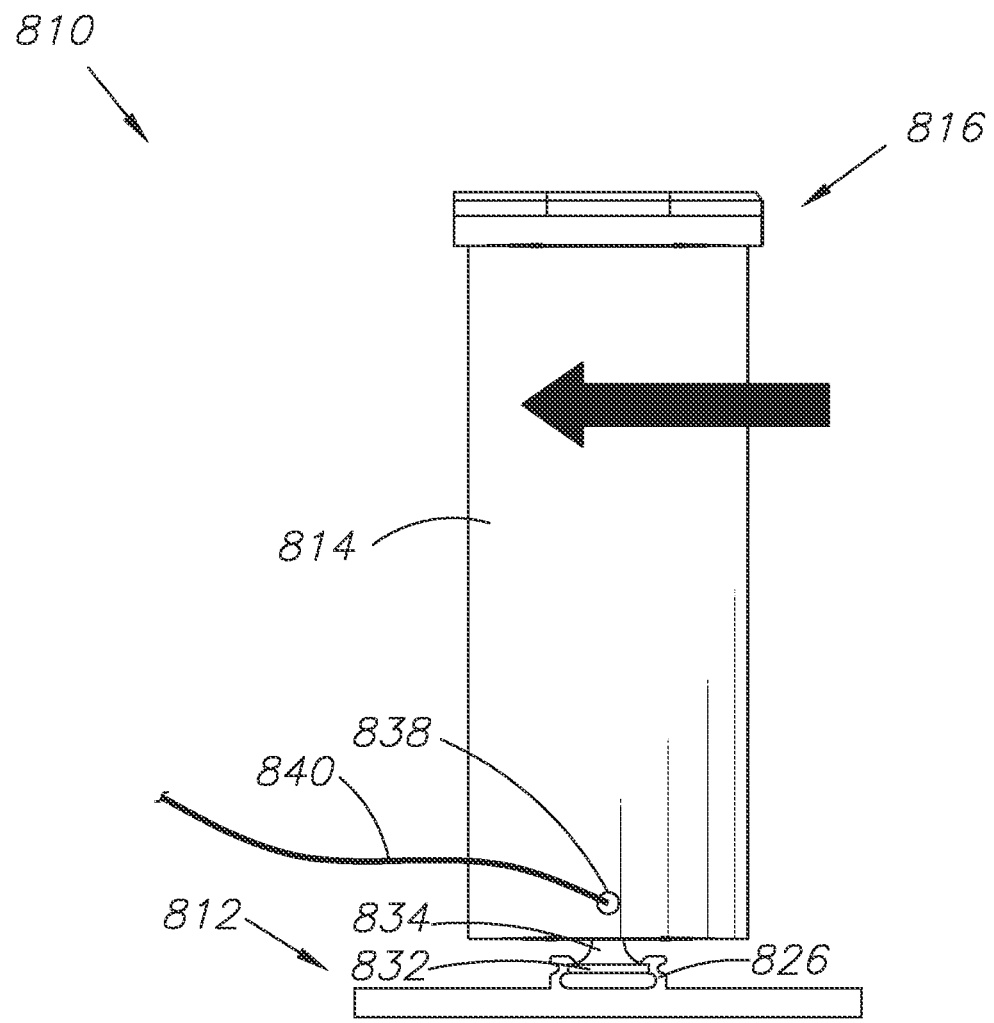
FIG. 46 is a front elevational view thereof.

FIGS. 45 and 46 show how the threaded connector 832 is inserted into the slot 828 between the guides 826 of the rail 812 and can be tightened by turning the housing 814 clockwise, threading the connection 834 of the threaded connector 832 into a threaded port on the bottom of the housing 814. Turning the housing counterclockwise loosens the connection 834 of the connector 832, allowing the power port device 810 to be removed from the rail 812.

A power cable 840 is connected to a power supply, such as a battery, located in the kayak or near the kayak. The power cable 840 passes through a cable port 838 within the housing 814 of the power port device 810 and provides electrical power to the power port 816.

Figure 47:
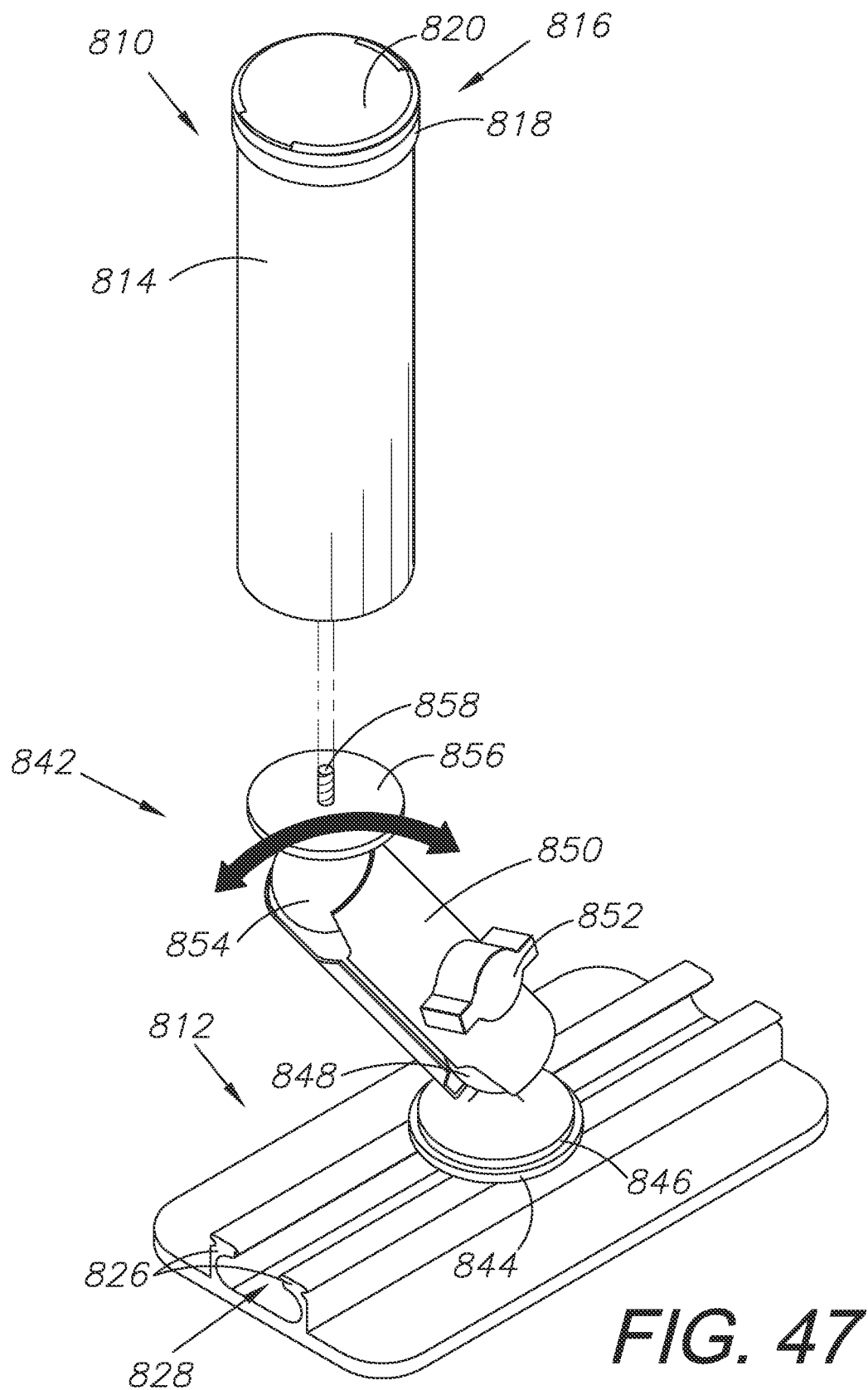
FIG. 47 is a three-dimensional isometric view of the embodiment of FIG. 39 shown with an adjustable mount element.
Figure 48:
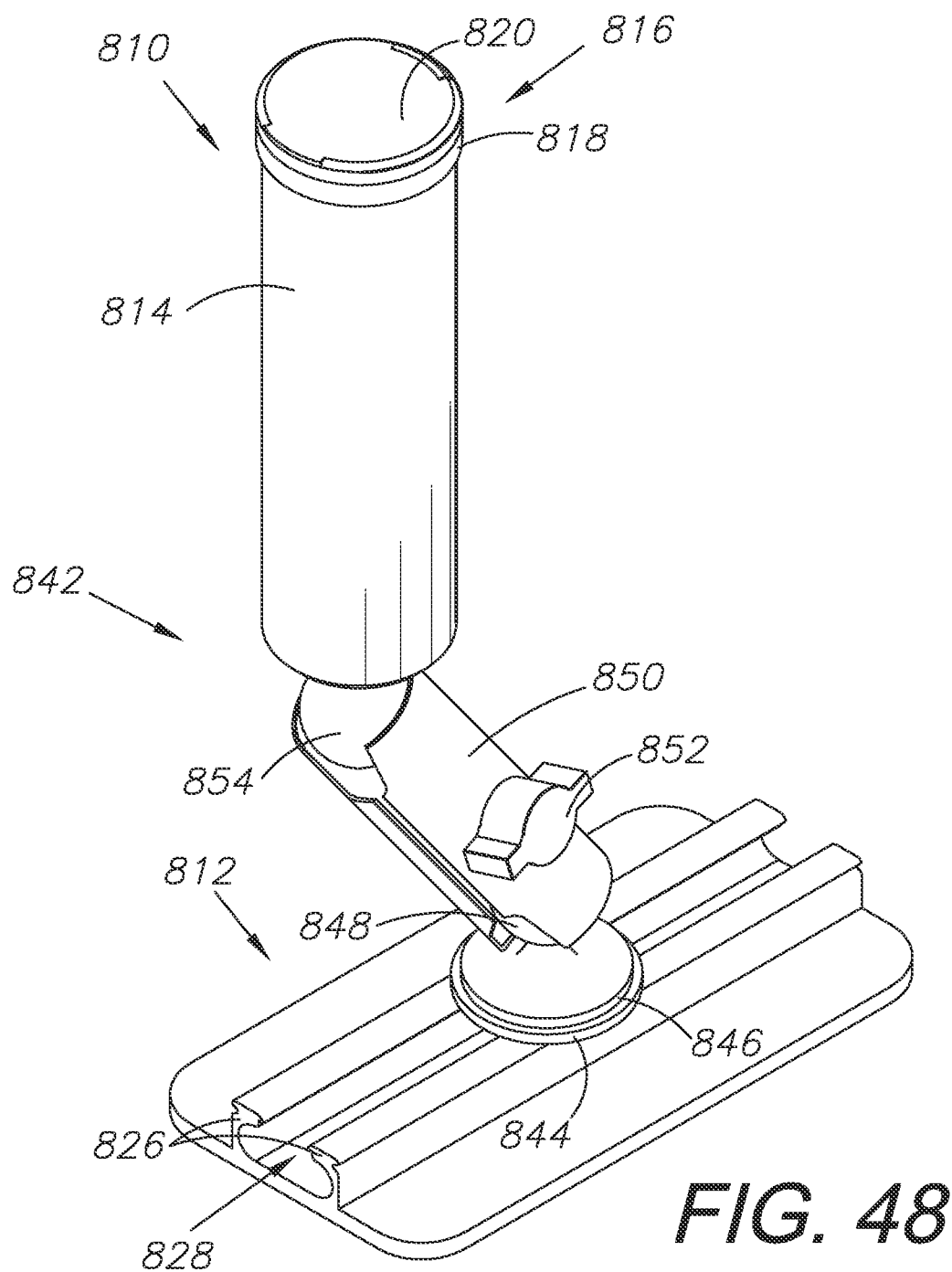
FIG. 48 is a three-dimensional isometric view thereof shown assembled.
Figure 49:
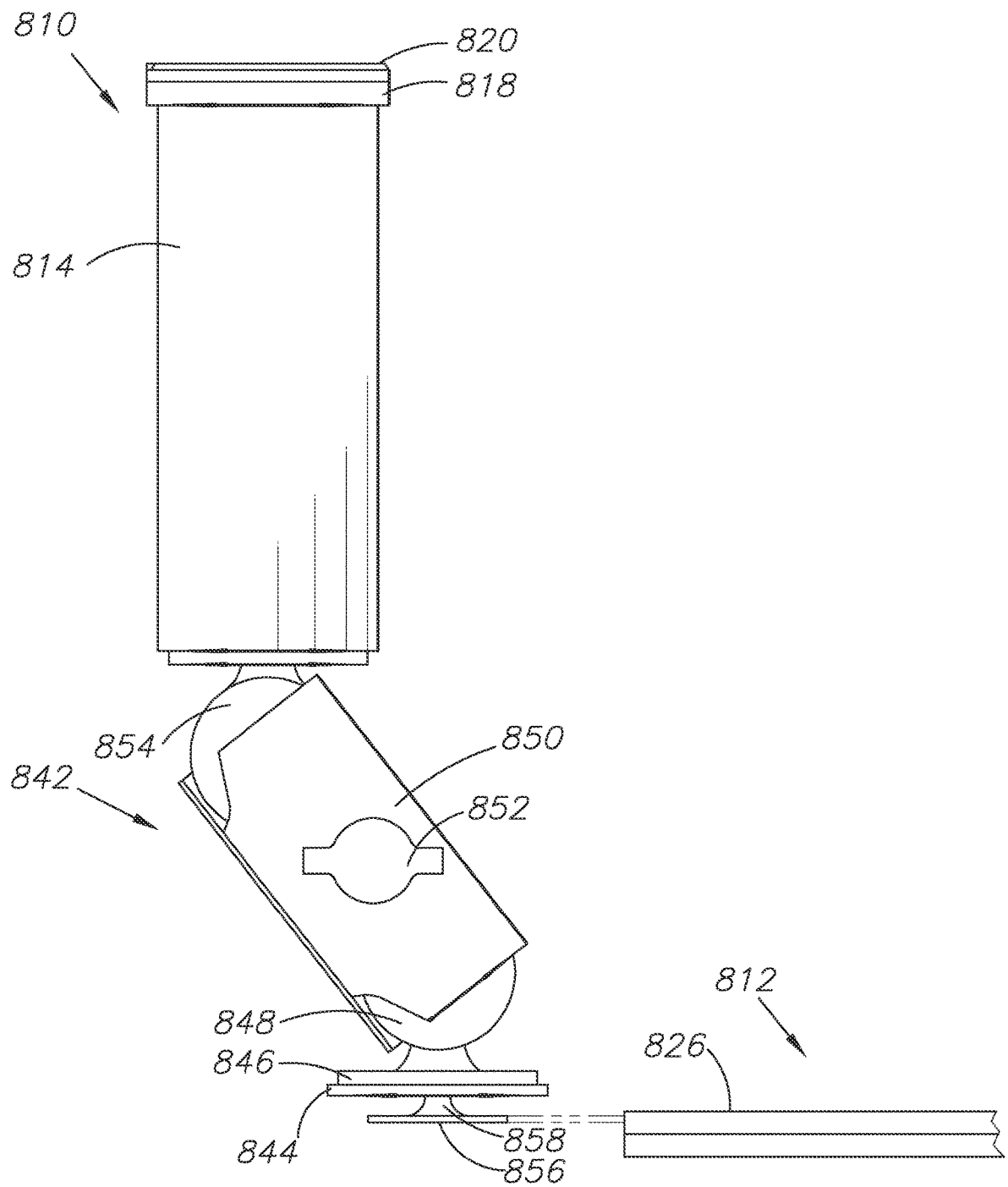
FIG. 49 is a side elevational view thereof.
Figure 50:
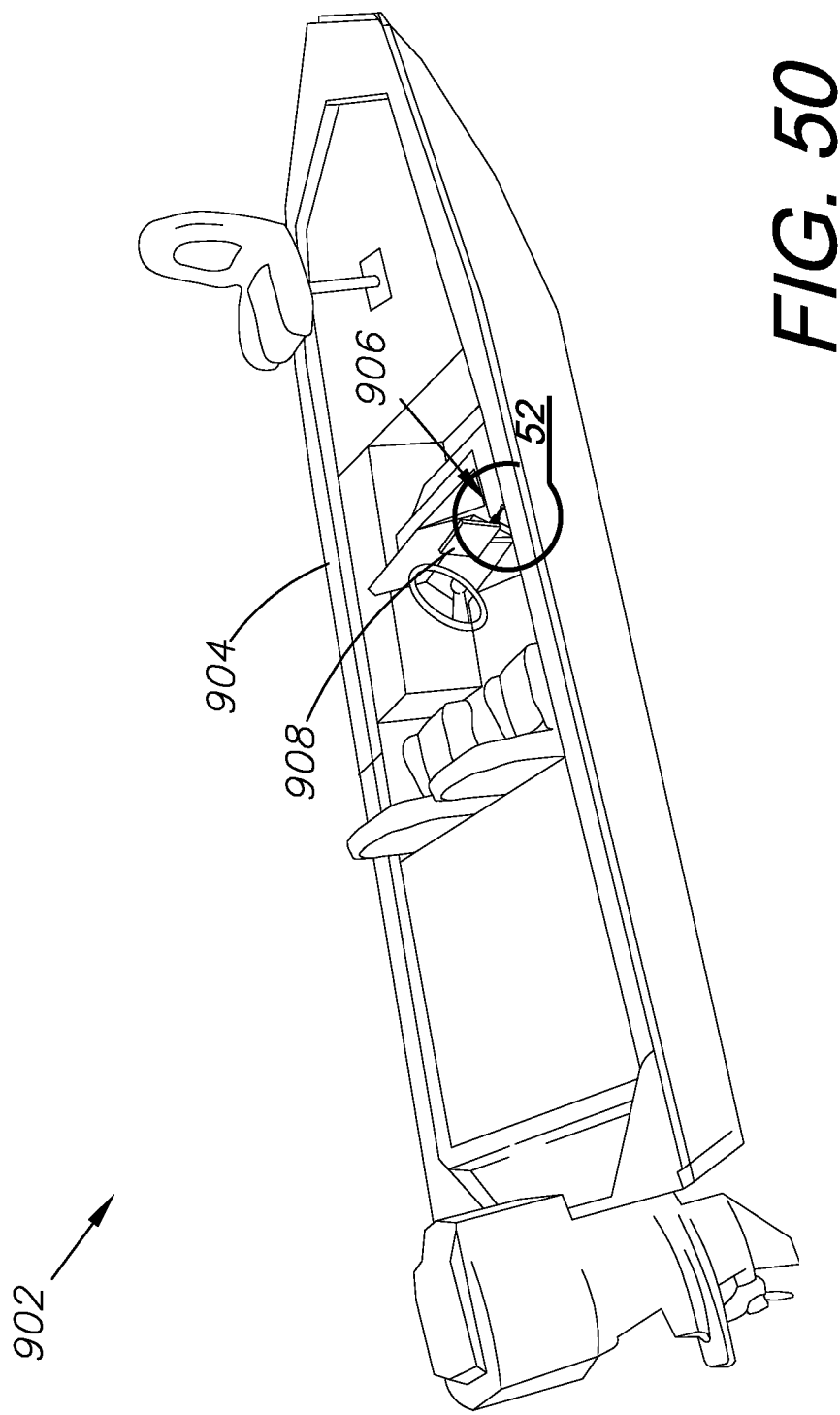
FIG. 50 is an isometric view of an embodiment of the present invention located in a typical environment in which it may be deployed, herein depicted as a boat.

FIGS. 47-49 show the power port device 810 connected to the rail 812 using an adjustable mount 842. This adjustable mount could be like that disclosed in U.S. Pat. No. 5,845,885 to Carnevali and assigned to National Products, Inc. of Seattle, Washington which is incorporated herein by reference. An embodiment of the adjustable mount 842 as shown includes a base 844 which connects to the rail 812, a first connector 846 with a first ball joint 848 connected to one end of the adjustable mount 842 housing 850. A second connector 856 is connected to the other end of the housing 850 by a second ball joint 854. An adjustment knob 852 can loosen the housing 850 to allow adjustment of the angles of the connectors 846, 856 via the ball joints 848, 854. A spring or threaded element inside of the housing 850 may be used to adjust the housing about the ball joints. A threaded connector 858 on the second connector 856 can receive the threaded port on the bottom of the power port device housing 814. This allows the power port device 810 to be mounted at any desired angle from the rail 812. The base 844 includes a threaded connector 856 with a connection 858 identical to the threaded connector 832 with connection 834 of the power port device 810 discussed above. It can be received within the slot 828 defined by the guides 826 of the rail 812.

XV. Bolt-on Accessory Connector System 902

FIGS. 50-59 show another alternative embodiment of the present invention featuring a bolt-on accessory connector 906. The example shown is for a graph mount 918 accessory connector 906 system, where a graph 908, commonly referred to as a fish-finder, is mounted to a boat 904 or other marine vehicle via the graph mount 918. However, the graph mount 918 could be replaced with the structure of any vehicle or any physical structure, allowing the present invention to bolt-on and connect to any structure and provide the advantages described herein. This structure could include tree stands, turkey tents, golf carts, all-terrain vehicles, snowmobiles, kayaks, marine, and land vehicles. Any physical structure could receive the bolt-on accessory connector. The accessory connector 906 allows the end user to mount an accessory 8, such as a camera or other electrical or non-electrical accessory, to the graph mount at various angles as desired.

Figure 51:
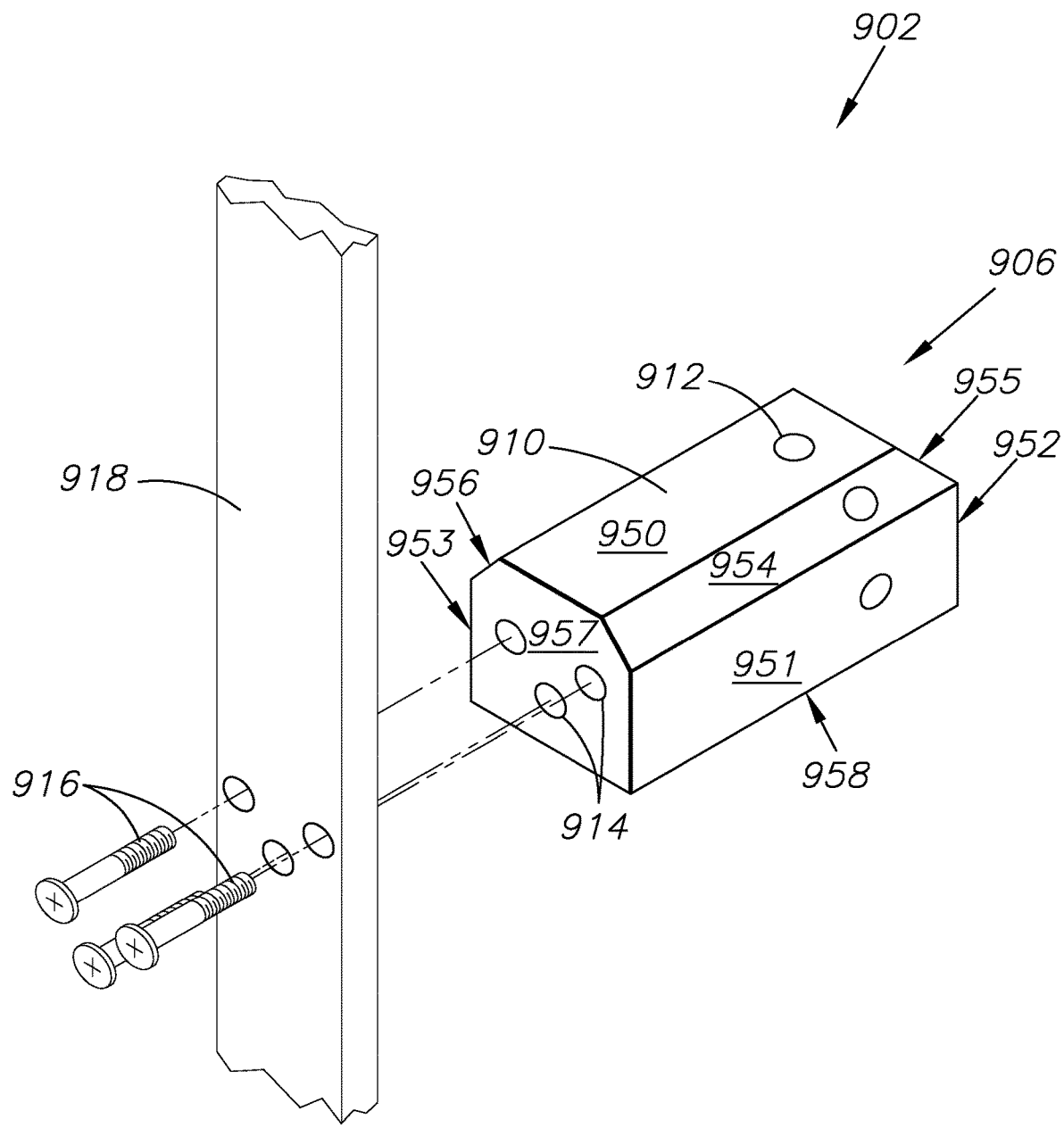
FIG. 51 is a partially exploded three-dimensional isometric view showing a graph mount accessory connector of the present invention being installed into a graph mount for the boat.

FIG. 51 shows how the accessory connector 906 being connected to the graph mount 918 by bolting the connector to the arm of the graph mount with screws or bolts 916 into the bolt receivers 914 of the accessory connector. Other connection elements would also be suitable. The accessory connector 906 is made of a body 910 which has a front face 952, a rear face 957, a right side face 951, a left side face 953, a top face 950, a right shoulder face 954, a left shoulder face 956, and a front shoulder face 955. The left 953, right 954, and front 955 shoulder faces are at an angle between thirty degrees (30°) and sixty degrees (60°) relative to their adjacent side faces 951, 952, 953. Each face 950, 951, 952, 953, 954, 955, 956, 957, 958 has a respective accessory pole receiver slot 912. Each face could have more than one such slot.

Figure 52:
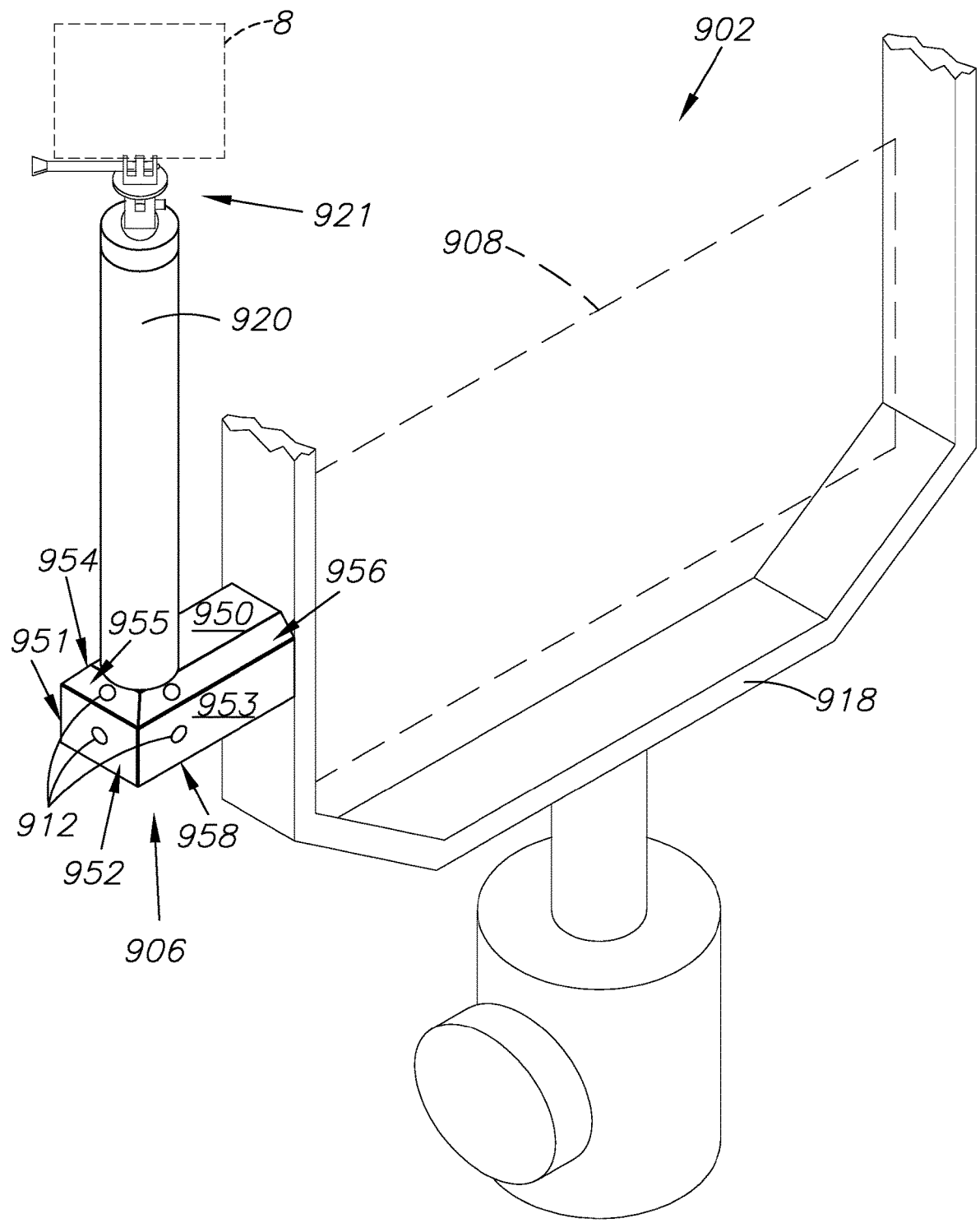
FIG. 52 is a three-dimensional isometric detailed view focusing on the circle of FIG. 50.
Figure 53:
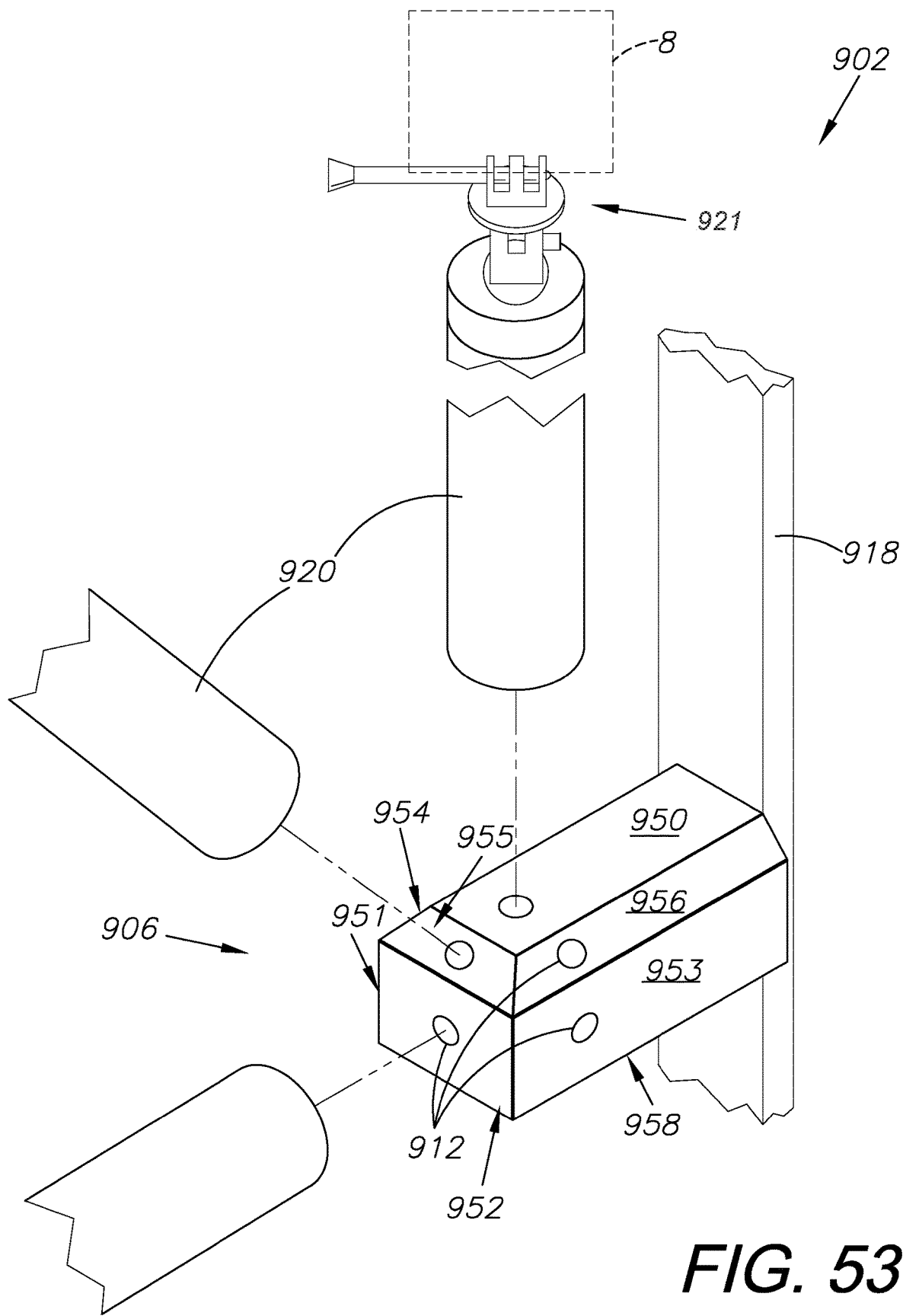
FIG. 53 is another three-dimensional isometric view thereof, showing in more detail the flexibility of attaching an accessory pole mount to the graph mount accessory connector thereof.
Figure 54:
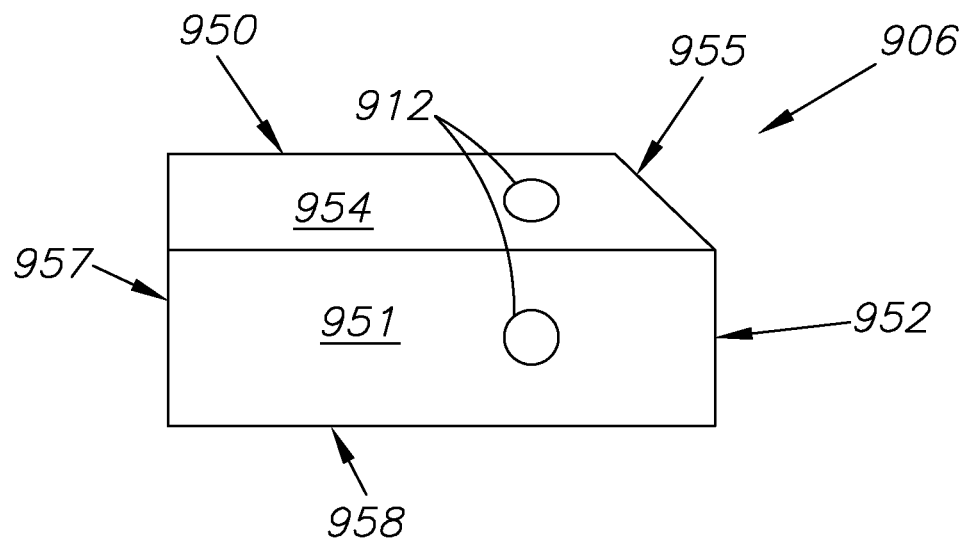
FIG. 54 is a right-side elevational view of the graph mount accessory connector thereof.
Figure 55:
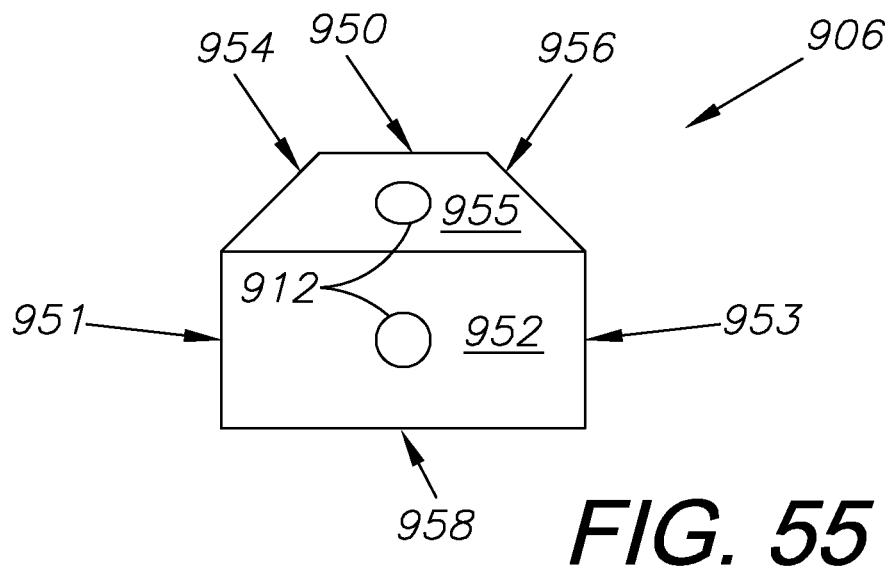
FIG. 55 is a front elevational view thereof.
Figure 56:
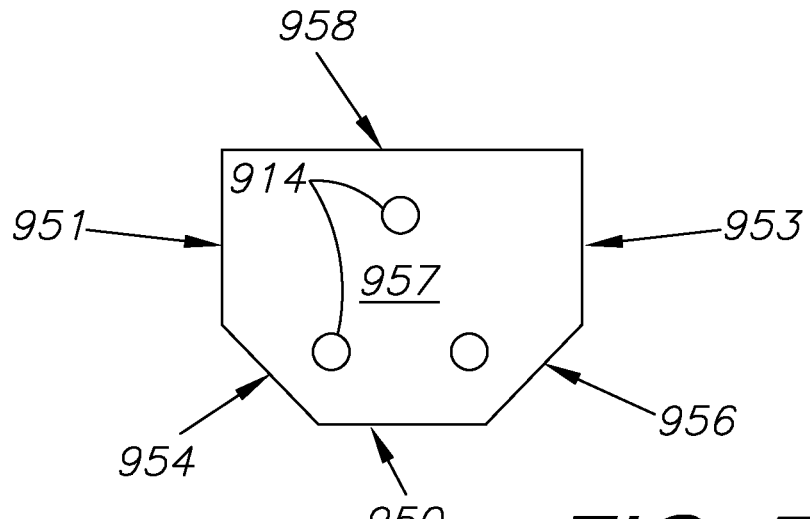
FIG. 56 is a rear elevational view thereof.
Figure 57:
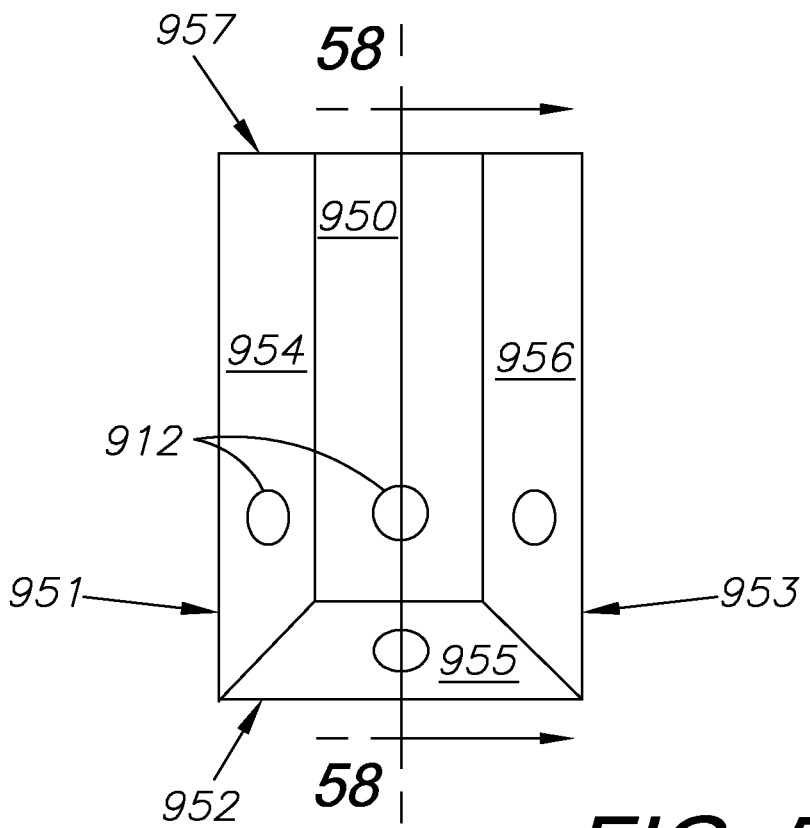
FIG. 57 is a top plan view thereof.
Figure 58:
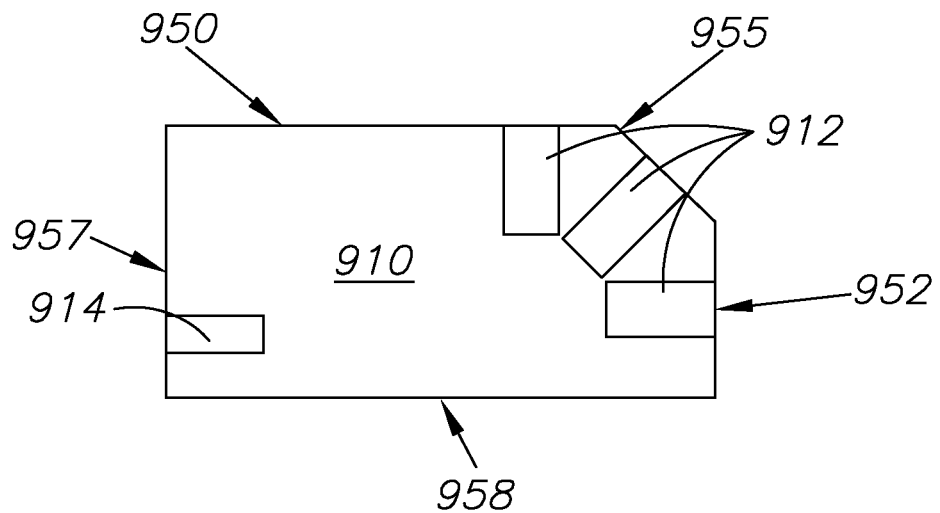
FIG. 58 is a side sectional view taken about the line of FIG. 57.

These accessory pole receiver slots 912 allow an accessory pole 920, as shown in FIG. 52, to be connected to one of the various faces. An accessory mount 921, such as a screw-based camera mount, may be connected to the top of the accessory pole 920, for connecting to the accessory 8 and for allowing additional adjustment of positioning of the accessory. The various faces 950, 951, 952, 953, 954, 955, 956, 957, 958 of the accessory connector also provide for customization of the positioning of the accessory, as illustrated in FIG. 53.

Figure 59:
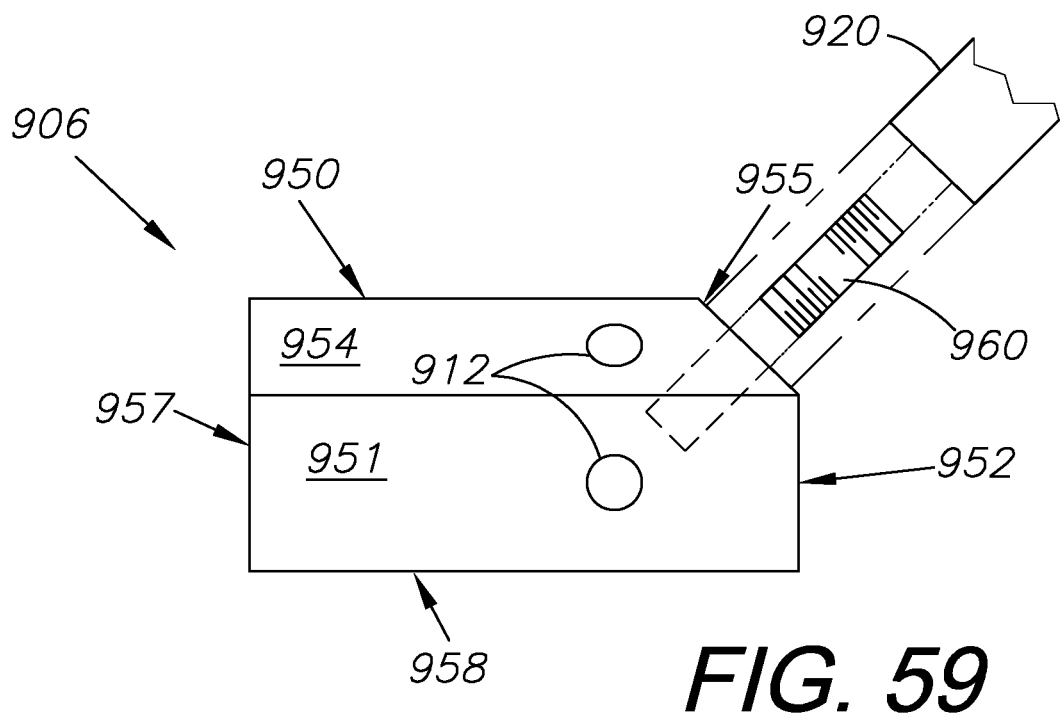
FIG. 59 is a right-side elevational view thereof, showing connection with the accessory pole mount.

FIGS. 54-58 show the accessory connector 906 in more detail from various views, including all of the faces and their associated receiver slots 912. FIG. 59 depicts how a threaded connector 960 may be used to join the accessory pole 920 to the accessory connector 906 receiver slot(s) 912. The threaded connector 960 could be separate from both elements as shown, or may be permanently affixed to the base end of the accessory pole 920. Other connection types could also be used.

FIG. 60 shows a slightly alternative embodiment where the accessory connector 906 is connected to the graph mount 918 via a mounting plate 962 or other similar structure. The mounting plate 962 can be placed and bolted or otherwise affixed to the bottom of the graph mount 918 and the accessory connector 906.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A system for interfacing with an accessory and a structure, the system comprising:

an accessory connector comprising a plurality of faces including at least a front face, a rear face, a top face, a bottom face, a right-side face, a left-side face, a front shoulder face, a right shoulder face, and a left shoulder face;

each of said top face, said bottom face, and said front face having a rectangular shape;

said front shoulder face having a trapezoidal shape;

each of said right shoulder face and said left shoulder face having a polygonal shape;

each of said plurality of faces comprising at least one connector receiver;

said accessory connector configured to be affixed to the structure;

the accessory configured to be connected to one of said plurality of faces via one of said at least one connector receivers located thereon; and wherein said accessory is configured to be selectively disconnected and replaced into one of the other of said plurality of faces via a different one of said at least one connector receivers.

2. The system of claim 1, further comprising:

an accessory pole comprising a cylindrical body having a proximal end and a distal end, said proximal end of said accessory pole configured to be connected to one of said plurality of faces via one of said at least one connector receivers located thereon;

an adjustable accessory mount affixed to said distal end of said accessory pole, said adjustable accessory mount configured to mount the accessory; and wherein the accessory is connected to said one of said at least one connector receivers via said adjustable accessory mount of said accessory pole.

3. The system of claim 1, further comprising:

wherein said accessory is an electrical accessory comprising a charging port; and a power source connected to said electrical accessory via a cable.

4. The system of claim 3, wherein said power source comprising a navigation light port of a marine vessel.

5. The system of claim 3, wherein said charging port comprises a universal serial bus (USB) port.

6. The system of claim 3, wherein said electrical accessory is one of the accessories chosen from the list comprising: a smart phone; a tablet computer; a digital camera; a geographical positioning system (GPS) unit; and a fish finder.

7. The system of claim 1, wherein said structure comprises a graph mount of a boat.

8. The system of claim 1, wherein said structure is a structure selected from a list comprising: a marine vehicle; a land vehicle; a permanent shelter; a gimbal; and a temporary shelter.

9. The system of claim 1, further comprising:

a mounting plate configured to be connected between said accessory connector and said structure, said mounting plate spanning a distance from said structure to said accessory connector;

said mounting place being affixed to said structure; and said accessory connector affixed to said mounting plate.

* * * * *